United States Patent
Chen

(10) Patent No.: US 11,893,868 B2
(45) Date of Patent: Feb. 6, 2024

(54) MULTI-LEVEL LED SECURITY LIGHT WITH MOTION SENSOR

(71) Applicant: VAXCEL INTERNATIONAL CO., LTD., Carol Stream, IL (US)

(72) Inventor: Chia-Teh Chen, Taipei (TW)

(73) Assignee: Vaxcel International Co., Ltd., Carol Stream, IL (US)

( * ) Notice: Subject to any disclaimer, the term of this patent is extended or adjusted under 35 U.S.C. 154(b) by 0 days.

(21) Appl. No.: 17/972,189

(22) Filed: Oct. 24, 2022

(65) Prior Publication Data

US 2023/0334970 A1 Oct. 19, 2023

Related U.S. Application Data

(63) Continuation of application No. 17/511,320, filed on Oct. 26, 2021, now Pat. No. 11,657,691, which is a
(Continued)

(51) Int. Cl.
*H05B 45/30* (2020.01)
*H05B 47/10* (2020.01)
(Continued)

(52) U.S. Cl.
CPC ............ *G08B 15/00* (2013.01); *F21S 9/03* (2013.01); *F21V 17/02* (2013.01); *G08B 5/36* (2013.01); *G08B 13/1895* (2013.01); *G08B 15/002* (2013.01); *H02J 7/35* (2013.01); *H05B 39/042* (2013.01); *H05B 39/044* (2013.01); *H05B 45/10* (2020.01); *H05B 45/12* (2020.01); *H05B 45/14* (2020.01); *H05B 45/20* (2020.01); *H05B 45/37* (2020.01); *H05B 45/44* (2020.01); *H05B 45/46* (2020.01); *H05B 45/48* (2020.01); *H05B 47/10* (2020.01); *H05B 47/105* (2020.01); *H05B 47/11* (2020.01); *H05B 47/115* (2020.01);
(Continued)

(58) Field of Classification Search
CPC ........ H05B 45/10; H05B 45/20; H05B 45/32; H05B 47/11; H05B 47/16; H05B 47/19; H05B 47/105; H05B 47/115
See application file for complete search history.

(56) References Cited

U.S. PATENT DOCUMENTS

| | | |
|---|---|---|
| 4,298,869 A | 11/1981 | Shinkokai |
| 5,134,387 A | 7/1992 | Smith et al. |

(Continued)

*Primary Examiner* — Tung X Le
(74) *Attorney, Agent, or Firm* — Rosenberg, Klein & Lee

(57) ABSTRACT

A method of configuring a white LED light with a tunable diffused light color temperature, includes using a light-emitting unit configured with a first LED load emitting light with a first color temperature between 1800K and 3000K and a second LED load emitting light with a second color temperature between 4000K and 6500K, electrically connected in parallel; using a light diffuser to cover the first LED load and the second LED load to create a diffused light with a diffused light color temperature; using two semiconductor switching devices working in conjunction with a controller to respectively control a first electric power delivered to the first LED load and a second electric power delivered to the second LED load such that a total electric power of the light-emitting unit remains unchanged; and using at least one external control device to activate a selection of the diffused light color temperature.

111 Claims, 26 Drawing Sheets

Related U.S. Application Data continuation of application No. 17/202,879, filed on Mar. 16, 2021, now Pat. No. 11,183,039, which is a continuation of application No. 16/159,852, filed on Oct. 15, 2018, now Pat. No. 10,985,596, which is a continuation of application No. 15/393,768, filed on Dec. 29, 2016, now Pat. No. 10,136,495, which is a continuation of application No. 15/213,595, filed on Jul. 19, 2016, now Pat. No. 9,622,328, which is a continuation of application No. 14/478,150, filed on Sep. 5, 2014, now Pat. No. 9,445,474, which is a continuation of application No. 13/222,090, filed on Aug. 31, 2011, now Pat. No. 8,866,392.

(51) Int. Cl.
| | | |
|---|---|---|
| *G08B 15/00* | (2006.01) | |
| *H05B 45/14* | (2020.01) | |
| *H05B 45/20* | (2020.01) | |
| *H05B 45/44* | (2020.01) | |
| *H05B 45/46* | (2020.01) | |
| *H05B 45/48* | (2020.01) | |
| *H05B 47/11* | (2020.01) | |
| *H05B 47/16* | (2020.01) | |
| *H05B 47/115* | (2020.01) | |
| *H05B 47/17* | (2020.01) | |
| *H05B 45/12* | (2020.01) | |
| *H05B 45/37* | (2020.01) | |
| *H05B 45/10* | (2020.01) | |
| *H05B 47/105* | (2020.01) | |
| *H05B 39/04* | (2006.01) | |
| *F21S 9/03* | (2006.01) | |
| *F21V 17/02* | (2006.01) | |
| *G08B 5/36* | (2006.01) | |
| *G08B 13/189* | (2006.01) | |
| *H02J 7/35* | (2006.01) | |
| *F21Y 115/10* | (2016.01) | |
| *G08B 13/00* | (2006.01) | |

(52) U.S. Cl.
CPC ............ *H05B 47/16* (2020.01); *H05B 47/17* (2020.01); *F21Y 2115/10* (2016.08); *G08B 13/00* (2013.01); *G08B 13/189* (2013.01); *Y02B 20/40* (2013.01)

(56) References Cited

U.S. PATENT DOCUMENTS

| | | | |
|---|---|---|---|
| 5,491,463 | A | 2/1996 | Sargeant et al. |
| 5,598,066 | A | 1/1997 | Wiesemann et al. |
| 5,668,446 | A | 9/1997 | Baker |
| 5,747,937 | A | 5/1998 | Wiesemann et al. |
| 6,016,038 | A | 1/2000 | Mueller et al. |
| 6,211,626 | B1 | 4/2001 | Lys et al. |
| 6,225,748 | B1 | 5/2001 | Evans et al. |
| 6,473,608 | B1 | 10/2002 | Lehr et al. |
| 6,528,954 | B1 | 3/2003 | Lys et al. |
| 6,548,967 | B1 | 4/2003 | Dowling et al. |
| 6,559,757 | B1 | 5/2003 | Deller et al. |
| 6,788,011 | B2 | 9/2004 | Mueller et al. |
| 6,820,998 | B2 | 11/2004 | Chen |
| 6,888,323 | B1 | 5/2005 | Null et al. |
| 6,909,239 | B2 | 6/2005 | Gauna |
| 6,927,541 | B2 | 8/2005 | Lee |
| 7,038,399 | B2 | 5/2006 | Lys et al. |
| 7,086,756 | B2 | 8/2006 | Maxik |
| 7,088,059 | B2 | 8/2006 | McKinney et al. |
| 7,122,976 | B1 | 10/2006 | Null et al. |
| 7,268,497 | B2 | 9/2007 | Hsieh |
| 7,339,471 | B1 | 3/2008 | Chan et al. |
| 7,344,275 | B2 | 3/2008 | Allen et al. |
| 7,350,936 | B2 | 4/2008 | Ducharme et al. |
| 7,378,805 | B2* | 5/2008 | Oh .................... H05B 45/3725 315/307 |
| 7,405,524 | B2 | 7/2008 | Null et al. |
| 7,507,001 | B2 | 3/2009 | Kit |
| 7,564,198 | B2 | 7/2009 | Yamamoto et al. |
| 7,565,225 | B2 | 7/2009 | Dushane et al. |
| 7,804,252 | B2 | 9/2010 | Chen |
| 7,876,056 | B2 | 1/2011 | Atkins et al. |
| 7,880,394 | B2 | 2/2011 | Sibalich et al. |
| 7,902,769 | B2* | 3/2011 | Shteynberg ........ H05B 45/3577 315/308 |
| 7,940,167 | B2 | 5/2011 | Steiner et al. |
| 7,948,189 | B2 | 5/2011 | Ahmed |
| 8,033,686 | B2 | 10/2011 | Recker et al. |
| 8,035,320 | B2 | 10/2011 | Sibert |
| 8,035,513 | B2 | 10/2011 | Raper |
| 8,159,125 | B2 | 4/2012 | Miao |
| 8,194,061 | B2 | 6/2012 | Wang |
| 8,199,010 | B2 | 6/2012 | Sloan et al. |
| 8,203,260 | B2 | 6/2012 | Li |
| 8,203,445 | B2 | 6/2012 | Recker et al. |
| 8,222,584 | B2 | 7/2012 | Rains, Jr. et al. |
| 8,310,163 | B2 | 11/2012 | Chen |
| 8,325,040 | B2 | 12/2012 | Nassimi |
| 8,352,850 | B1 | 1/2013 | Creed et al. |
| 8,476,836 | B2 | 7/2013 | Van De Ven |
| 8,515,275 | B2 | 8/2013 | Machida et al. |
| 8,598,805 | B2 | 12/2013 | Tremblay et al. |
| 8,598,809 | B2* | 12/2013 | Negley .................. H05B 45/22 315/297 |
| 8,680,789 | B2 | 3/2014 | Mohan |
| 8,710,754 | B2 | 4/2014 | Baddela et al. |
| 8,805,351 | B2 | 8/2014 | Sigal et al. |
| 8,901,825 | B2 | 12/2014 | Reed |
| 8,907,576 | B2 | 12/2014 | Ferrier |
| 9,073,798 | B1 | 7/2015 | Brooke |
| 9,083,461 | B2 | 7/2015 | Chin et al. |
| 9,113,528 | B2 | 8/2015 | Bora et al. |
| 9,131,545 | B2 | 9/2015 | Verfuerth et al. |
| 9,134,004 | B2 | 9/2015 | Wacholder |
| 9,185,755 | B2 | 10/2015 | Sutardja |
| 9,179,508 | B2 | 11/2015 | Mccune, Jr. |
| 9,179,511 | B2 | 11/2015 | Sugiura et al. |
| 9,265,116 | B2 | 2/2016 | Chen et al. |
| 9,271,345 | B2 | 2/2016 | Welten |
| 9,294,719 | B2 | 3/2016 | Uhma et al. |
| 9,311,167 | B2 | 4/2016 | Kim et al. |
| 9,323,421 | B1 | 4/2016 | Cronin |
| 9,380,671 | B1 | 6/2016 | Janos et al. |
| 9,510,419 | B2 | 11/2016 | Bell et al. |
| 9,706,617 | B2 | 7/2017 | Carrigan et al. |
| 9,832,844 | B2 | 11/2017 | Mans |
| 9,872,358 | B2 | 1/2018 | Beijer et al. |
| 10,182,489 | B1 | 1/2019 | Israni |
| 10,206,265 | B2 | 2/2019 | Verfuerth |
| 10,271,404 | B1 | 4/2019 | Fornek et al. |
| 10,321,541 | B2 | 6/2019 | Bora et al. |
| 2004/0003073 | A1 | 1/2004 | Krzyzanowski et al. |
| 2004/0105264 | A1 | 6/2004 | Spero |
| 2005/0007025 | A1 | 1/2005 | Gauna |
| 2005/0259416 | A1 | 11/2005 | Gauna |
| 2006/0022916 | A1 | 2/2006 | Aiello |
| 2006/0123053 | A1 | 6/2006 | Scannell, Jr. |
| 2007/0182338 | A1 | 8/2007 | Shteynberg et al. |
| 2008/0197783 | A1 | 8/2008 | Chen |
| 2008/0252197 | A1 | 10/2008 | Li et al. |
| 2010/0090618 | A1* | 4/2010 | Veltman .................. H05B 45/40 315/307 |
| 2010/0117543 | A1 | 5/2010 | Van Der Veen et al. |
| 2010/0141153 | A1 | 6/2010 | Recker et al. |
| 2010/0165600 | A1 | 7/2010 | Ku |
| 2010/0264831 | A1 | 10/2010 | Nagaoka |
| 2010/0327766 | A1 | 12/2010 | Recker et al. |
| 2011/0001439 | A1* | 1/2011 | Cecconello ............ H05B 45/00 315/307 |
| 2011/0018448 | A1 | 1/2011 | Metchear, III |
| 2011/0043133 | A1 | 2/2011 | Van Laanen et al. |

(56) References Cited

U.S. PATENT DOCUMENTS

| | | |
|---|---|---|
| 2011/0062888 A1 | 3/2011 | Bondy et al. |
| 2011/0080110 A1 | 4/2011 | Nuhfer et al. |
| 2011/0285292 A1 | 11/2011 | Mollnow |
| 2012/0049760 A1 | 3/2012 | Dennis |
| 2012/0306370 A1* | 12/2012 | Van De Ven .......... H05B 45/28 315/192 |
| 2012/0306377 A1 | 12/2012 | Igaki |
| 2014/0062313 A1 | 3/2014 | Ootsubo et al. |
| 2014/0159877 A1 | 6/2014 | Huang |
| 2014/0239828 A1 | 8/2014 | Smith |
| 2015/0289339 A1 | 10/2015 | Wu et al. |
| 2016/0323972 A1 | 11/2016 | Bora et al. |

* cited by examiner

| Brand | $V_F$ Min. | $V_F$ Max. | Product Series | Information Source |
|---|---|---|---|---|
| CREE | 2.9V | 3.3V | J Series LEDs/J Series 2835 | www.cree.com/led-components/products/j2835/jseries-2835 |
| LUMILEDS | 2.7V | 3.3V | LUXEON 2835 Line | www.lumileds.com/luxeon2835line |
| SAMSUNG | 2.9V | 3.3V | KM281BA+ | www.samsung.com/app/components/products/j2835/jseries-2835 |
| OSRAM | 2.7V | 3.3V | DURIS® E/DURISR E 2835 | www.osram.com/app/product_selector/#!?query=DORIS%20E%202835&sortField=&sortOrder=&start=0&filters=productbrand,DORIS,E&filters-productbrand,DORIS |

FIG. 9

MULTI-LEVEL LED SECURITY LIGHT WITH MOTION SENSOR

CROSS-REFERENCE TO RELATED APPLICATIONS

This is a continuation application of prior application Ser. No. 17/511,320, filed on Oct. 26, 2021. Application Ser. No. 17/511,320 is a continuation application of prior application Ser. No. 17/202,879, filed on Mar. 16, 2021, which issued as U.S. Pat. No. 11,183,039. Application Ser. No. 17/202,879, filed on Mar. 16, 2021 is a continuation application of prior application Ser. No. 16/159,852, filed on Oct. 15, 2018, which issued as U.S. Pat. No. 10,985,596 on Apr. 20, 2021. Application Ser. No. 16/159,852 is a continuation application of prior application Ser. No. 15/393,768, filed on Dec. 29, 2016, which issued as U.S. Pat. No. 10,136,495 on Nov. 20, 2018. Application Ser. No. 15/393,768 is a continuation application of prior application Ser. No. 15/213,595, filed on Jul. 19, 2016, which issued as U.S. Pat. No. 9,622,328 on Apr. 11, 2017. Application Ser. No. 15/213,595 is a continuation application of prior application Ser. No. 14/478,150, filed on Sep. 5, 2014, which issued as U.S. Pat. No. 9,445,474 on Sep. 13, 2016. Application Ser. No. 14/478,150 is a continuation application of prior application Ser. No. 13/222,090, filed on Aug. 31, 2011, which issued as U.S. Pat. No. 8,866,392 on Oct. 21, 2014.

INCORPORATION BY REFERENCE/MPEP 2163.07(b)

The following prior arts with associated disclosures are herein requested to be incorporated into the current application:

1. U.S. Pat. No. 9,345,112 B2 titled "MICROCONTROLLER-BASED MULTIFUNCTIONAL ELECTRONIC SWITCH AND LIGHTING APPARATUS HAVING THE SAME" filed on Dec. 22, 2014 and granted on May 17, 2016. The patent '112 is a continuation in part of the original application of U.S. Pat. No. 8,947,000 which is the first founding patent for a large family collection of member patents involving using the technology of the microcontroller based electronic switch to control a light intensity of a light-emitting unit. The patent '112 is in turn the second founding patent for a subfamily of member patents involving using a technology of two LED loads emitting light with different color temperature to work with the technology of the microcontroller-based electronic switches to control a color temperature tuning and switching scheme of an LED load. The applicant herein requests to incorporate the contents of the patent '112 including all disclosures, embodiments and drawings to the specification of the current application according to MPEP 2163.07(b).

2. U.S. Pat. No. 10,136,503 B2 titled "MICROCONTROLLER-BASED MULTIFUNCTIONAL ELECTRONIC SWITCH AND LIGHTING APPARATUS HAVING THE SAME" filed on Sep. 13, 2017 and granted on Nov. 20, 2018. The patent '503 is a member patent in the family collection of member patents under the first founding patent U.S. Pat. No. 8,947,000 and is also a member patent in the subfamily collection of member patents under the second founding patent U.S. Pat. No. 9,345,112. The patent '503 teaches a system and a method of using two microcontroller based electronic switches respectively connected to two LED loads emitting light with different color temperatures to control and allocate different electric powers respectively delivered to the two LED loads for performing multiple working modes including on/off control mode, dimming mode, color temperature tuning mode, color temperature switching mode, color temperature dim to warm mode, commanding mode for controlling a lighting family comprising a plurality of member lamps remotely located or delay shut off mode. The applicant herein requests to incorporate the contents of the patent '503 including all disclosures, embodiments and drawings to the specification of the current application according to MPEP 2163.07(b).

3. U.S. Pat. No. 10,470,276 B2 titled "METHOD OF TUNING LIGHT COLOR TEMPERATURE FOR LED LIGHTING DEVICE AND APPLICATION THEREOF" was filed on Oct. 17, 2018 and granted on Nov. 5, 2019. The patent '276 teaches a method and application of performing a light color temperature tuning control for an LED lamp includes using a first LED load emitting light with a first color temperature and a second LED load emitting light with a second color temperature thru a light diffuser, using a power allocation circuitry working with a power allocation algorithm to control different electric power respectively delivered to the first LED load while keeping the total electric power unchanged to generate different diffused light color temperatures. Applicant herein requests to incorporate the contents of the patent '276 including all disclosures, embodiments and drawings by reference to the specification of the current application according to MPEP 2163.07(b).

4. U.S. Pat. No. 11,063,585 titled "METHOD OF TUNING LIGHT COLOR TEMPERATURE FOR LED LIGHTING DEVICE AND APPLICATION THEREOF" was continuation of application of the patent '276, filed on Aug. 7, 2019 and granted on Jul. 13, 2021. The patent '585 discloses a theory and a technical foundation for building a technical frame of a color temperature tuning technology for an LED lamp composing a power allocation algorithm, a power allocation circuitry and at least one external control device for activating a color temperature tuning and switching scheme. The applicant herein request to incorporate the contents of the patent '585 including all disclosures, all embodiments and all drawings to the specification of the current application according to MPEP 2163.07(b).

5. U.S. Pat. No. 8,866,392 B2 titled "TWO-LEVEL LED SECURITY LIGHT WITH MOTION SENSOR" was filed on Aug. 31, 2011 and granted on Oct. 21, 2014. The patent '392 discloses technologies for operating a two level LED security light; at night the LED security light is automatically turned on for a low level illumination, when a motion intrusion signal is detected by the motion sensor, the LED security light is switched from the low level illumination with a low color temperature to a high level illumination with a high color temperature to maximize an effect of security alert for a short duration time, at dawn the LED security light is automatically turned off. The patent '392 is the founding application for a large family collection of member patents involving automatic illumination control technologies including light intensity tuning and light color temperature tuning. The applicant herein requests to incorporate the contents of the patent '392 including all disclosures, embodiments and drawings to the specification of the current application according to MPEP 2163.07(b).

6. U.S. Pat. No. 10,516,292 B2 titled "TWO-LEVEL LED SECURITY LIGHT WITH MOTION SENSOR" was a member patent under the founding patent '392, filed on Jan. 10, 2019 and granted on Dec. 24, 2019. The patent '292 is a member patent in the family collection of patents under the founding patent '392. The patent '292 discloses a lifestyle LED security light including a light-emitting unit configured with two sets of LED loads respectively emitting different color temperature light, at dusk the light-emitting unit is automatically turned on for a first level illumination with a low color temperature featuring a soft night view with the motion sensor being deactivated for a first time duration, and then the light-emitting unit is changed to a second level illumination with motion sensor being activated, when the motion sensor detects a motion intrusion signal, the light-emitting unit is instantly switched to perform a third level illumination with a high light intensity and a high color temperature. The color temperatures of the first level illumination and the third level illumination are respectively adjustable by simultaneously and reversely adjusting the electric powers allocated to the two sets of LED loads. The applicant herein request to incorporate the contents of the patent '292 to the specification of the current application according to MPEP 2163.07(b).

7. U.S. Pat. No. 10,770,916 B2 titled "TWO-LEVEL LED SECURITY LIGHT WITH MOTION SENSOR" was filed on Oct. 30, 2019 and granted on Sep. 8, 2020. The '916 patent is a member patent in the family collection of patents under the founding patent '392. The patent '916 teaches a method of configuring an LED light with a tunable diffused light color temperature. The method comprises using a light-emitting unit configured with a first LED load emitting light with a low color temperature and a second LED load emitting light with a high color temperature electrically connected in parallel, using a light diffuser to cover the first LED load and the second LED load create a diffused light with a diffused light color temperature, using two semiconductor switching devices working in conjunction with a controller to respectively control a first electric power delivered to the first LED load and a second electric power delivered to the second LED load to operate a color temperature tuning and switching scheme and using a first external control device to output at least one first external control signal to activate a selection of a diffused light color temperature. The applicant herein requests to incorporate the contents of the patent '916 including all disclosures, all embodiments and all drawings to the specification of the current application according to MPED 2163.07((b).

8. U.S. Pat. No. 10,763,691 B2 titled "TWO-LEVEL LED SECURITY LIGHT WITH MOTION SENSOR" was filed on Mar. 19, 2020 and granted on Sep. 1, 2020. The '691 patent is a member patent in the family collection of patents under the original founding patent '392. The patent '691 discloses a technology of tuning the light color temperature of a lifestyle LED light by blending the two LED loads emitting light with different color temperatures thru a light diffuser with an arrangement that a first electric power delivered to a first LED load emitting light with a low color temperature and a second electric power delivered to a second LED load emitting light with a high color temperature are reversely and complementarily adjusted for tuning a diffused light color temperature such that a total light intensity generated by the LED light is kept essentially unchanged. The applicant herein requests to incorporate the contents of the patent '691 including all disclosures, embodiments and drawings to the specification of the current application according to MPEP 2163.07(b).

9. U.S. Pat. No. 10,187,947 B2 titled "LIFE-STYLE LED SECURITY LIGHT" was issued on Jan. 22, 2019. The applicant herein requests to incorporate the contents of the '947 patent including all disclosures, embodiments and drawings to the specification of the current application according to MPEP 2163.07(b).

10. U.S. Pat. No. 10,491,032 B2 titled "LIFESTYLE SECURITY LIGHT" was issued on Nov. 26, 2019. The applicant herein requests to incorporate the contents of the '032 patent including all disclosures, embodiments and drawings to the specification of the current application according to MPEP 2163.07(b).

11. U.S. Pat. No. 10,225,902 B2 titled "TWO-LEVEL SECURITY LIGHT WITH MOTION SENSOR" was issued on Mar. 5, 2019. The applicant herein requests to incorporate the contents of the patent '902 including all disclosures, embodiments and drawings to the specification of the current application according to MPEP 2163.07 (b).

12. U.S. Pat. No. 10,326,301 B2 titled "TWO-LEVEL LED SECURITY LIGHT WITH MOTION SENSOR" was issued on Jun. 18, 2019. The applicant herein requests to incorporate the contents of the patent '301 including all disclosures, embodiments and drawings to the specification of the current application according to MPEP 2163.07 (b).

13. U.S. Pat. No. 9,326,362 B2 titled "TWO-LEVEL LED SECURITY LIGHT WITH MOTION SENSOR" was issued on Apr. 26, 2016. The applicant herein requests to incorporate the contents of the patent '362 including all disclosures, embodiments and drawings to the specification of the current application according to MPEP 2163.07 (b).

14. U.S. Pat. No. 9,560,719 B2 titled "LED SECURITY LIGHT AND LED SECURITY LIGHT CONTROL DEVICE THEREOF" was issued on Jan. 31, 2017. The applicant herein requests to incorporate the contents of the patent '719 including all disclosures, embodiments and drawings to the specification of the current application according to MPEP 2163.07(b).

15. U.S. Pat. No. 10,154,564 B2 titled "APP BASED FREE SETTING METHOD FOR SETTING OPERATING PARAMETER OF SECURITY LIGHT" was issued on Dec. 11, 2018. The applicant herein requests to incorporate the contents of the patent '564 including all disclosures, embodiments and drawings to the specification of the current application according to MPEP 2163.07(b).

16. U.S. Pat. No. 10,667,367 B2 titled "APP BASED FREE SETTING METHOD FOR SETTING OPERATING PARAMETER OF SECURITY LIGHT" was issued on May 26, 2020. The applicant herein requests to incorporate the contents of the patent '367 including all disclosures, embodiments and drawings to the specification of the current application according to MPEP 2163.07(b)

17. The website of community.homey.app under the article of "DIY circadian rhythm based lighting" a drawing showing a natural color temperature variation cycle during a daytime performed by sun starting with 2000K or less at sunrise, 3500K~4500K in the morning, 5500K~6500K at noon, 3500K~4500K in late afternoon, and 2000K or less at sunset. Such natural color temperature variation cycle represents an inherent property of daylight performed by the sun during daytime hours every day and therefore is not considered as a new matter under any circumstances. The applicant herein request to incorporate the contents of descriptions and figures under the article of "The spectrum and colors of light" to provide necessary support to FIG. 10A disclosed in the present application.

18. The website of https.//the lightingpractice.com under the article of "What is circadian lighting?" in which an automatic color temperature variation cycle performed by the sunlight day by day presented in a drawing is disclosed. Such automatic color temperature variation cycle belongs to an inherent property of the daylight performed by sun and therefore is not considered as a new matter under any circumstances. The applicant herein request to incorporate the contents of descriptions and figures under the article of "The spectrum and colors of light" to provide necessary support to FIG. 10B disclosed in the present application.

19. The website of horticulture.red under the article "Spectrum and colors of light" by Rouge Engineered Designs on Jan. 22, 2020 and "spectrum of different light sources" by Dutta Gupta et Agarwal in 2017 with regard to descriptions and drawings are cited for reference in the present application as FIG. 11 and FIG. 11A-11C. The applicant herein request to incorporate the contents of descriptions and figures under the article of "The spectrum and colors of light" to provide necessary support to FIG. 11A, FIG. 11B and FIG. 11C disclosed in the present application.

BACKGROUND

1. Technical Field

The present disclosure relates to an LED lighting apparatus, in particular, to a multi-level LED security light operated with photo sensor and or motion sensor.

2. Description of Related Art

Lighting sources such as the fluorescent lamps, the incandescent lamps, the halogen lamps, and the light-emitting diodes (LED) have been commonly found in lighting apparatuses for illumination purpose with LED lamps becoming the main stream light source in recent years for all illumination applications. Photoresistors are often utilized in outdoor lighting applications for automatic illuminations, known as the Photo-Control (PC) mode. Timers may be used in the PC mode for turning off the illumination or for switching to a lower level illumination of a lighting source after the lighting source having delivered a high level illumination for a predetermined time duration, referred as the Power-Saving (PS) mode. Motion sensors are often used in the lighting apparatus for delivering a full-power illumination thereof for a short duration when a human motion is detected, then switching back to the PS mode. Illumination operation controls such as auto-illumination in accordance to the background brightness detection, illumination using timer, illumination operation control using motion sensing results (e.g. dark or low luminous power to fully illuminated), color temperature control and brightness control are often implemented by more complex circuit designs in view of the electrical characteristics of LEDs for emitting light being very different from the traditional light sources such as incandescent bulb, fluorescent bulb and halogen bulb.

Therefore, how to develop efficient and effective methods of illumination controls and to explore applications especially of the solid state lighting devices such as LEDs for controlling both the light intensity as well as the color temperature of white LED light are the topics of the present disclosure.

SUMMARY

An exemplary embodiment of the present disclosure provides a multi-level LED security light with motion sensor which may switch to high level illumination in the Power-Saving (PS) mode for a predetermined time duration when a human motion is detected thereby to achieve a warning purpose or to create a high alertness purpose using methods of electric current adjustments or lighting load adjustments. Furthermore, prior to the detection of a motion intrusion, the LED security light may be constantly in the low level illumination state or the cutoff state to save energy.

An exemplary embodiment of the present disclosure provides a multi-level LED security light including a power supply unit, a light sensing control unit, a motion sensing unit, an external control unit, a loading and power control unit, and a light-emitting unit. The light-emitting unit further includes one or a plurality of in series- and/or in parallel-connected LEDs; when the light sensing control unit detects that a light intensity level of an ambient light being lower than a first predetermined value, the loading and power control unit operates to turn on the light-emitting unit to deliver an average electric current to the light-emitting unit generate a first level illumination; when the light sensing control unit detects that the light intensity level of the ambient light is higher than a second predetermined value, the loading and power control unit turns off the light-emitting unit; when the motion sensing unit detects a human motion in the PS mode, the loading and power control unit increases the average electric current delivered to the light-emitting unit so as to generate a second level illumination for a predetermined time duration, wherein a light intensity of the second level illumination is higher than or equal to the light intensity of the first level illumination.

Another exemplary embodiment of the present disclosure provides a multi-level LED security light including a power supply unit, a light sensing control unit, a motion sensing unit, an external control unit, a loading and power control unit, a light-emitting unit. The light-emitting unit includes a plurality of in series- and/or in parallel-connected LEDs. When the light sensing control unit detects that a light intensity level of an ambient light being lower than a first predetermined value, the loading and power control unit turns on a portion or all of the plurality of LEDs of the light-emitting unit to generate a first level illumination; when the light sensing control unit detects that the light intensity level of the ambient light being higher than a second predetermined value, the loading and power control unit turns off all the LEDs in the light-emitting unit; when the motion sensing unit detects a human motion in the PS mode, the loading and power control unit operates to turn on the plurality of LEDs in the light-emitting unit and generates a second level illumination for a predetermined time duration, wherein a light intensity of the second level illumination is higher than or equal to the light intensity of the first level illumination. An electric current control circuit is integrated in the exemplary embodiment for providing a constant electric current to drive the LEDs in the light-emitting unit.

One exemplary embodiment of the present disclosure provides a multi-level LED security light including a power supply unit, a light sensing control unit, a motion sensing unit, an external control unit, a loading and power control unit, and a light-emitting unit. The light-emitting unit includes a phase controller and one or a plurality of in parallel-connected alternating current (AC) LEDs. The phase controller is coupled between the described one or a plurality parallel-connected ACLEDs and AC power source. The loading and power control unit may through the phase controller control the average power of the light-emitting unit; when the light sensing control unit detects that a light intensity level of an ambient light is lower than a predetermined value, the loading and power control unit turns on the light-emitting unit to generate a high level or a lower level illumination; when the light sensing control unit detects that the light intensity level of the ambient light is higher than the predetermined value, the loading and power control unit turns off the light-emitting unit; when the motion sensing unit detects a human motion in the PS mode, the loading and power control unit increases the average power of the light-emitting unit thereby generates the high level illumination for a predetermined time duration.

According to an exemplary embodiment of the present disclosure, a multi-level LED security light includes a power supply unit, a light sensing control unit, a motion sensing unit, an external control unit, a loading and power control unit, and a light-emitting unit. The light-emitting unit includes X high wattage ACLEDs and Y low wattage ACLEDs connected in parallel. When the light sensing control unit detects that a light intensity level of an ambient light is lower than a predetermined value, the loading and power control unit turns on the plurality of low wattage ACLEDs to generate a low level illumination; when the light sensing control unit detects that the light intensity level of the ambient light is higher than a predetermined value, the loading and power control unit turns off the light-emitting unit; when the motion sensor detects an intrusion, the loading and power control unit turns on both the high wattage ACLEDs and the low wattage ACLEDs at same time thereby generates a high level illumination for a predetermined time duration, wherein X and Y are of positive integers.

According to an exemplary embodiment of the present disclosure, a multi-level LED security light with motion sensor includes a power supply unit, a light sensing control unit, a motion sensing unit, an external control unit, a loading and power control unit, and a light-emitting unit. The light-emitting unit includes a rectifier circuit connected between one or a plurality of parallel-connected AC lighting sources and AC power source. The loading and power control unit may through the rectifier circuit adjust the average power of the light-emitting unit. When the light sensing control unit detects that a light intensity level of an ambient light is lower than a predetermined value, the loading and power control unit turns on the light-emitting unit to generate a low level illumination; when the light sensing control unit detects that the light intensity level of the ambient light is higher than the predetermined value, the loading and power control unit turns off the light-emitting unit; when the motion sensing unit detects an intrusion, the loading and power control unit increases the average power of the light-emitting unit thereby generates a high level illumination for a predetermined time duration. The rectifier circuit includes a switch parallel-connected with a diode, wherein the switch is controlled by the loading and power control unit.

To sum up, a multi-level LED security light with motion sensor provided by an exemplary embodiment in the preset disclosure may execute Photo-Control (PC) and Power-Saving (PS) modes. When operates in the PC mode, the lighting apparatus may auto-illuminate at night and auto turn off at dawn. The PC mode may generate a high or a low level illumination for a predetermined time duration then automatically switch to the PS mode by a control unit to generate a low level or a cutoff illumination. When the motion sensor detects a human motion, the disclosed LED security light may immediately switch to a high or a full level illumination for a short predetermined time duration and thereby to create a high visibility or a warning effect. After the short predetermined time duration, the LED security light may automatically return to the low level illumination for saving energy. Although ACLEDs are used in some embodiments, the present disclosure is not limited in applying on the ACLEDs. It can be implemented with DC LEDs or DC LEDs in AC module such as LED bulbs incorporating with power sources and circuitries which commonly known by a person of skill in the art. A light intensity of the low level illumination is generally designed in a range between 0% and 50% of a maximum illumination capacity of an LED load while a light intensity of the high level illumination is always designed in a range between 50% and 100% of the maximum illumination capacity of the LED load though the present disclosure does not need to restrict such ranges for the low level illumination and the high level illumination so long as the light intensity of the high level illumination is always managed to be equal or greater than the light intensity of the low level illumination.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 9 is a data sheet showing data of minimum forward voltages and maximum forward voltages for generating a designated constant forward current collected from various LED manufacturers for generating a designated constant forward current to produce a required lumens output.

FIG. 11A is a spectral power distribution pattern of sun light with CRI=99 cited from FIG. 11.

FIG. 11B is a spectral power distribution pattern of a RGB based white LED light with CRI<73 cited from FIG. 11.

FIG. 11C is a spectral power distribution pattern of a phosphor based white LED light cited from FIG. 11 with CRI=90.

FIG. 12-1A is a schematic block diagram of a color temperature tuning circuitry comprising two LED loads emitting lights with different light color temperatures respectively being CT1 and CT2, to work with a power allocation circuitry configured with a two-way electric switch to operate at least two loading options for generating two different diffused light color temperatures.

FIG. 12-1B is a schematic block diagram of a color temperature tuning circuitry comprising two LED loads emitting lights with different light color temperatures respectively being CT1 and CT2, to work with a power allocation circuitry configured with a three-way electric switch to operate at least three loading options for generating three different diffused light color temperatures.

FIG. 12-2 is a schematic diagram showing another embodiment of the light color temperature tuning platform using a power allocation circuitry configured with a microcontroller based electronic switch comprising a controller working in conjunction with at least two semiconductor switching devices operable by an external control device for controlling a power allocation between the first LED load and the second LED load according to a diffused light color temperature tuning algorithm.

DESCRIPTIONS OF THE EXEMPLARY EMBODIMENTS

Figure 1:
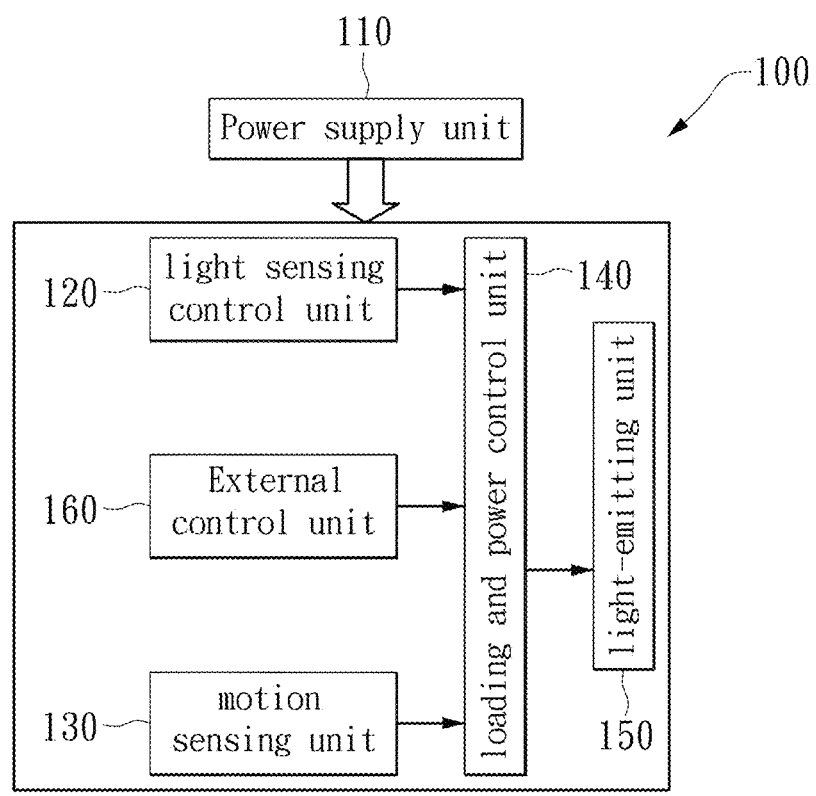
FIG. 1 schematically illustrates a block diagram of a multi-level LED security light in accordance with an exemplary embodiment of the present disclosure.

Reference is made in detail to the exemplary embodiments of the present disclosure, examples of which are illustrated in the accompanying drawings. Wherever possible, the same reference numbers are used in the drawings and the description to refer to the same or alike parts.

First Exemplary Embodiment

Refer to FIG. 1, which schematically illustrates a block diagram of a multi-level LED security light in accordance to the first exemplary embodiment of the present disclosure. The multi-level LED security light (herein referred as the lighting apparatus) 100 includes a power supply unit 110, a light sensing control unit 120, a motion sensing unit 130, an external control unit 160, a loading and power control unit 140, and a light-emitting unit 150. The power supply unit 110 is used for supplying power required to operate the system, wherein the associated structure includes the known AC/DC voltage converter. The light sensing control unit 120 may be a photo sensor, which may be coupled to the loading and power control unit 140 for determining daytime or nighttime in accordance to a light intensity level of an ambient light. The motion sensing unit 130 may be a passive infrared sensor (PIR), a microwave sensor or an ultrasonic sensor which is coupled to the loading and power control unit 140 and is used to detect intrusions. When a person is entering a predetermined detection zone of the motion sensing unit 130, a sensing signal thereof may be transmitted to the loading and power control unit 140. The external control unit 160 is coupled to the loading and power control unit 140 for setting at least one of various operating parameters of a security light including at least a time length setting for various illumination modes, at least a light intensity setting for various illumination modes, at least a color temperature setting for various illumination modes and at least one switching between illumination modes. The external control unit 160 may be configured with a conventional art such as a push button, a touch sensor, a voltage divider, a power interruption detection circuitry or a wireless remote control receiver for processing and converting an external control signal into a signal interpretable and executable by the loading and power control unit 140 for setting at least one of various operating parameters of the multi-level LED security light including at least a time length setting for various illumination modes, at least a light intensity setting for various illumination modes and switching illumination modes.

The multi-level LED security light can be optionally configured to perform a three-level LED security light or a two-level LED security light.

The three-level LED security light is a lifestyle security light capable of performing three different illuminations during the night time period from dusk to dawn, at dusk the lighting apparatus 100 is turned on by the light sensing control unit 120 to operate a PC (Photo-Control) mode for performing a first level illumination for a first predetermined time duration in early evening and then upon a maturity of the first predetermined time duration the lighting apparatus is switched to a PS (Power-Saving) mode for performing a second level illumination with a reduced light intensity, wherein during the PS mode when a motion intrusion is detected by the motion sensing unit 130, the loading and power control unit 140 operates to increase an average electric current delivered to light-emitting unit 150 to perform a third level illumination with a light intensity higher than the light intensity of the second level illumination for a third predetermined time duration, wherein the third predetermined time duration is often shorter than the first predetermined time duration and the second predetermined time duration. At dawn the lighting apparatus 100 is turned off by the loading and power control unit 140 when a light intensity level of an ambient light detected by the light sensing control unit 120 is higher than a second predetermined value.

The two-level LED security light is configured to focus on the power saving aspect to provide only two different illuminations of the power saving mode during the nighttime period from dusk to dawn. It can be achieved by eliminating the configuration of the PC mode or by setting the first predetermined time duration at zero to bypath the PC mode in the option of the three-level LED security light. At dusk the lighting apparatus is turned on by the light sensing control unit 120, wherein the loading and power control unit 140 operates to deliver an average electric current to the light emitting unit 150 to perform a first level illumination which is often a low level illumination, wherein the light intensity of the low level illumination is normally designed in a range between 0 and 50% of a maximum illumination capacity designed for the lighting apparatus 100, wherein when a motion signal is detected by the motion sensing unit, the loading and power control unit operates to increase the average electric current delivered to the light emitting unit 150 to perform a second level illumination which is often a high level illumination for a second predetermined time duration, wherein the high level illumination is normally designed in a range between 50% and 100% of the maximum illumination capacity designed for the LED security light, however, since there are some special cases where the low level illumination and the high level illumination are not bounded by the aforementioned ranges so long as the high level illumination is higher than or equal to the low level illumination. The present disclosure does not limit their respective ranges. At dawn the lighting apparatus 100 is turned off by the loading and power control unit 140 when a light intensity level of an ambient light detected by the light sensing control unit 120 is higher than a second predetermined value.

Figure 1A:
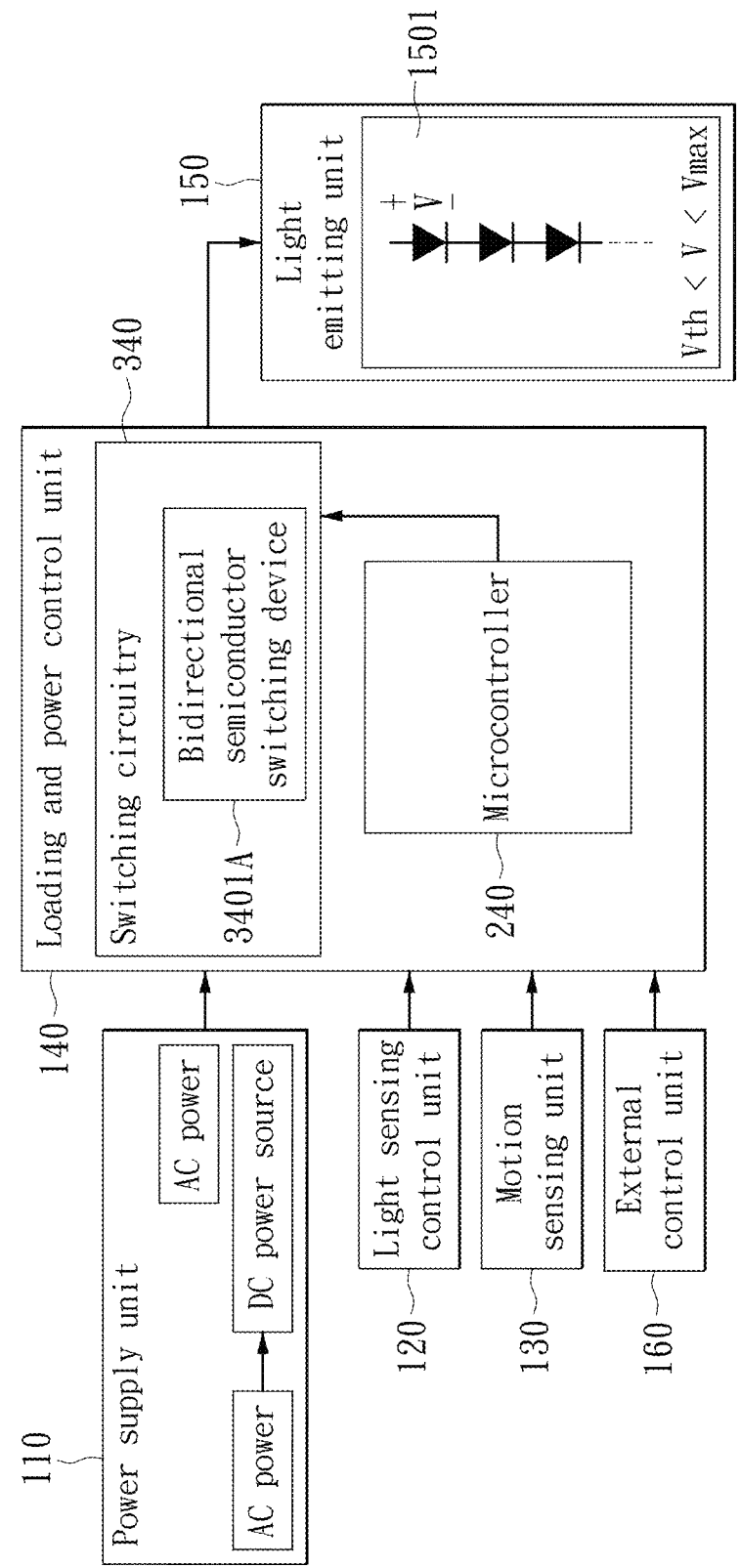
FIG. 1A is an enhanced block diagrammed under FIG. 1 to specifically illustrate an embodiment of FIG. 1 for a multi-level LED security light, wherein the loading and power control unit comprises a switching circuitry and a microcontroller, wherein the switching circuitry further comprises a bidirectional semiconductor switching device for controlling an average electric power to be delivered to the LED.
Figure 1B:
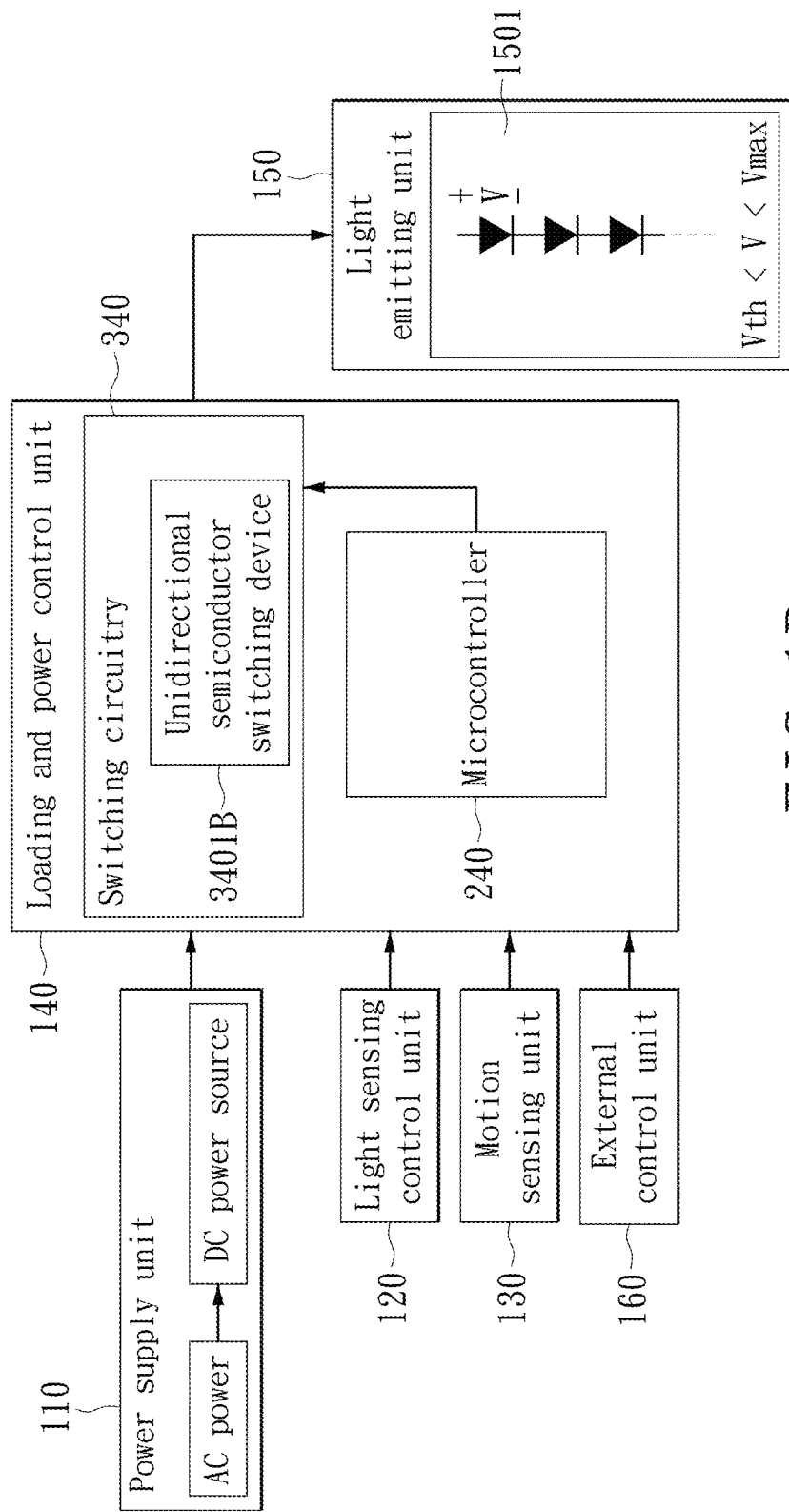
FIG. 1B is an enhanced block diagrammed under FIG. 1 to specifically illustrate an embodiment of FIG. 1 for a multi-level LED security light, wherein the loading and power control unit comprises a switching circuitry and a microcontroller, wherein the switching circuitry further comprises an unidirectional semiconductor switching device for controlling an average electric power to be delivered to the LED.

Refer to FIG. 1A and FIG. 1B, wherein the loading and power control unit 140 coupled to the light-emitting unit 150 may be implemented by a microcontroller 240 working in conjunction with a switching circuitry 340; the switching circuitry 340 electrically connected in series with the power supply unit 110 and the light-emitting unit 150 is configured with at least one semiconductor switching device which may be a bidirectional semiconductor switching device 3401A or an unidirectional semiconductor switching device 3401B, wherein the microcontroller 240 outputs a control signal to control a conduction rate of the switching circuitry 340 for determining an average electric current delivered to the light-emitting unit 150.

The loading and power control unit 140 may control illumination levels and or color temperature levels of the light-emitting unit 150 in accordance to the sensing signals respectively outputted by the light sensing control unit 120 and/or the motion sensing unit 130 or in accordance to the external control signals outputted by the external control unit 160. The light-emitting unit 150 may include a plurality of LEDs emitting light with same color temperature or with different color temperatures, wherein when the light-emitting unit is composed of LEDs emitting light with different color temperatures, the plurality of LEDs may be grouped into at least two LED loads electrically and respectively connected in parallel according to a belonging of the color temperatures. It is also possible to connect the at least two LED loads in series though in parallel connection is far more popularly used than in series connection. The loading and power control unit 140 may control the light-emitting unit 150 to generate at least two levels of illumination variations in terms of light intensities and or light color temperatures.

When the light sensing control unit 120 detects that a light intensity level of an ambient light is lower than a first predetermined value (i.e., nighttime), the loading and power control unit 140 executes the Photo-Control (PC) mode by turning on the light-emitting unit 150 to generate a first level illumination for a first predetermined time duration then to switch to a second level illumination for a second predetermined time duration for the Power-Saving (PS) mode. When the light sensing control unit 120 detects that the light intensity level of the ambient light is higher than a second predetermined value (i.e., daytime), the loading and power control unit 140 turns off the light-emitting unit 150. In the PS mode, when the motion sensing unit 130 detects a human motion, the loading and power control unit 140 may increase the average electric current which flow through the light-emitting unit 150 to generate a third level illumination for a third predetermined time duration. After the third predetermined time duration, the loading and power control unit 140 may automatically reduce the electric current that flow through the light-emitting unit 150 thus have the light-emitting unit 150 return to the second level illumination for saving energy, wherein the second predetermined time duration can be ended at any time point between dusk and dawn such as three hours, six hours after dusk, or can be programmed to be ended at dawn when the light intensity level of the ambient light is higher than the second predetermined value.

Figure 1C:
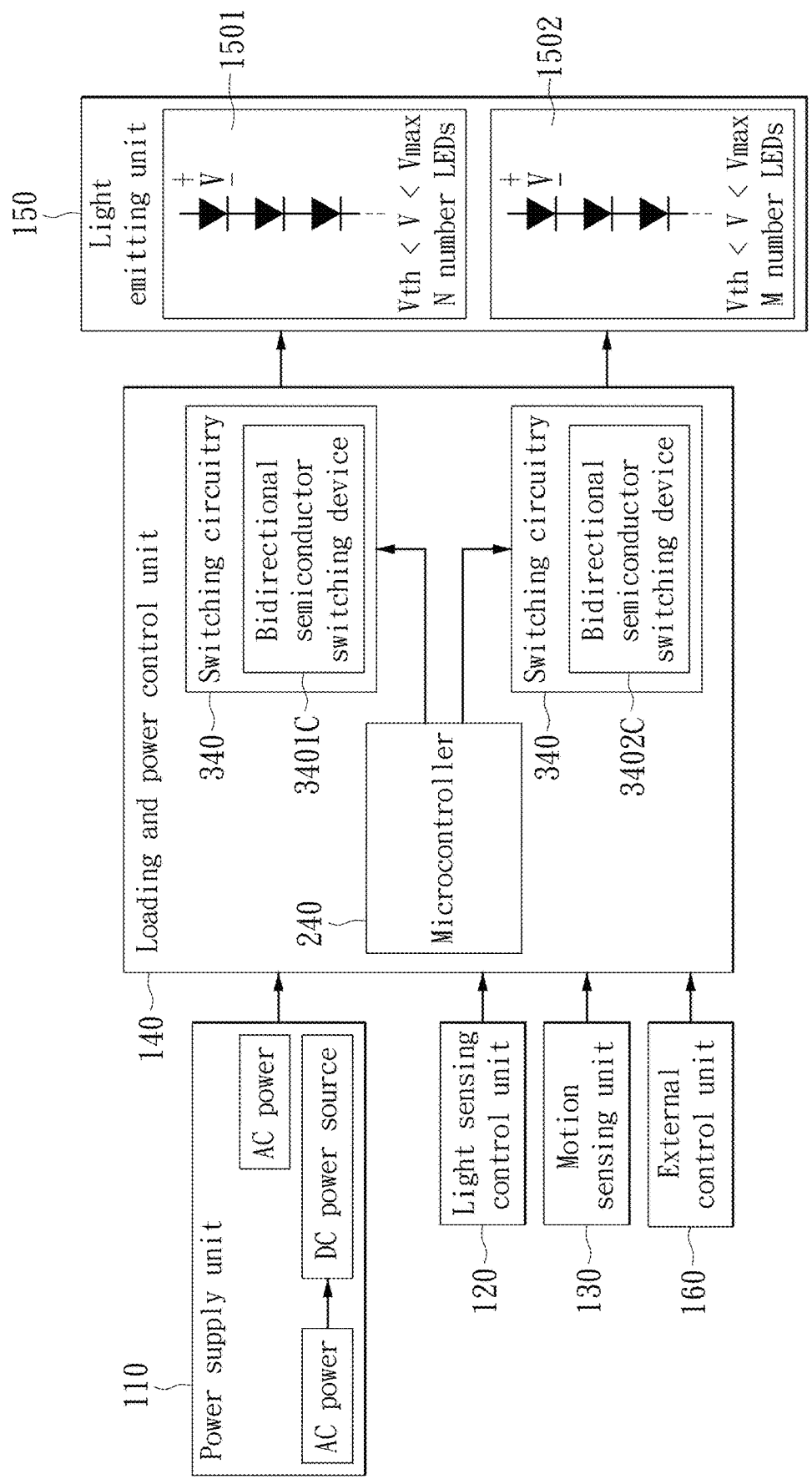
FIG. 1C is an enhanced block diagrammed under FIG. 1 to specifically illustrate an embodiment of FIG. 1 for a multi-level LED security light including a first set having N number LEDs and a second set having M number LEDs, wherein the loading and power control unit comprises a switching circuitry and a microcontroller, wherein the switching circuitry further comprises bidirectional semiconductor switching devices for controlling an average electric power to be delivered to the LED.
Figure 1D:
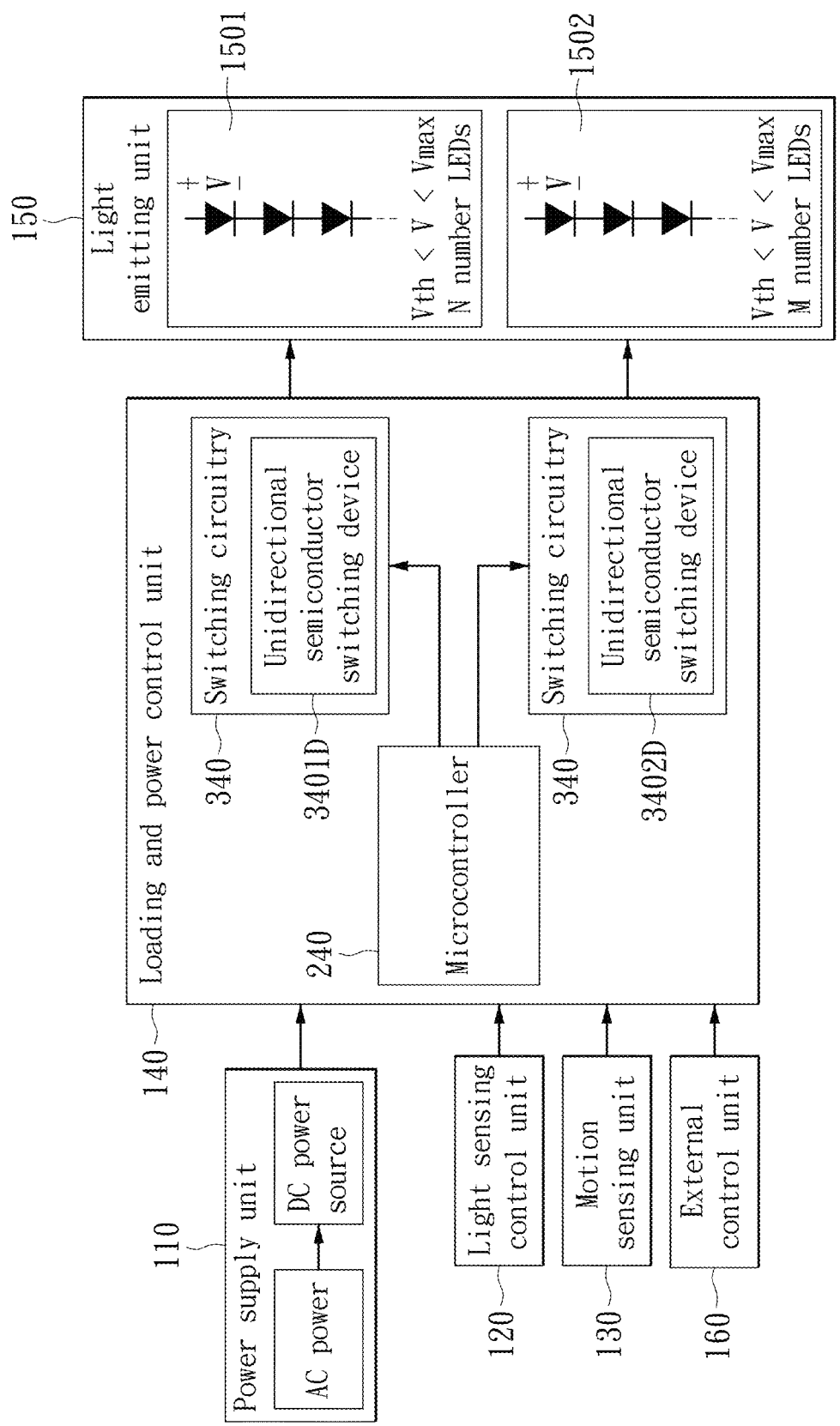
FIG. 1D is an enhanced block diagrammed under FIG. 1 to specifically illustrate an embodiment of FIG. 1 for a multi-level LED security light including a first set having N number LEDs and a second set having M number LEDs, wherein the loading and power control unit comprises a switching circuitry and a microcontroller, wherein the switching circuitry further comprises unidirectional semiconductor switching devices for controlling an average electric power to be delivered to the LED.

Refer to FIG. 1C and FIG. 1D, which respectively illustrates a schematic diagram of a multi-level LED security light in accordance with the first exemplary embodiment of the present disclosure. In FIG. 1C the light-emitting unit 150 includes two LED loads 1501 and 1502 respectively comprising N number LEDs and M number LEDs electrically and respectively connected in parallel to a switching circuitry 340 configured with two bi-directional semiconductor switching devices respectively 3401C and 3402C controlled by the microcontroller 240. In FIG. 1D the light-emitting unit 150 is configured with two DCLED loads 1501 and 1502 respectively comprising N number LEDs being a first LED load 1501 and M number LEDs being a second LED load 1502 electrically and respectively connected in parallel to a switching circuitry 340 configured with two uni-directional semiconductor switching devices respectively 3401D and 3402D controlled by the microcontroller 240; wherein when the first LED load 1501 and the second LED load 1502 are configured with same color temperature both the FIG. 1C and FIG. 1D are used for performing a multi-level LED security light to operate a light intensity tuning to perform different illumination levels respectively controlled by the light sensing control unit 120, the motion sensing unit 130 and the external control unit 160, wherein when the N number LEDs and the M number LEDs are configured with different color temperatures, for instances the N number LEDs 1501 of the light-emitting unit 150 are designed with a first color temperature in a range between 1800K and 3000K and the M number LEDs 1502 of the light-emitting unit 150 are designed with a second color temperature in a range between 4000K and 6500K, both FIG. 1C and FIG. 1D can be used for performing a color temperature tuning in addition to the light intensity tuning for operating the multi-level LED security light to mimic a natural daylight performed by the sunlight which operates both an automatic light intensity tuning and an automatic light color temperature tuning day by day from dawn to dusk. The light color temperature tuning can be designed to perform a dim to warm or a pure light color temperature tuning with a total light intensity remaining unchanged to meet various requirements of different light color temperatures for different evening activities during early evening after the office hours but before going sleep; wherein the loading and power control unit 140 operates a power allocation function to divide a given total electric power T between a first electric power X allocated to the N number LEDs and a second electric power Y allocated to the M number LEDs to obtain a weighted color temperature being a mingled light color temperature thru a light diffuser according to a color temperature tuning formula $CTapp = CT1 \cdot X/(X+Y) + CT2 \cdot Y/(X+Y)$; wherein CT1 is a value of the first color temperature of the N number LEDs and CT2 is a value of the second color temperature of the M number LEDs, wherein for tuning to a lower mingled light color temperature, the loading and power control unit 140 activated by the external control unit 160 operates to control the switching circuitry to increase the first electric power X delivered to the first LED load and at the same time to decrease the second electric power Y delivered to the second LED load with the same pace such that a sum of the first electric power X and the second electric power Y remains unchanged; wherein for tuning to a higher mingled light color temperature, the loading and power control unit 140 activated by the external control unit 160 operates to control the switching circuitry 340 to decrease the first electric power X delivered to the first LED load and at the same time to increase the second electric power Y delivered to the second LED load with the same pace such that the sum of the first electric power X and the second electric power Y remains unchanged. Additionally the loading and power control unit 140 working in conjunction with the external control unit 160 may be configured with a light color temperature switching scheme comprising a plurality of different combinations of the first electric power X and the second electric power Y to operate a pick and play process for selecting a corresponding mingled light color temperature performance in the light color temperature switching scheme.

Figure 2A:
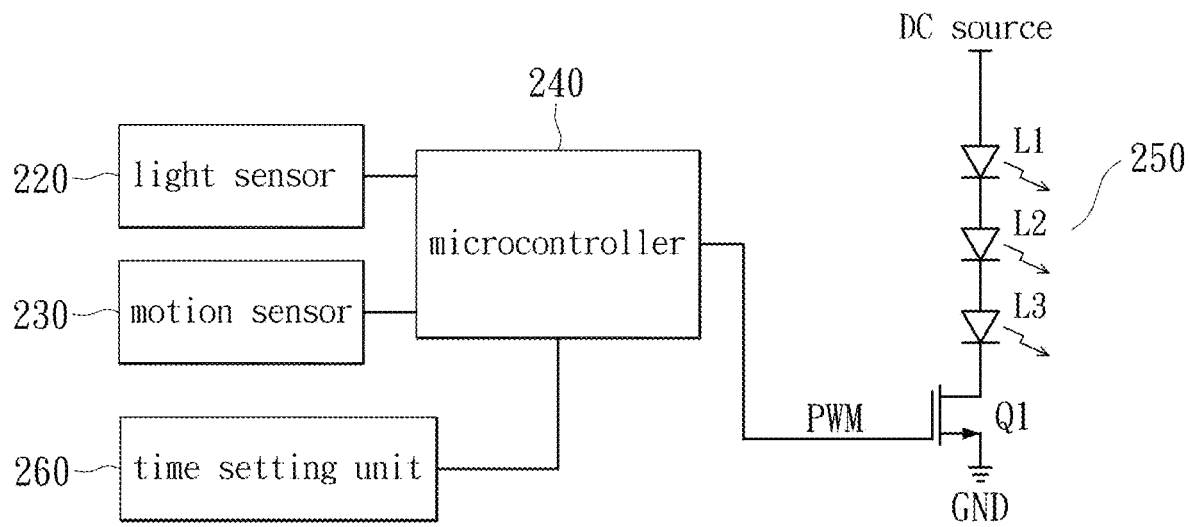
FIG. 2A illustrates a schematic diagram of a multi-level LED security light in accordance to the first exemplary embodiment of the present disclosure.

Refer to FIG. 2A, which illustrates a schematic diagram of a multi-level LED security light in accordance to the first exemplary embodiments of the present disclosure. The light sensing control unit 120 may be implemented by a light sensor 220; the motion sensing unit 130 may be implemented by a motion sensor 230; the loading and power control unit 140 may be implemented by a microcontroller 240 and a switching circuitry configured with at least one unidirectional semiconductor switching device Q1. The unidirectional semiconductor switching device is electrically connected between a DC power source of the power supply unit and a light-emitting unit 250. The light-emitting unit 250 includes at least three series-connected LEDs L1~L3. The transistor Q1 (the switching circuitry 340) is electrically connected in series with the DC power source and the light-emitting unit 250, wherein the DC source may be provided by the power supply unit 110. The transistor Q1 may be an N-channel metal-oxide-semiconductor field-effect-transistor (NMOS). The loading and power control unit 140 implemented by the microcontroller 240 may output a pulse width modulation (PWM) signal to the gate of transistor Q1 to control the average electric current. It is worth to note that the electric components depicted in FIG. 2A only serves as an illustration for the exemplary embodiment of the present disclosure and hence the present disclosure is not limited thereto.

Figure 2B:
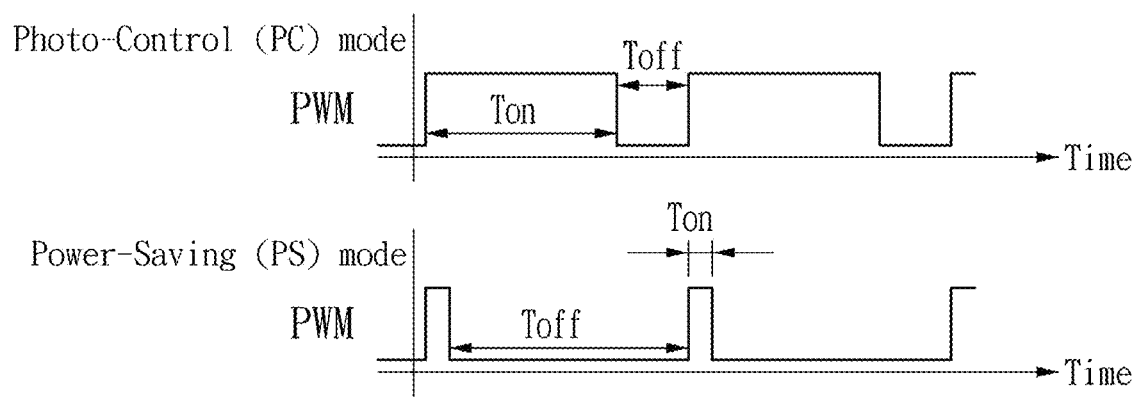
FIG. 2B graphically illustrates a timing waveform of a pulse width modulation (PWM) signal in accordance to the first exemplary embodiment of the present disclosure.

Refer to FIG. 2B concurrently, which graphically illustrates a timing waveform of a pulse width modulation (PWM) signal in accordance to the first exemplary embodiment of the present disclosure. In the PC mode, the PWM signal may be used to configure the transistor Q1 to have the conduction period $T_{on}$ being longer than the cut-off period $T_{off}$. On the other hand in the PS mode, the PWM signal may configure the transistor Q1 to have the conduction period $T_{on}$ being shorter than the cut-off period $T_{off}$. In comparison of the illumination levels between the PC and PS modes, as the conduction period $T_{on}$ of transistor Q1 being longer under the PC mode, therefore have higher average electric current driving the light-emitting unit 250 thereby generate a high illumination, which may be classified as the first level illumination; whereas as the conduction period $T_{on}$ of transistor Q1 is shorter in the PS mode, therefore have lower average electric current driving the light-emitting unit 250 thereby generate a low illumination, which may be classified as the second level illumination.

The microcontroller 240 turns off the light-emitting unit 250 during the daytime and activates the PC mode at nighttime by turning on the light-emitting unit 250 to generate the first level illumination for a first predetermined time duration then to switch to the second level illumination thereby entering the PS mode. When the motion sensor 230 detects a human motion in the PS mode, the light-emitting unit 250 may switch to a third level illumination for a higher visibility illumination or for a warning application. The light-emitting unit 250 may return to the second level illumination after maintaining at the third level illumination for a third predetermined time duration which is shorter than the first predetermined time duration and the second predetermined time duration to save energy.

In addition, the microcontroller 240 is coupled to a time setting unit 260 which is a type of external control units, wherein the time setting unit 260 may allow the user to configure at least a time length of the first predetermined time duration associated with the first level illumination, the second predetermined time duration of the second level illumination, or the third predetermined time duration of the third level illumination, however the present disclosure is not limited thereto.

Second Exemplary Embodiment

Refer again to FIG. 1, wherein the illumination variations of the light-emitting unit 150 may be implemented through the number of light-source loads being turned on to generate more than two levels of illumination. The lighting apparatus 100 in the present exemplary embodiment may be through turning on a portion of LEDs or all the LEDs to generate a first or a second level of illuminations.

Figure 3A:
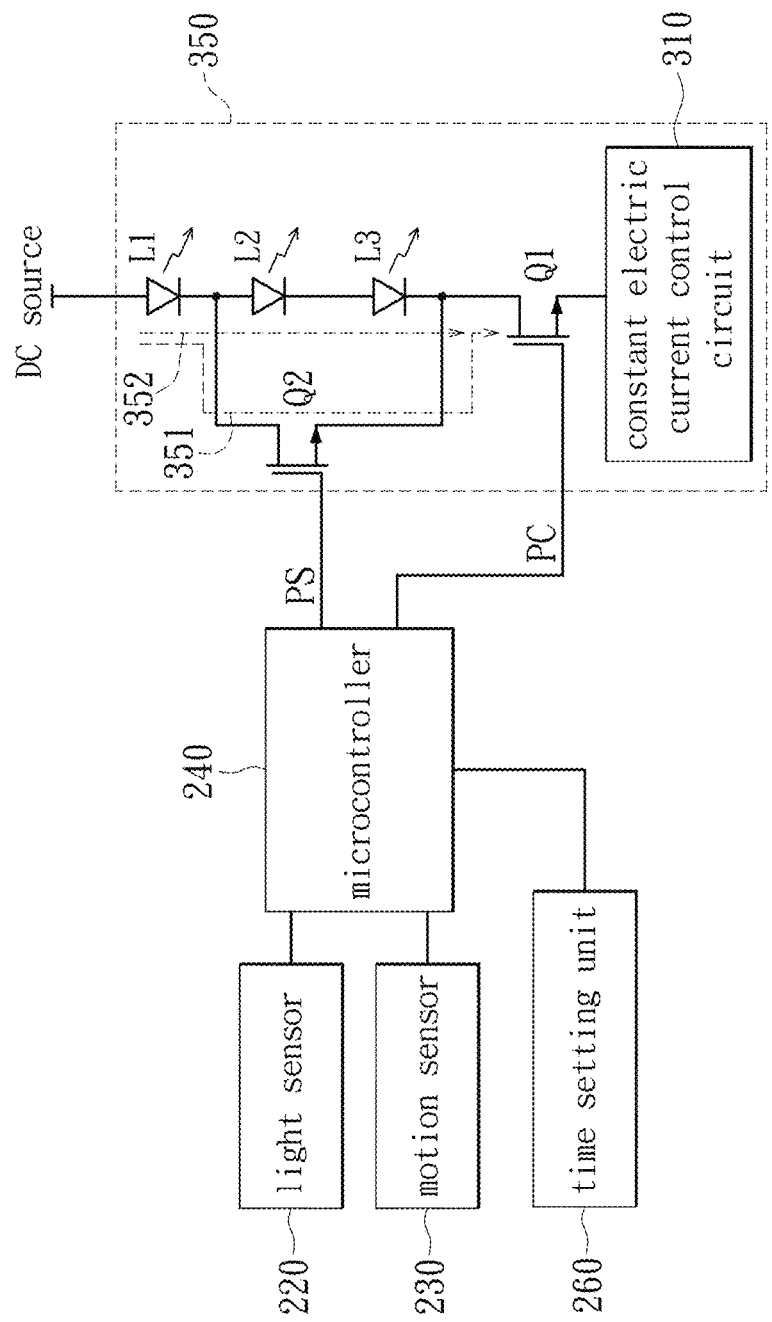
FIG. 3A illustrates a schematic diagram of a multi-level LED security light in accordance to the second exemplary embodiment of the present disclosure.

Refer to FIG. 3A concurrently, which illustrates a schematic diagram of a multi-level LED security light 100 in accordance to the second exemplary embodiment of the present disclosure. The main difference between FIG. 3A and FIG. 2A is in the light-emitting unit 350, having three series-connected LEDs L1~L3 and a switching circuitry configured with two unidirectional semiconductor switching devices Q1 and Q2. The LEDs L1~L3 are in-series connected to the transistor Q1 at same time connected to a constant electric current control circuit 310. Moreover, transistor Q2 is in-parallel connected to the two ends associated with LEDs L2 and L3. The gates of the transistors Q1 and Q2 are connected respectively to a pin PC and a pin PS of the microcontroller 240. The constant electric current control circuit 310 in the present exemplary embodiment maintains the electric current in the activated LED at a constant value, namely, the LEDs L1~L3 are operated in constant-current mode.

Refer to FIG. 3A, the pin PC of the microcontroller 240 controls the switching operations of the transistor Q1; when the voltage level of pin PC being either a high voltage or a low voltage, the transistor Q1 may conduct or cutoff, respectively, to turn the LEDs L1~L3 on or off. The pin PS of the microcontroller 240 control the switching operations of the transistor Q2, to form two current paths 351 and 352 on the light-emitting unit 350. When the voltage at the pin PS of the microcontroller 240 is high, the transistor Q2 conducts, thereby forming the current path 351 passing through the LED1 and the transistor Q2; when the voltage at the pin PS being low, the transistor Q2 is off, thereby forming the current path 352 passing through all LEDs L1~L3. The microcontroller 240 may then control the switching operations of the transistor Q2 to turn on the desired number of LEDs so as to generate a high or a low level illumination.

Figure 3B:
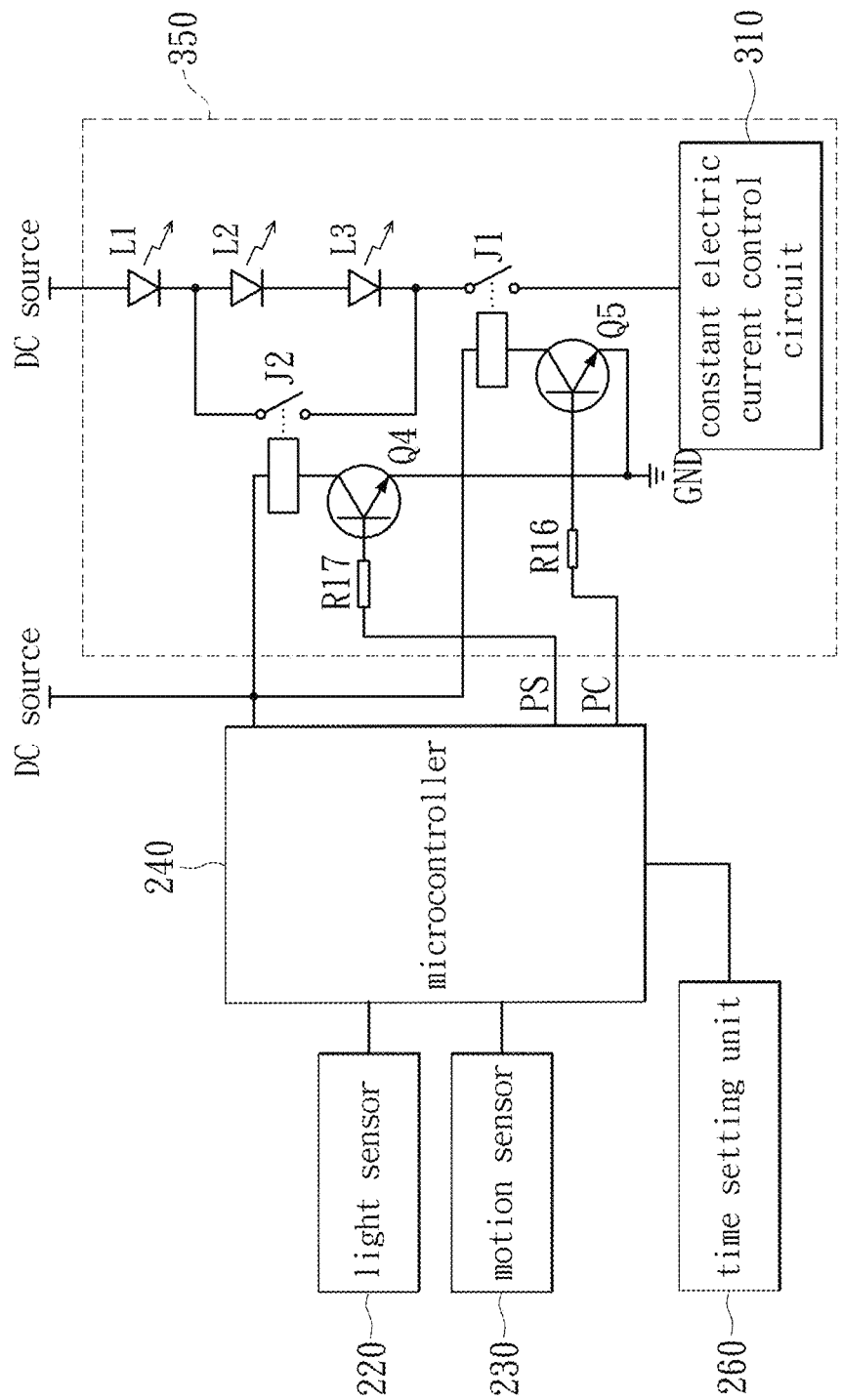
FIG. 3B illustrates a schematic diagram of a multi-level LED security light in accordance to the second exemplary embodiment of the present disclosure.

When light sensor 220 detects that a light intensity level of an ambient light is higher than a predetermined value, the microcontroller 240 through the pin PC outputs a low voltage, which causes the transistor Q1 to cut-off and turns off all the LEDs L1~L3 in the light-emitting unit 350. Conversely, when the light sensor 220 detects that the light intensity level of the ambient light is lower than the predetermined value, the microcontroller 240 activates the PC mode, i.e., outputting a high voltage from pin PC and a low voltage from pin PS, to activate the transistor Q1 while cut-off the transistor Q2, thereby forming the current path 352, to turn on the three LEDs L1~L3 in the light-emitting unit 350 so as to generate the high level illumination for a first predetermined time duration. After the first predetermined time duration, the microcontroller 240 may switch to the PS mode by having the pin PC continue outputting a high voltage and the pin PS outputting a high voltage, to have the transistor Q2 conducts, thereby forming the current path 351. Consequently, only the LED L1 is turned on and the low level illumination is generated When the motion sensor detects a human motion in the PS mode, the pin PS of the microcontroller 240 temporarily switches from the high voltage to a low voltage, to have the transistor Q2 temporarily cuts-off thus forming the current path 352 to activate all the LEDs in the light-emitting unit 350, thereby temporarily generates another high level illumination. The light-emitting unit 350 is driven by a constant electric current, therefore the illumination level generated thereof is directly proportional to the number of LEDs activated. FIG. 3B illustrates another implementation for FIG. 3A, wherein the relays J1 and J2 are used in place of NMOS transistors to serve as switches. The microcontroller 240 may control the relays J2 and J1 through regulating the switching operations of the NPN bipolar junction transistors Q4 and Q5. Moreover, resistors R16 and R17 are current-limiting resistors.

In the PC mode, the relay J1 being pulled-in while the relay J2 being bounced off to have a constant electric current driving all the LEDs L1-L3 to generate the high level illumination; in the PS mode, the relays J1 and J2 both being pulled in to have the constant electric current only driving the LED1 thus the low level illumination may be thereby generated. Furthermore, when the motion sensor 230 detects a human motion, the pin PS of the microcontroller 240 may temporarily switch from a high voltage to a low voltage, forcing the relay J2 to temporarily bounce off and the relay J1 is pulled-in so as to temporarily generate the high level illumination.

The LED L1 may adopt an LED having a color temperature in a range between 1800K and 3000K, while the LEDs L2 and L3 may adopt LEDs having a color temperature between 4000K and 6500K in order to increase a contrast between the high level illumination and the low level illumination. The number of LEDs included in the light-emitting unit 350 may be more than three. The transistor Q2 may be in parallel to the two ends associated with a plurality of LEDs to adjust the illumination difference between the high level illumination and the low level illumination. Additionally, the light-emitting unit 350 may include a plurality of transistors Q2, which are respectively coupled to the two ends associated with each LED to provide more illumination variations for selection. The microcontroller 240 may decide the number of LEDs to turn on in accordance to design needs at different conditions. Based on the explanation of the aforementioned exemplary embodiment, those skilled in the art should be able to deduce other implementations and further descriptions are therefore omitted.

Third Exemplary Embodiment

Refer back to FIG. 1, wherein the light-emitting unit 150 may include a phase controller and one or more in-parallel connected alternating current (AC) LEDs. The phase controller is coupled between the described one or more parallel-connected ACLEDs and AC power source. The loading and power controller 140 in the present exemplary embodiment may through the phase controller adjust the average power of the light-emitting unit 150 so as to generate variations in the low level and the high level illuminations.

Figure 4A:
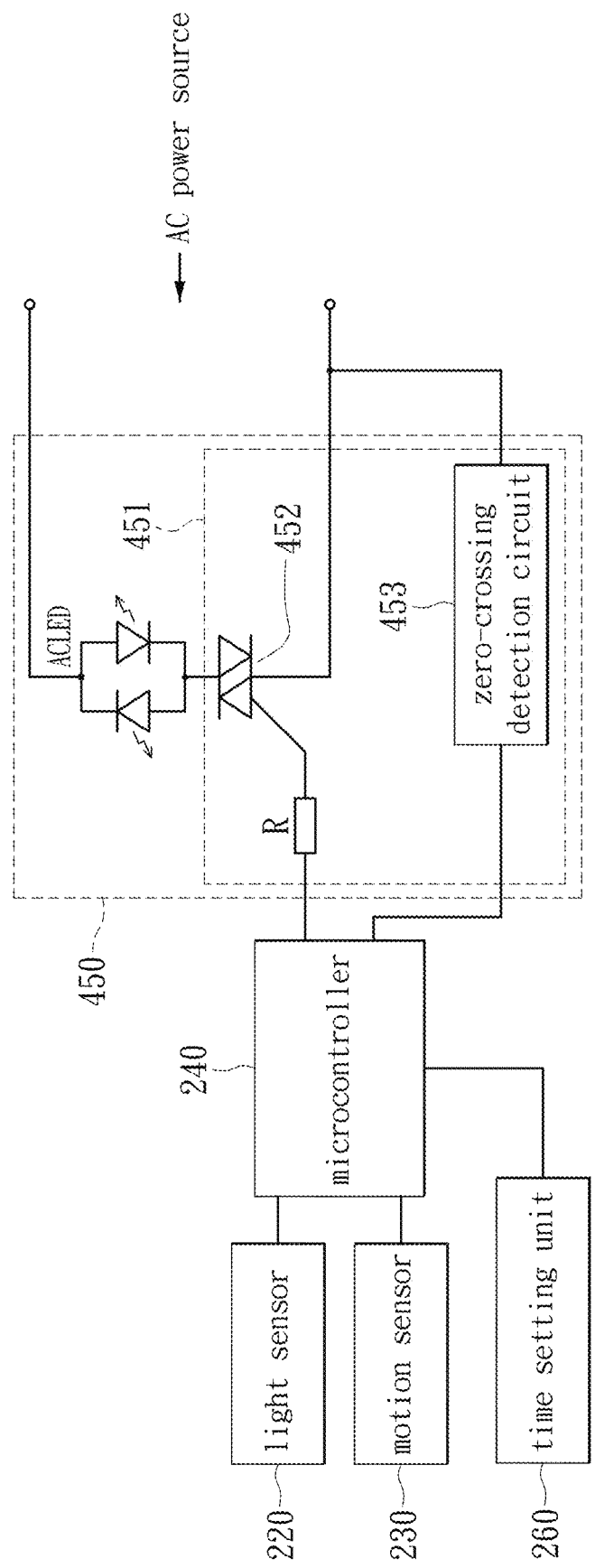
FIG. 4A illustrates a schematic diagram of a multi-level LED security light in accordance to the third exemplary embodiment of the present disclosure.

Refer to FIG. 4A, which illustrates a schematic diagram of a multi-level LED security light 100 in accordance to the third exemplary embodiment of the present disclosure. The main difference between FIG. 4A and FIG. 3 is in that the light-source load is an ACLED, which is coupled to the AC power source, and the switching circuitry is configured with a phase controller 451. The phase controller 451 includes a bi-directional switching device 452, here, a triac, a zero-crossing detection circuit 453, and a resistor R. The microcontroller 240 turns off the light-emitting unit 450 when the light sensor 220 detects that a light intensity level of an ambient light is higher than a predetermined value. Conversely, when the light sensor 220 detects that the light intensity level of the ambient light is lower than the predetermined value, the microcontroller 240 activates the PC mode by turning on the light-emitting unit 450. In the PC mode, the microcontroller 240 may select a control pin for outputting a pulse signal which through a resistor R triggers the triac 452 to have a large conduction angle. The large conduction angle configures the light-emitting unit 450 to generate a high level illumination for a predetermined time duration. Then the microcontroller 240 outputs the pulse signal for PS mode through the same control pin to trigger the triac 452 to have a small conduction angle for switching the light-emitting unit 450 from the high level illumination to a low level illumination of the PS mode. Moreover, when the motion sensor 230 (also called motion sensing unit) detects a human motion in the PS mode, the microcontroller 240 temporarily outputs another pulse signal through the same control pin to have the light-emitting unit 450 generated another high level illumination for a short predetermined time duration. After the short predetermined time duration, the light-emitting unit 450 returns to the low level illumination.

In the illumination control of the ACLED, the microcontroller 240 may utilize the detected zero-crossing time (e.g., the zero-crossing time of an AC voltage waveform) outputted from the zero-crossing detection circuit 453 to send an AC synchronized pulse signal thereof which may trigger the triac 452 of the phase controller 451 thereby to change the average power input to the light-emitting unit 450. As the ACLED has a cut-in voltage $V_t$ for start conducting, thus if the pulse signal inaccurately in time triggers the conduction of the triac 452, then the instantaneous value of AC voltage may be lower than the cut-in voltage $V_t$ of ACLED at the trigger pulse. Consequently, the ACLED may result in the phenomenon of either flashing or not turning on. Therefore, the pulse signal generated by the microcontroller 240 must fall in a proper time gap behind the zero-crossing point associated with the AC sinusoidal voltage waveform. Supposing an AC power source having a voltage amplitude $V_m$ and frequency f, then the zero-crossing time gap $t_D$ of the trigger pulse outputted by the microcontroller 240 should be limited according to $t_o < t_D < \frac{1}{2}f - t_o$ for a light-source load with a cut-in voltage $V_t$, wherein $t_o = (\frac{1}{2}\pi f)\sin^{-1}(V_t/V_m)$. The described criterion is applicable to all types of ACLEDs to assure that the triac 452 can be stably triggered in both positive and negative half cycle of the AC power source. Take ACLED with $V_t(rms)=80V$ as an example, and supposing the $V_m(rms)=110V$ and f=60 Hz, then $t_o=2.2$ ms and $(\frac{1}{2}f)=8.3$ ms may be obtained. Consequently, the proper zero-crossing time gap $t_D$ associated with the phase modulation pulse outputted by the microcontroller 240 which lagged the AC sinusoidal voltage waveform should be designed in the range of 2.2 ms<$t_D$<6.1 ms.

Figure 4B:
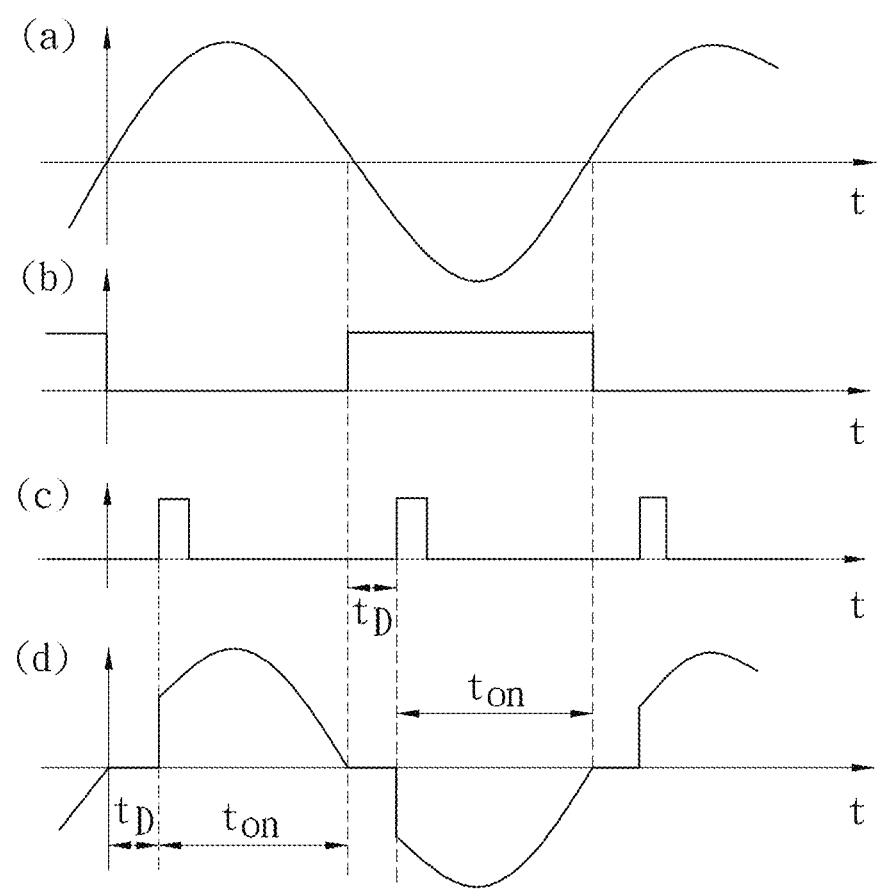
FIG. 4B illustrates a timing waveform of multi-level LED security light in accordance to the third exemplary embodiment of the present disclosure.

Refer to FIG. 4B, which illustrates a timing waveform of the multi-level LED security light in accordance to the third exemplary embodiment of the present disclosure. Waveforms (a)~(d) of FIG. 4B respectively represent the AC power source, the output of the zero-crossing detection circuit 453, the zero-crossing delay pulse at the control pin of the microcontroller 240, and the voltage waveform across the two ends of the ACLED in the light-emitting unit 450. The zero-crossing detection circuit 453 converts the AC voltage sinusoidal waveform associated with the AC power source to a symmetric square waveform having a low and a high voltage levels as shown in FIG. 4B(b). At the zero-crossing point of the AC voltage sinusoidal wave, the symmetric square waveform may transit either from the low voltage level to the high voltage level or from the high voltage level to the low voltage level. Or equivalently, the edge of the symmetric square waveform in the time domain corresponds to the zero-crossing point of the AC voltage sinusoidal waveform. As shown in FIG. 4B(c), the microcontroller 240 outputs a zero-crossing delay pulse in correspondence to the zero-crossing point of the AC sinusoidal waveform in accordance to the output waveform of the zero-crossing detection circuit 453. The zero-crossing delay pulse is relative to an edge of symmetric square waveform behind a time gap $t_D$ in the time domain. The $t_D$ should fall in a valid range, as described previously, to assure that the triac 452 can be stably triggered thereby to turn on the ACLED. FIG. 4B(d) illustrates a voltage waveform applied across the two ends associated with the ACLED. The illumination level of the light-emitting unit 450 is related to the conduction period $t_{on}$ of the ACLED, or equivalently, the length $t_{on}$ is directly proportional to the average power inputted to the ACLED. The difference between the PC mode and the PS mode being that in the PC mode, the ACLED has longer conduction period, thereby generates the high level illumination; whereas in the PS mode, the ACLED conduction period is shorter, hence generates the low level illumination.

Figure 5:
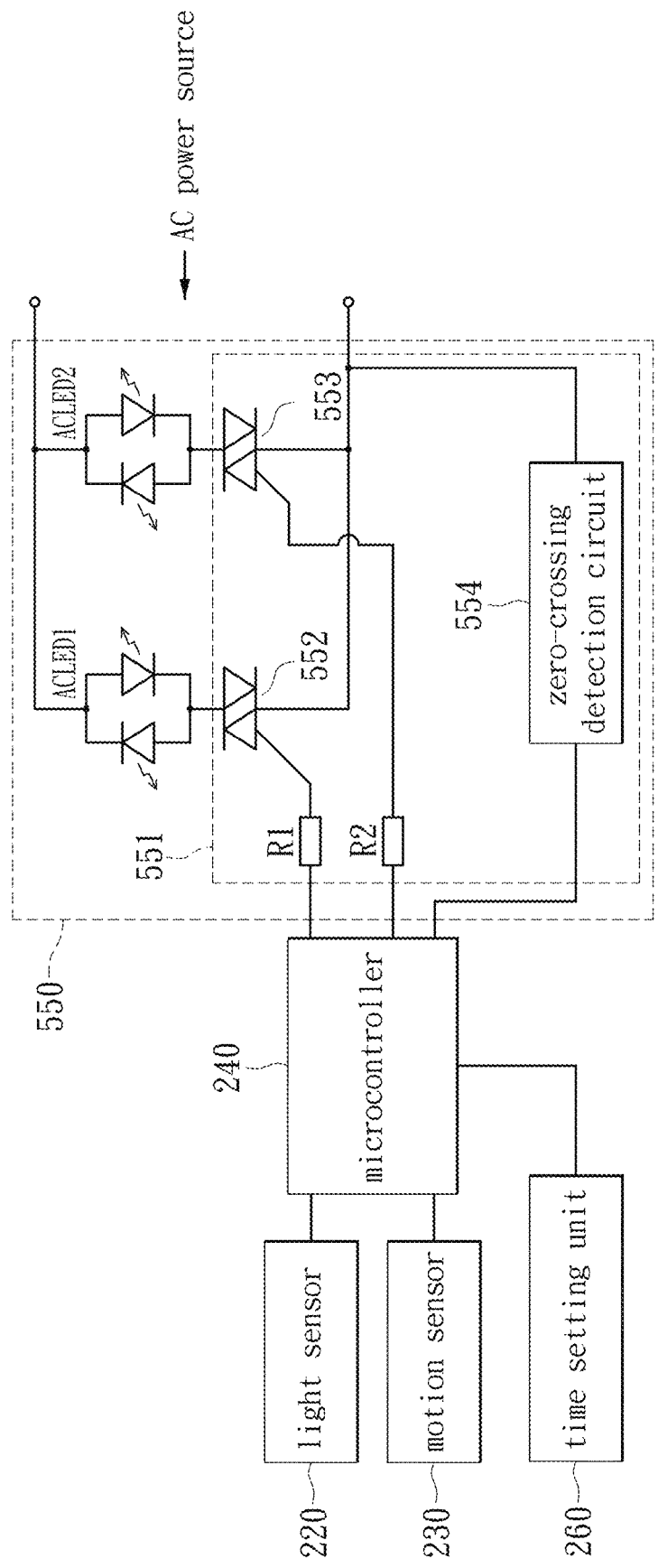
FIG. 5 illustrates a schematic diagram of a multi-level LED security light in accordance to the third exemplary embodiment of the present disclosure.

Refer to FIG. 5, which illustrates a schematic diagram of a multi-level LED security light 100 in accordance to the third exemplary embodiment of the present disclosure. The light-emitting unit 550 of the lighting apparatus 100 includes an ACLED1, an ACLED2, and a phase controller 551. The phase controller 551 includes triacs 552 and 553, the zero-crossing detection circuit 554 as well as resistors R1 and R2. The light-emitting unit 550 of FIG. 5 is different from the light-emitting unit 450 of FIG. 4 in that the light-emitting unit 550 has more than one ACLEDs and more than one bi-directional switching device. Furthermore, the color temperatures of the ACLED1 and the ACLED2 may be selected to be different.

In the exemplary embodiment of FIG. 5, the ACLED1 has a high color temperature, and the ACLED2 has a low color temperature. In the PC mode, the microcontroller 240 uses the phase controller 551 to trigger both ACLED1 and ACLED2 to conduct for a long period, thereby to generate the high level illumination as well as illumination of mix color temperature. In the PS mode, the microcontroller 240 uses the phase controller 551 to trigger only the ACLED2 to conduct for a short period, thereby generates the low level illumination as well as illumination of low color temperature. Moreover, in the PS mode, when the motion sensor 230 detects a human motion, the microcontroller 240 may through the phase controller 551 trigger the ACLED1 and ACLED2 to conduct for a long period. Thereby, it may render the light-emitting unit 450 to generate the high level illumination of high color temperature and to produce high contrast in illumination and hue, for a short predetermined time duration to warn the intruder. Consequently, the lighting apparatus may generate the high level or the low level illumination of different hue. The rest of operation theories associated with the light-emitting unit 550 are essentially the same as the light-emitting unit 450 and further descriptions are therefore omitted.

Fourth Exemplary Embodiment

Figure 6:
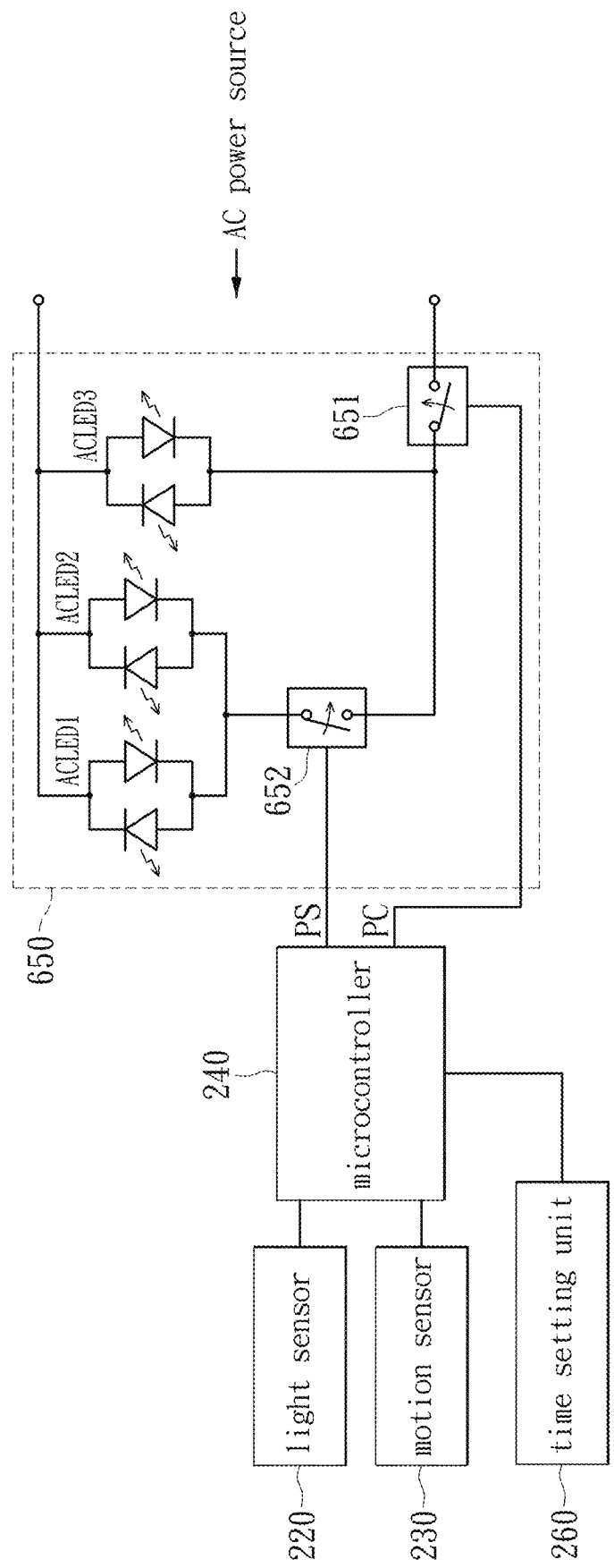
FIG. 6 illustrates a schematic diagram of a multi-level LED security light in accordance to the fourth exemplary embodiment of the present disclosure.

Refer to FIG. 6, which illustrates a schematic diagram of a multi-level LED security light 100 in accordance to the fourth exemplary embodiment of the present disclosure. The light-emitting unit 150 of FIG. 1 may be implemented by the light-emitting unit 650, wherein the light-emitting unit 650 includes three ACLED1~3 having identical luminous power as well as switches 651 and 652. In which, switches 651 and 652 may be relays. The parallel-connected ACLED1 and ACLED2 are series-connected to the switch 652 to produce double luminous power and of which the ACLED3 is parallel connected to, to generate triple luminous power, and of which an AC power source is further coupled to through the switch 651. Moreover, the microcontroller 240 implements the loading and power control unit 140 of FIG. 1. The pin PC and pin PS are respectively connected to switches 651 and 652 for outputting voltage signals to control the operations of switches 651 and 652 (i.e., open or close).

In the PC mode, the pin PC and pin PS of the microcontroller 240 control the switches 651 and 652 to be closed at same time. Consequently, the ACLED1~3 are coupled to the AC power source and the light-emitting unit 650 may generate a high level illumination of triple luminous power. After a short predetermined time duration, the microcontroller 240 returns to PS mode. In which the switch 651 is closed while the pin PS controls the switch 652 to be opened, consequently, only the ACLED3 is connected to AC power source, and the light-emitting unit 650 may thus generate the low level illumination of one luminous power. In the PS mode, when the motion sensor 230 detects a human motion, the microcontroller 240 temporarily closes the switch 652 to generate high level illumination with triple luminous power for a predetermined time duration. After the predetermined time duration, the switch 652 returns to open status thereby to generate the low level illumination of one luminous power. The lighting apparatus of FIG. 6 may therefore through controlling switches 651 and 652 generate two level illuminations with illumination contrast of at least 3 to 1.

The ACLED1 and ACLED2 of FIG. 6 may be high power lighting sources having a color temperature in a range between 4000K and 6500K. The ACLED3 may be a low power lighting source having a color temperature between 1800K and 3000K. Consequently, the ACLED may generate two levels of illuminations with high illumination and hue contrast without using a zero-crossing detection circuit.

Fifth Exemplary Embodiment

Figure 7:
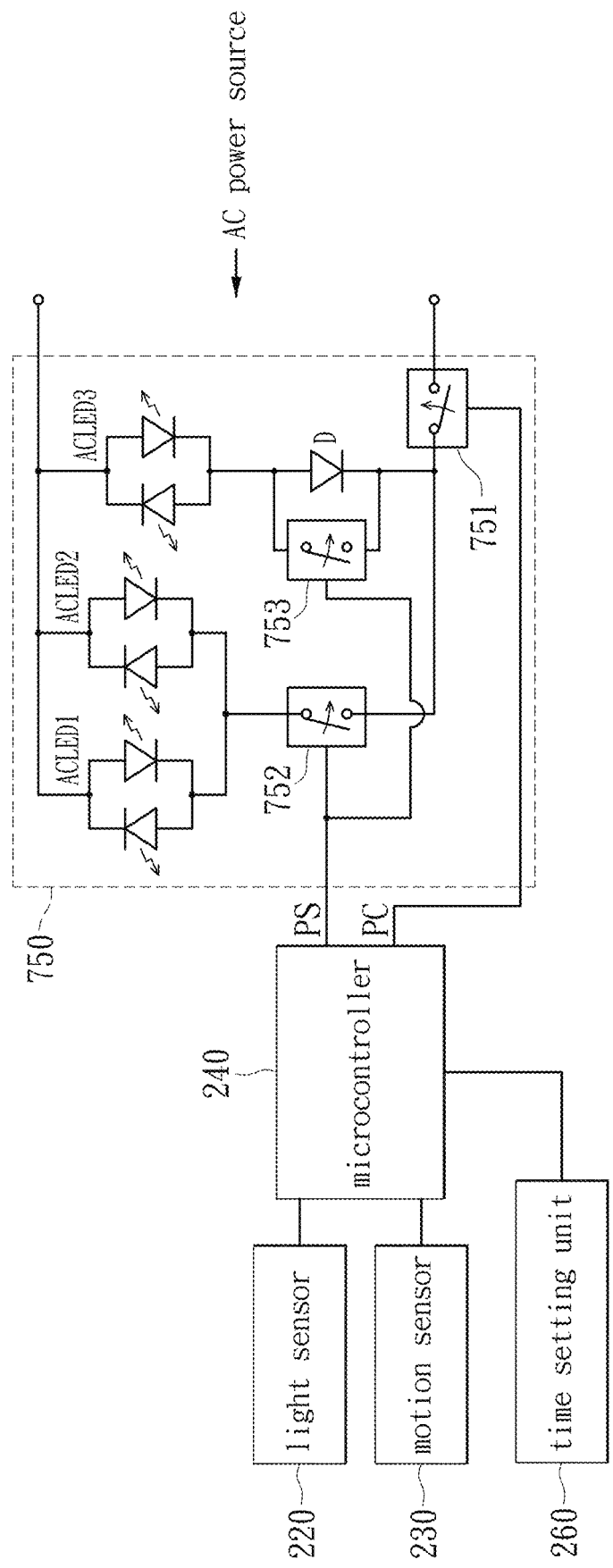
FIG. 7 illustrates a schematic diagram of a multi-level LED security light in accordance to the fifth exemplary embodiment of the present disclosure.
Figure 8A:
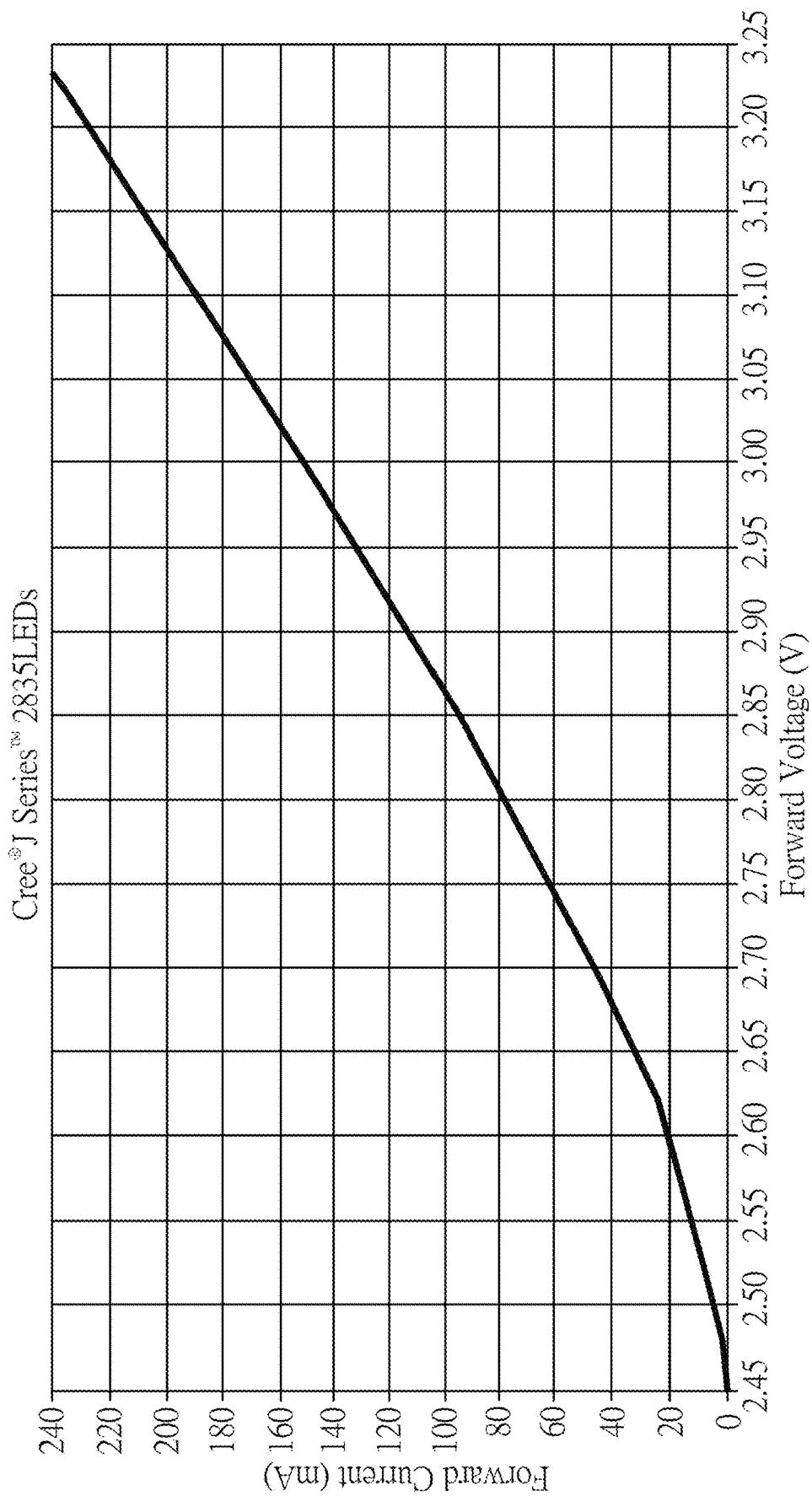
FIGS. 8A, 8B, 8C and 8D schematically and respectively show V-I relationship charts (Forward Current vs. Forward Voltage) for a phosphor based white LED chip from each of 4 different LED manufacturers.
Figure 8B:
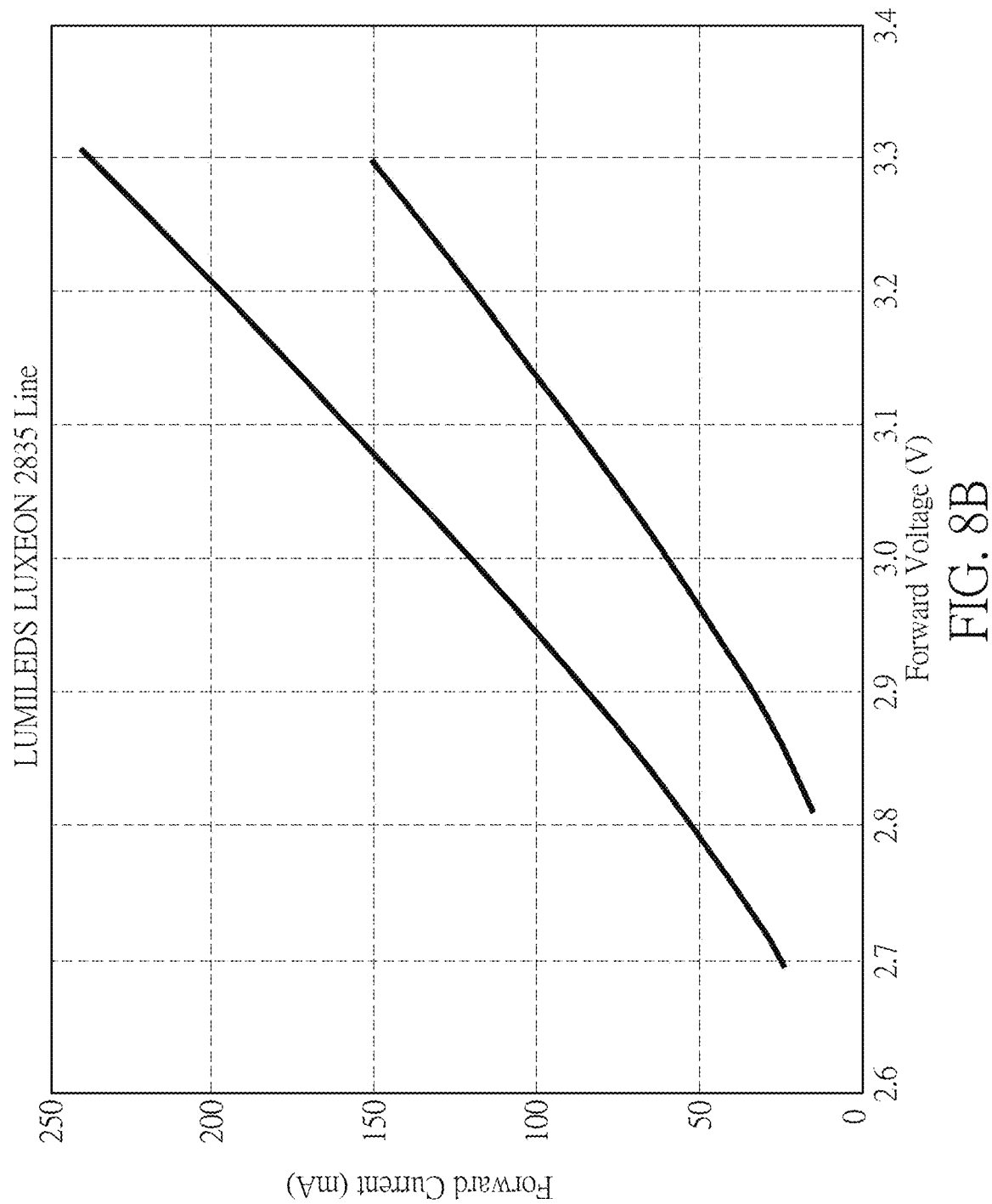
Figure 8C:
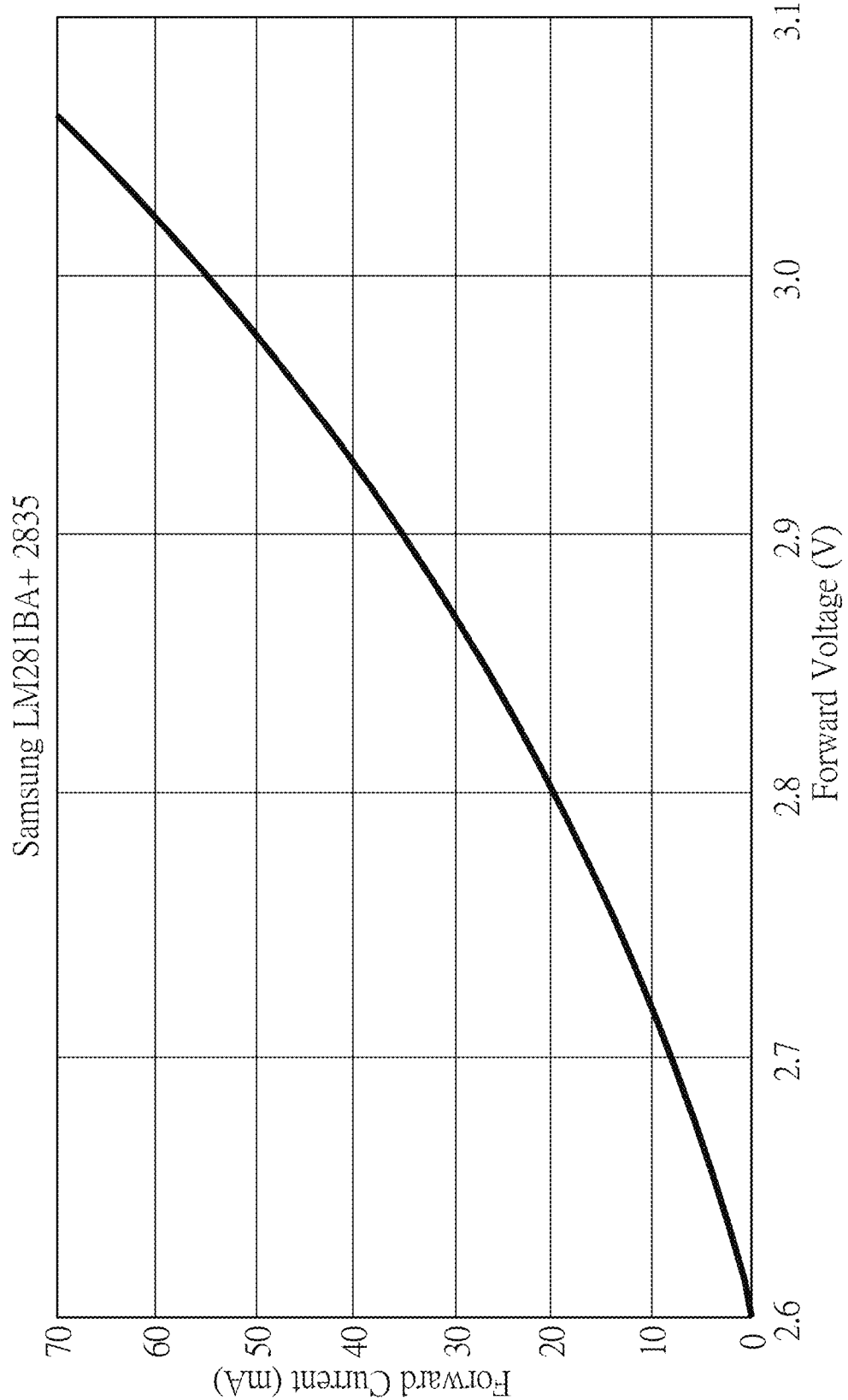
Figure 8D:
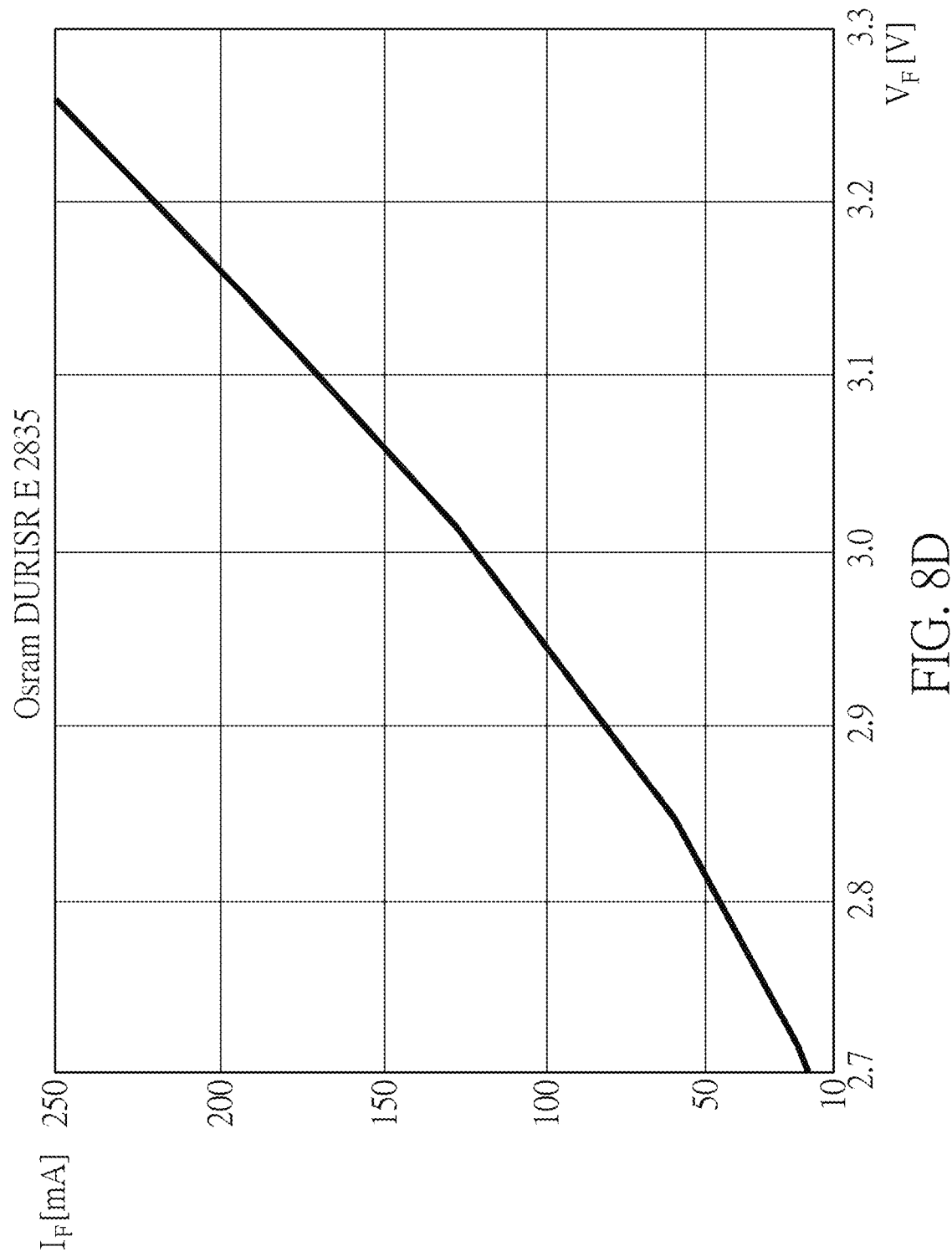

Refer to FIG. 7, which illustrates a schematic diagram of a multi-level LED security light in accordance to the fifth exemplary embodiment of the present disclosure. The light-emitting unit 750 of FIG. 7 is different from the light-emitting unit 640 of FIG. 6 in that the ACLED3 is series-connected to a circuit with a rectified diode D and a switch 753 parallel-connected together, and of which is further coupled through a switch 751 to AC power source. When the switch 753 closes, the AC electric current that passes through the ACLED3 may be a full sinusoidal waveform. When the switch 753 opens, the rectified diode rectifies the AC power, thus only one half cycle of the AC electric current may pass through the ACLED, consequently the luminous power of ACLED3 is cut to be half.

The pin PS of the microcontroller 240 synchronously controls the operations of switches 752 and 753. If the three ACLED1~3 have identical luminous power, then in the PC mode, the pin PC and pin PS of the microcontroller 240 synchronously close the switches 751~753 to render ACLED1~3 illuminating, thus the light-emitting unit 750 generates a high level illumination which is three-times higher than the luminous power of a single ACLED. When in the PS mode, the microcontroller 240 closes the switch 751 while opens switches 752 and 753. At this moment, only the ACLED3 illuminates and as the AC power source is rectified by the rectified diode D, thus the luminous power of ACLED3 is half of the AC power source prior to the rectification. The luminous power ratio between the high level and the low level illuminations is therefore 6 to 1. Consequently, strong illumination contrast may be generated to effectively warn the intruder.

It should be noted that the light-emitting unit in the fifth exemplary embodiment is not limited to utilizing ACLEDs. In other words, the light-emitting unit may include any AC lighting sources such as ACLEDs, incandescent lamps, or fluorescent lamps.

When the light source of the light-emitting unit 150 is confined to the use of an LED load, the compliance and satisfaction of a voltage operating constraint attributable to the unique electrical characteristics of the LED load is vital to a successful performance of an LED lighting device. Any LED lighting device failing to comply with the voltage operating constraint of the unique electrical characteristics is bound to become a failure art. This is because the LED as a kind of solid state light source has completely different electrical characteristics for performing light emission compared with conventional light source such as incandescent bulbs or fluorescent bulbs.

For instance, for a phosphor based white light LED, there exists a very narrow voltage domain ranging from a threshold voltage at around 2.5 volts to a maximum operating voltage at around 3.5 volts, which allows the LEDs to operate adequately and safely; in other words, when a forward voltage imposed on the LED is lower than the threshold voltage, the LED is not conducted and therefore no light is emitted, when the forward voltage exceeds the maximum operating voltage, the heat generated by a forward current could start damaging the construction of the LED. Therefore, the forward voltage imposed on the LED is required to operate between the threshold voltage and the maximum operating voltage. In respect to the LED load of the light-emitting unit 150, the cut-in voltage $V_t$ of ACLEDs is technically also referred to as the threshold voltage attributable to PN junctions manufactured in LEDs. More specifically, the LED is made with a PN junction semiconductor structure inherently featured with three unique electrical characteristics, the first characteristic is one-way electric conduction through the PN junction fabricated in the LED, the second electrical characteristic is a threshold voltage $V_{th}$ required to trigger the LED to start emitting light and the third electrical characteristic is a maximum operating voltage $V_{max}$ allowed to impose on the LED to avoid a thermal runaway to damage or burn out the semiconductor construction of the LED. The described cut-in voltage $V_t$ has the same meaning as the above mentioned threshold voltage $V_{th}$ which is a more general term to be used for describing the second electrical characteristic of a PN junction semiconductor structure. Also because the cut-in voltage $V_t$ is specifically tied to forming a formula to transform the threshold voltage into a corresponding time phase of AC power for lighting control, it is necessary to use the term $V_{th}$ as a neutral word for describing the LED electrical characteristics to avoid being confused with the specific application for ACLED alone. Additionally, it is to be clarified that the term Vm is related to the amplitude of the instant maximum voltage of an AC power source which has nothing to do with the third electrical characteristic $V_{max}$ of an LED load.

An LED chip is a small piece of semiconductor material with at least one LED die manufactured inside the semiconductor material. A plurality of LED dies may be manufactured and packaged inside an LED chip for different levels of wattage specification to meet different illumination need. The LED die can also be designed with a larger size of PN junction such that a higher forward current can be generated for higher wattage applications without damaging the LED structure but in such case less quantity of LED dies can be produced from each wafer. For each LED chip designed with a different level of wattage specification there always exists a narrow voltage domain $V_{th}<V<V_{max}$, wherein V is a voltage across each LED chip, wherein $V_{th}$ is the threshold voltage to enable the LED chip to start emitting light and $V_{max}$ is the maximum operating voltage imposed on the LED chip to avoid the LED chip from being damaged or burned out by the heat generated by the high operating voltage at $V_{max}$. Such voltage constraints are attributable to the different semiconductor materials used, different manufacturing and packaging processes employed. Although the values of threshold voltage and maximum operating voltage may vary within a narrow dispersion of distribution among LEDs produced from different manufacturers, they can be represented by some reference values which are learned from cumulation of manufacturing and practicing experiences by the LED manufacturers. The reference values are necessary and useful to serve as guidelines for designing LED driver to ensure an LED voltage bin selected does comply with the narrow voltage domain $V_{th}<V<V_{max}$ for generating a constant forward current to produce a designated light intensity.

LED chips are batch-produced by wafers and each wafer is designed to produce a large quantity of LED chips which may respectively require different forward voltages within a narrow distribution range for generating a designated constant forward current. For instance if a batch of #2835 0.5 watt LED chips are used to generate a designated forward current at 150 mA, among the batch of LED chips produced from the same manufacturer, there exists a distribution range of required forward voltages from 2.9 volts (Minimum Forward Voltage, $V_{FMIN}$) to 3.3 volts (Maximum Forward Voltage, $V_{FMAX}$) to generate the same designated forward current, the batch of LED chips is further divided and grouped by the manufacturer into a few voltage bins with each voltage bin having a much smaller subrange of forward voltages bounded by a bin minimum forward voltage $V_{BMIN}$ and a bin maximum forward voltage $V_{BMAX}$ for generating the same designated constant forward current. For instance the distribution range may be divided into four voltage bins with a first bin accommodating a forward voltage subrange from 2.9 volts to 3.0 volts, a second bin accommodating a forward voltage subrange from 3.0 volts to 3.1 volts, a third bin accommodating a forward voltage subrange from 3.1 volts to 3.2 volts, and a fourth bin accommodating a forward voltage subrange from 3.2 volts to 3.3 volts. The LED chips grouped in the first bin belong to the most efficient LED chips produced from the wafer as they only need lowest forward voltages to generate same designated constant forward current, then followed by the second bin, then followed by the third bin and then the fourth bin being the least efficient LED chips produced by the wafer as they need highest forward voltages to generate same forward current. LED manufacturers sell LED chips by voltage bins with each voltage bin containing a plurality of LED chips which requires different forward voltages to generate a designated constant forward current for emitting light. Such division of LED chips by voltage bins is necessitated in order to minimize a volatility of forward voltages for generating a designated constant forward current in a circuit design. Otherwise a large swing of forward voltages between the maximum forward voltage $V_{FMAX}$ and the minimum forward voltage $V_{FMIN}$ could easily cause an LED load fail because the $V_{FMAX}$ required for driving the least efficient LED chips of the fourth bin could be too high for the most efficient chips of the first bin resulting into different brightness performances and shorten LED lifetime among LED chips which could also cause LED load damaged since all LED chips are connected in series and/or in parallel. In other words without dividing the forward voltages by voltage bins it would be more difficult to design a heat sink to manage the pin temperatures of the LED chips at a stable level equal to or below 80 degree centigrade such that the LED chips are operated in safety range without thermal damage. Generally speaking LED bins with lower forward voltages can be priced higher than LED bins with higher forward voltages. Both the bin minimum forward voltage $V_{BMIN}$ and the bin maximum forward voltage $V_{BMAX}$ in each bin selected are required to comply with voltage operating constraint $V_{th}<V<V_{max}$, wherein V is a variable of forward voltage in the subrange of the voltage bin selected, wherein $V_{th}$ is a reference value of a threshold voltage required to trigger each LED in the batch of LED chips produced from the manufacturer to emit light and $V_{max}$ is a reference value of a maximum operating voltage across each LED in the batch of LEDs from the manufacturer at which the LED is vulnerable to a thermal damage. Please notice $V_{BMIN}$ and $V_{BMAX}$ respectively represent the lowest forward voltage and the highest forward voltage among the batch of LED chips for a selected voltage bin produced by the LED manufacturer to generate a designated constant forward current for outputting a designated lumens whereas the threshold voltage $V_{th}$ and the maximum operating voltage $V_{max}$ respectively refer to a minimum forward voltage to trigger any LED chip to start generating a forward current and a maximum forward voltage at which the LED chip is possibly vulnerable to a thermal damage caused by a high forward current.

In the semiconductor industry including the LED, the values of electrical parameters which characterize the natural inherent properties of semiconductor materials often are not precise or fixed, they always come with a range of distribution with a narrow dispersion, namely a narrow range represented by a reference value. This is similar to the fact that although body temperatures of people vary differently they are actually bounded in a narrow dispersion range from approximately 34 degree centigrade to 37 degree centigrade, if a person's body temperature is way outside of such small dispersion range then this person is most likely sick. Further when a person's body temperature become higher than 40 degree centigrade for a period of time his brain could be thermally damaged by the high body temperature, which is similar to a case when an LED construction being vulnerable to a thermal damage when a voltage drop across the LED is always higher than the maximum operating voltage $V_{max}$ at 3.5 volts. For semiconductor devices in different categories of applications such as silicon based diode versus compound semiconductors based LED such as GaAs or GaP, their respective values of electrical parameters have very different distribution ranges though they all have the common features of having to operate in a conduction period between different threshold voltages and different maximum operating voltages. For semiconductor devices in the same category of application, the values are also different among different manufacturers though the variation ranges are much smaller and more convergent and predictable. Even the same white light LED chips produced from the same wafer there still exists a small yet predictable variation range of distribution as disclosed in the above descriptions for Cree 2835 LED about the structure of the LED voltage bins. They are just the natural inherent properties of semiconductor materials that the electrical parameters of semiconductor materials can not be represented by fixed values instead they always come with ranges of probability distribution with a narrow dispersion. With the above explanations being disclosed it is necessary to interpret or define the threshold voltage being a narrow interval represented by a reference value plus a small tolerance e.g. 5% to 10%, or the reference ranges, therefore the reference value of threshold voltage at 2.5 volts if with 5% tolerance would mean 2.5 volts+5%×2.5 volts=2.625 volts and the reference value of maximum operating voltage at 3.5 volts would mean 3.5 volts−5%×3.5 volts=3.325 volts, therefore the forward voltage V is interpretably operated as 2.5 volts<2.625 volts<V<3.325 volts<3.5 volts.

When an LED load of an LED lighting device is configured with a plurality of N pieces of LEDs electrically connected in series or N sets of in parallel connected LEDs electrically connected in series, a working voltage $V_N$ imposed on the LED load is therefore required to be in a range between $N \times V_{th}$ and $N \times V_{max}$, namely, $N \times V_{th} < V_N < N \times V_{max}$, wherein N is a positive integer greater than or equal to 2.

When the plurality of LEDs are white light LEDs produced by coating at least one phosphor compound on surfaces of blue light LEDs, a reference value of the threshold voltage $V_{th}$ is estimated at 2.5 volts and a reference value of the maximum operating voltage is estimated at 3.5 volts subject to an operating condition that a temperature of each LED connecting pin is controlled at or below 80 degrees centigrade thru a heat sink, therefore the voltage V across each LED of the N pieces of LEDs is thereby required to comply with an operating constraint of 2.5 volts<V<3.5 volts and the working voltage $V_N$ imposed on the LED load is thereby confined in a domain expressed by N×2.5 volts<$V_N$<N×3.5 volts. For any LED lighting device comprising an LED load it is required that the LED load in conjunction with a level setting of power source is configured with a combination of in series and/or in parallel connections of LED chips such that the electric current passing through each LED chip of the LED load remains at a level such that a voltage V across each LED chip complies with the voltage operating constraint of $V_{th}<V<V_{max}$ featuring electrical characteristics of the LED chip and the working voltage $V_N$ across the LED load configured with N number of LED chips connected in series complies with an operating constraint of $N \times V_{th} < V_N < N \times V_{max}$.

FIGS. 8A, 8B, 8C and 8D comprises 4 drawings schematically and respectively showing a V-I relationship chart (Forward Current vs. Forward Voltage) for a #2835 0.5 watt white light LED chip from each of 4 different LED manufacturers; as can be seen from the chart when a forward voltage V is below a threshold voltage at around 2.5 volts, the LED chip is essentially not conducted so a forward current I is essentially equal to zero, as the forward voltage exceeds 2.5 volts the LED chip is activated to generate a current flow to emit light, as the forward voltage continues to increase, the forward current I increases exponentially at an accelerated pace, at a maximum forward voltage at around 3.5 volts the forward current I becomes 250 mA or higher, which could generate a heat that could start damaging the PN junction of the LED chip (Cree J Series 2835 LEDs). While an LED die can be designed with a larger PN junction for operating a higher level of forward current for generating a higher lumens output, it is to be noticed the operating constraint of forward voltage has little to do with the dimensions of PN junction designed, therefore $V_{th}<V<V_{max}$ remains effective and necessary as such forward voltage constraint is attributable to the materials used in making the phosphor based white light LED. Although an LED is a current driven light emitter, it is to be recognized that ultimately it is the voltage that generates the current flow to drive the LED to emit light, no voltage no light emission so to speak. As shown in the V-I relationship chart, when the forward voltage is increased from 2.5 volts to 3.5 volts for the Cree 2835 LED, the corresponding forward current is substantially increased from 0 to 250 mA. Such feature of a high performance leverage of a large variation of forward current against a small variation of forward voltage makes it inappropriate to use a voltage as a variable to accurately control lumens output of an LED load. Instead it is more appropriate to use and to vary the constant current to operate the LED load. There are at least two reasons which support the use of the constant current source for operating the LED load: first, when a forward voltage varies by a 5% tolerance the forward current could vary in multiple like 40% to 50% for example. This could cause some LED(s) damaged in the LED load since we all know the LED chips from the same wafer have different forward voltages for generating same forward current; second, when the forward voltage varies a 5% tolerance the forward current could vary in multiple to result into a 40% to 50% fluctuation in light intensity which obviously cannot be accepted by consumers. A constant current source is always configured with a voltage power source working in conjunction with a constant current control circuit which comprises a feedback circuit to provide a current information to the controller of the voltage power source for continuously adjusting output voltage level such that the current is kept constant.

FIG. 9 is a data sheet of minimum forward voltages $V_{FMIN}$ and maximum forward voltages $V_{FMAX}$ from four LED manufacturers for generating a designated constant forward current for LEDs in a selected voltage bin, both $V_{FMIN}$ and $V_{FMAX}$ are required to comply with the voltage operating constraint $V_{th}<V<V_{max}$, namely 2.5 volts<$V_{FMIN}$<3.5 volts and 2.5 volts<$V_{FMAX}$<3.5 volts. They are fundamental requirements for configuring any LED lighting device to ensure a successful illumination performance. Additionally, in each website of the 4 LED manufacturers the options of light color temperatures or CCT (correlated color temperature) for their LED products are also disclosed; for example, in a webpage of LUMILED the color temperature options include 1800K, 2200K, 2700K, 3000K, 3500K, 4000K, 5000K, 5700K and 6500K, in a webpage of OSRAM the color temperature options are in a similar a range between 2000K and 6500K, in a webpage of Cree the color temperature options are in a range between 2700K and 6500K, and in a webpage of Samsung the color temperature options are in the same range as the Cree. It is to be emphasized that the information of color temperature options cited herein is simply to prove all LED manufacturers offer essentially same options of different color temperatures according to the variation pattern of the daylight performed by the sun light for selections by lighting fixture manufacturers in their designs to resemble the natural phenomenon of the daylight during daytime hours performed by the sun light after sunset. In other words, the LED manufacturers do not define the range of light color temperatures of LEDs. Instead, the 24 hours light color temperature range between 0 and 6500K belongs to an inherent function of the natural daylight performed by the sun light and is attributable to an interaction of three natural phenomena including the full frequency spectrum of visible lights of the sun light, the self spinning of the earth relative to the sun and the atmospheric scattering effect of the earth; above the atmosphere of the earth the sun light performs a constant color temperature of approximately 5900K, when the sunlight enters the atmosphere of the earth, the atmospheric scattering effect occurs and depending on an instantaneous position of the sun in the sky people on the earth may see different light color temperature performance between 1800K and 6500K during the daytime period between dawn and dusk and notice a slow running variation cycle of light color temperatures from a low color temperature at approximately 1800K to a high color temperature at 6500K at noon and then gradually returns to the low color temperature to complete a daily variation cycle before turning into the nighttime, the color temperature variation cycle is attributable to the self spinning effect of the earth relative to the sun which creates an effect of daytime and night time every day."

In summary, the compliance of voltage operating constraint $V_{th}<V<V_{max}$ featuring electrical characteristics of an LED chip is a critical technology for ensuring a normal performance of the LED load. Failing to comply with such voltage operating constraint can quickly age or seriously damage the semiconductor structure of the LED chip with a consequence of quick lumens depreciation of the LED bulbs and the product lifetime being substantially shortened, which will be unacceptable to the consumers.

The compliance of the operating constraint $V_{th}<V<V_{max}$ is a necessary matter for any LED lighting device though it is not an obvious matter as it requires complicated technologies to calculate and coordinate among a level setting of power source, a control circuitry and a non-linear V-I relationship of light-emitting LED load. For conventional lighting load such as incandescent bulb there exists no such operating constraint. This is why in the past years there had been many consumers complaining about malfunction of LED bulbs that the consumers were frustrated with the fast depreciation of lumens output and substantially shortened product lifetime of the LED bulbs purchased and used. A good example was a law suit case filed by the Federal Trade Commission on Sep. 7, 2010 (Case No. SACV10-01333 JVS) for a complaint against a leading lighting manufacturer for marketing deceptive LED lamps and making false claims with respect to the life time of their LED lamps and a huge amount of monetary relief was claimed with the Court in the complaint.

To further elaborate the importance of the constraints of operating formula $V_{th}<V<V_{max}$, it is necessary for the applicant to describe the following system operating flow chart to explain how the operating formula plays its indispensable role in LED driver design such that an LED light so designed is always ensured of being operated in a safety range when energized and the LED light can be expected as an energy saving and long lasting light source;

System Flowchart for Designing an LED Driver of an LED Light:
(a) Step 1 Determine a maximum lumens output before a lumens loss by the light diffuser. For example use a maximum lumens $L_{max}=3200$ lumens.
(b) Step 2 Select an LED die capable of generating X lumens, e.g. X=80 lumens and then calculate a minimum quantity $Q_{min}$ of the LED dies for configuring the light emitting unit. $Q_{min}=3200/80=40$ LEDs.
(c) Step 3 Obtain the corresponding value of the forward current I which generates the required lumens (e.g. 80 lumens) from the LED manufacturer's data pool.
(d) Step 4 Select and obtain an LED voltage bin comprising a plurality of LED dies with different forward voltages able to produce same forward current on the V-I relationship curves to generate same lumens output (e.g. 80 lumens). The selected voltage bin comprising a plurality of LED dies with different forward voltages form a bin voltage domain bounded by the minimum forward voltage $V_{BMIN}$ and the maximum forward voltage $V_{BMAX}$.
(e) Step 5 At this stage both the LED manufacturer and the circuit designer of the LED light are obliged to carefully check both $V_{BMIN}$ and $V_{BMAX}$ are in full compliance with the operating constraints of 2.5 volts<V<3.5 volts, wherein V is a variable of forward voltages in the voltage domain bounded by $V_{BMIN}$ and $V_{BMAX}$, or equivalently $V_{th}<V_{BMIN}$ and $V_{BMAX}<V_{max}$. If V is within the domain between 2.5 volts and 3.5 volts, the selected LED voltage bin is acceptable. If V is outside of the domain then the LED voltage bin selected is not acceptable because the LED light would fail its performance as disclosed in the specification and claims. Under such circumstances either the lumens output level is to be reduced until the corresponding forward voltage falls in the domain or a different LED die which can satisfy the voltage operating constraint needs to be selected.
(f) Step 6 Determine a matrix of in parallel and in series connections of the minimum quantity of LED dies (e.g. 40 LED dies)
(g) Step 7 Calculate the voltage and the total wattage required to successfully drive the LED light to perform the maximum lumens output.

The present disclosure of a multi-level LED security light providing an unique lifestyle lighting solution has less to do with the energy saving aspect of the low level illumination mode because an LED is already a very energy saving light source compared with the conventional incandescent light source. For instance, a 10-watt LED security light when operated at a low level at 30% illumination it only saves 7 watts, which is not as significant as a 100-watt incandescent bulb which can save as much as 70 watts when operated at 30% illumination for a low level mode. While it is always good to save some extra energy, it is however not the only incentive for developing the present disclosure; the lifestyle lighting solution of the present disclosure is featured with two innovations which meaningfully improve the exquisite tastes of living in the evening; the first innovation is a creation of a scene for the outdoor living environment, wherein at dusk the LED security light is automatically turned on by the photo sensor to perform the low level illumination such as 30% of a full capacity with a low color temperature such as 2700K for creating a soft night scene similar to the daylight performance at sunset matching with the outdoor living area in the evening, the second innovation is a creation of a navigation capacity for guiding people to safely move toward a destination in the outdoor living area without getting lost or encountering an accident with a minimal energy cost, wherein when a motion intrusion is detected by the motion sensor the security light is instantly changed to perform a high level illumination mode between 50% and 100% of a full capacity with a high color temperature light similar to the sun light at noon time which effectively offers people a high visibility of the surrounding environment when needed. It is the innovation of the present disclosure to configure a lifestyle security light with a low color temperature LED load with a low light intensity and a high color temperature LED load with a high light intensity respectively activated by a photo sensor and a motion sensor to resemble or mimic the natural phenomena of the sun light between promoting a high comfortability and a high visibility. For more detailed elaborations with respect to the need and knowhow for resembling and mimicking the natural sunlight performance are extensively disclosed in the following paragraphs.

Figure 10A:
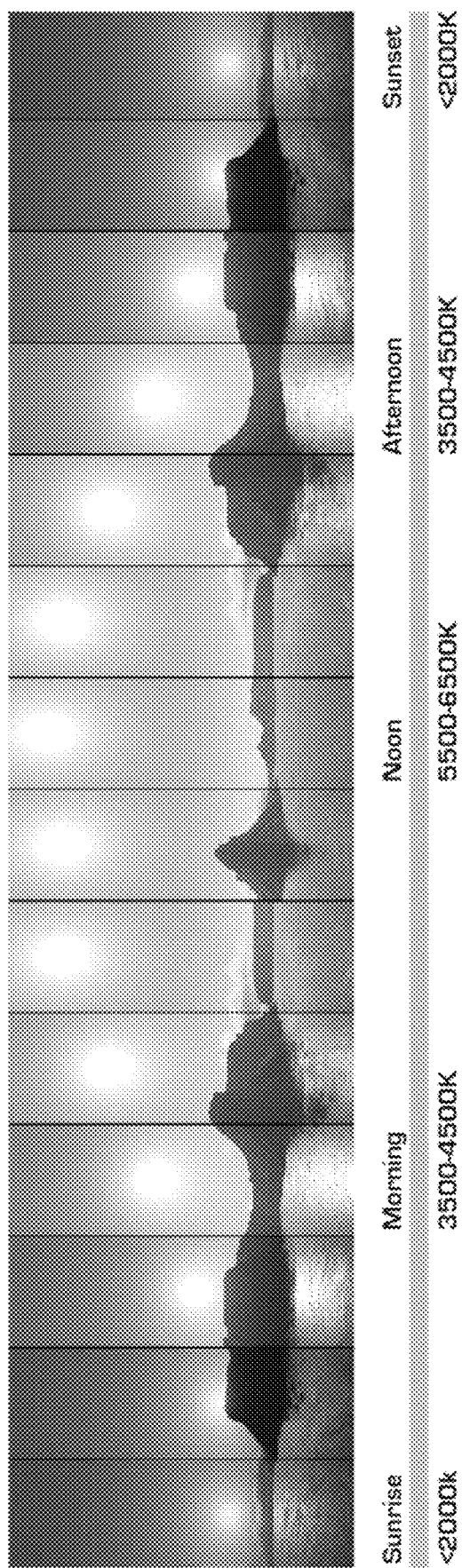
FIG. 10A, FIG. 10B are two reference drawings showing a natural phenomenon of an automatic color temperature variation pattern and an automatic light intensity variation pattern of sun light during day time hours, respectively cited from the website of community.homey.app under the article of "DIY circadian rhythm based lighting" and the website of https.//the lightingpractice.com under the article of "What is circadian lighting?".
Figure 10B:

Human beings' living activities such as waking up, working desire, and falling asleep are closely tied to different levels of light intensity and light color temperature performed by the sun. Please refer to FIG. 10A and FIG. 10B, which are schematic drawings to describe an automatic light variation cycle everyday performed by the sun including light intensity variation and light color temperature variation (the schematic diagrams may be subject to deviations in different time zone and different seasons, though they are essentially of same nature) to control our repetitive daily cycle of living activities; early in the morning at dawn when the sun is rising to perform a soft light characterized by a low light intensity at approximately 200 lumens to 300 lumens and a light color temperature at approximately 1800K to 2500K, people are waked up after a long period of sleep to start another new day with the light intensity and the light color temperature continuing to grow higher in the morning, at approximately 6 AM the light color temperature becomes 2700K, then at approximately 9 AM the light color temperature becomes 4600K, then at approximately 12 PM, the light color temperature reaches the highest level 6500K, then the sun light reverses to decrease its light intensity and color temperature, at about 3 PM the light color temperature becomes 4600K, at about 6 PM the light color temperature resumes to 2700K to complete a full automatic color temperature variation cycle before gradually becoming completely dark in the evening. Although the light intensity during the daytime also performs an automatic variation cycle, the variation pattern of lumens intensity is more volatile and less stable as it depends a lot on a weather condition of each day such as sunny day, cloudy day and gloomy day being quite different in terms of light intensity measured while the variation pattern of color temperature is always more stable at different time regardless weather condition. Therefore in this paragraph, we would only focus on the effect of the automatic color temperature tuning cycle, which actually controls the circadian rhythm of our body system. As shown in FIG. 10A or FIG. 10B, everyday we repeatedly experience cooler or higher color temperatures ranging from 4600K up to 6500K during the time periods from 9 AM to 12 PM and from 12 PM to 3 PM when the sun is high up in the sky and people are typically most alert during the day. Therefore, cooler CCTs (correlated color temperature) are often used in spaces and during times when it is appropriate or necessary to promote alertness and attention. Warmer color temperatures changing from 1800K to 3000K represent beginning of daylight hours when the sun is rising and people are waking up to start preparing living activities for another new day and warmer color temperatures changing from 3000K to 1800K represent ending of daytime hours when the sun is setting and people are wrapping up work to go home for evening activities. The circadian rhythm of our body systems are set to adjust our body activities based on the color temperature we typically observe thru our eyes at any time of the day. The variation of color temperature basically divides our daytime schedule into three time periods; a first time period being from 6 AM to 7 AM is characterized by warmer color temperatures or lower temperatures ranging from 2700K to approximately 3500K, a second time period being from 8 AM to 4 PM is characterized by cooler color temperatures or higher color temperatures ranging between 4000K and 6500K, and a third time period being from 5 PM to 6 PM is characterized by the warmer color temperatures or the lower color temperatures ranging from 3500K to 2700K. The warmer color temperatures in the morning delivers a signal thru our eyes to our body system to prepare a beginning of daytime hours for working, the cooler color temperatures during middle day delivers a signal thru our eyes to our body system to prepare a high alertness and high attention for hard working, and the warmer color temperatures in the late afternoon delivers a signal thru our eyes to our body system to prepare an ending of hard working day time to wrap up for evening activities.

The automatic color temperature variation cycle performed by the sun light during the daytime everyday as described above teaches us how the circadian rhythm of our body system reacts to a variation of color temperatures to control our living activities.

White LED lights are not natural lights that exist in the natural world. Instead they are synthetic lights invented in the laboratory before being developed for commercial applications. There are two different types of white LED lights respectively generated by two different methods for different applications; one being the so called RGB based white LED light and the other being the so called phosphor based white LED light. The RGB based white LED light and the phosphor based white LED light are respectively produced with different color temperature tuning technologies and are distinctively designed for different product applications based on their own functional merits.

For tuning the color temperature of the phosphor based white LED light we can simply adjust a power allocation ratio between two phosphor based white light LED loads designed with two different color temperatures (one being a low color temperature selected between 1800K and 3000K such as 2000K for instance and the other being a high color temperature selected between 4000K and 6500K such as 5000K) to achieve any blended color temperature varying in a range from the low color temperature 2000K to the high color temperature 5000K without changing the white color of the blended LED light. This is what we need for evening illumination after sunset. The power allocation ratio can be simply managed by a reverse yet complementary power adjustment process between the two powers distributed to the two phosphor based white light LED loads using a microcontroller to respectively control a first conduction rate of a first controllable semiconductor switching device electrically connected to a low color temperature white light LED load and a second conduction rate of a second controllable semiconductor switching device electrically connected to a high color temperature white light LED load.

For tuning the color temperature of the RGB based white light LED, the power adjustment process is much more complicated as whenever a power allocation ratio among the red light LED, the green light LED and the blue light LED is changed, both the color and the color temperature of the blended light are simultaneously tuned. In order to keep the color of the blended RGB lights unchanged at white color while tuning the color temperature, the power allocation process is subject to various constraints and there is no simple power allocation algorithm such as the reverse and complementary power adjustment process used for the phosphor based white light LED load can be derived for programming a color temperature tuning scheme. In practice lab tested data using a trial and error approach are often used to build a table of different color temperature tuning scheme against different combination of powers respectively delivered to the red light LED, the green light LED and the blue light LED.

The RGB based LED method is primarily designed for being used as a built-in illuminating component to enable a video display panel to play a colored video program. In other words, it is a self-emitting component built inside the display panel for performing a colored video program for the display panel/IT industry while the phosphor based LED method is primarily designed to mimic the daylight performance of the sun and is used as an external light source for illuminating human living environment or an object in a living space after sunset.

For the RGB based LED method, its strength lies in its multicolor rendering capacity which is suitable for being used as the built-in illuminating component for playing the colored video display program while its weakness lies in its incomplete light frequency spectrum generated by simply blending the red, green and blue LED lights, characterized by a low color rendering index (CRI<73), which means when the RGB based LED lighting device is used as an external light source for illuminating living environment or an object in our living space, it can only faithfully reveal the color appearance of the illuminated environment or the illuminated object up to a maximum of 73% in comparison with being illuminated by the natural daylight which has a CRI between 99 and 100. In other words the distortion of color appearance is at least 27% by the RGB based LED method in comparison with that being illuminated by the natural daylight. When used as the self-illuminating component in the video display panel, the RGB LED lights are blended thru a diffuser to generate different blended colors and different blended color temperatures, the human eyes by watching the video display panel directly receive all light signals emitted by the RGB LEDs without distortion. In other words, the light signals and the video images are fully and truly transmitted to and received by the human eyes. In that respect the RGB tuning technology indispensably performs a perfect role serving as a built-in illuminating component for the video display terminal for performing color tuning as well as color temperature tuning.

However when the RGB LEDs generated white light is used as an external light source for illuminating a living environment or an object in the evening, it becomes problematic because it can't faithfully reveal the same color appearance of the living environment or the object illuminated by the nature sunlight during the daytime.

What's wrong and why? It has to do with the fact that the reason that human eyes can see a color appearance of an object illuminated by an external light source is because the illuminated object can always reflect the frequency portion of the external light source that corresponds to the surface frequency structure of the illuminated object and absorb the rest frequencies of the external light source. The sunlight has a complete frequency spectrum comprising seven visible color lights, namely red light, orange light, yellow light, green light, blue light, cyan light and violet light and therefore it can reflect any frequencies of visible lights. If the light source is white LED light generated by RGB LEDs which only contains red light, green light and blue light then we can only see a color appearance of red, green or blue. If an orange object is illuminated by the white LED light from a RGB light source, our eyes are not able to see the same orange color appearance when it is illuminated by sun light because the RGB generated white light does not contain sufficient orange color and therefore very little orange color is reflected by the illuminated object. Since our body circadian rhythm is accustomed to the natural sunlight exposed during the daytime every day, the artificial light source for illuminating our living environment in the evening when the sunlight is not available needs to resemble or mimic the natural sunlight as close as possible. To such an extent of requirement, the RGB LEDs generated white light with an incomplete frequency spectrum is obviously not a good light source for general illumination need in the evening.

Being different from the simple blending process used by the RGB based technology, the phosphor based white LED light involves an electronic excitation process by coating different phosphor compounds on the surface of a blue light LED to generate different white LED lights with different color temperatures; when the phosphor coated blue light LED is energized the electronic excitation process occurs and a white LED light with a complete frequency spectrum similar to the natural sunlight is thereby generated. The white light so generated has a broader spectral power distribution similar to the natural sunlight with a higher color rendering index CRI=90 or higher which is more suitable for being used as an independent light source.

With the above being said it is concluded that there exists no technical common domain or similarities between the color temperature tuning process by the RGB based LED load and the color temperature tuning process by the phosphor based LED load. The RGB based LED is best suited for being used as a built-in illuminating component for the video display industry while the phosphor based LED is best suited for being used as an external light source for a general illuminating purpose for the lighting industry.

With the above being described and explained, it is pretty clear that people shall not misconceive that the RGB based LED color tuning technology being the same as the phosphor based LED color temperature tuning technology.

Please refer to the drawings of FIG. 11 and FIG. 11A~11C which represent reference figures cited from the website of horticulture.red under the article "Spectrum and colors of light" by Rouge Engineered Designs on Jan. 22, 2020 and "spectrum of different light sources" by Dutta Gupta et Agarwal in 2017.

Figure 11:
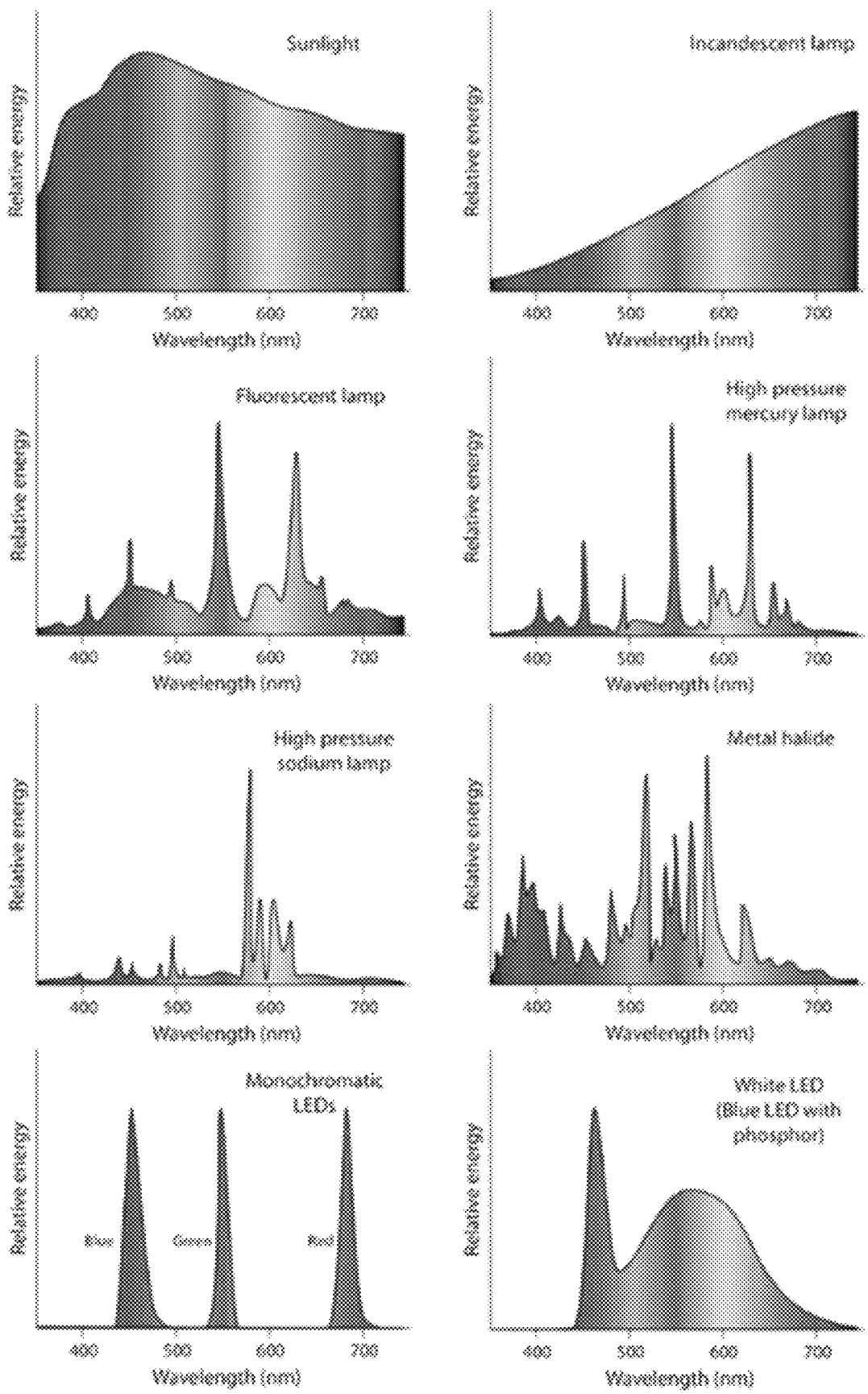
FIG. 11, FIG. 11A, FIG. 11B and FIG. 11C represent reference figures cited from the website of horticulture.red under the article" Spectrum and colors of light "by Rouge Engineered Designs on Jan. 22, 2020 and" spectrum of different light sources" by Dutta Gupta et Agarwal in 2017.
Figure 11C:
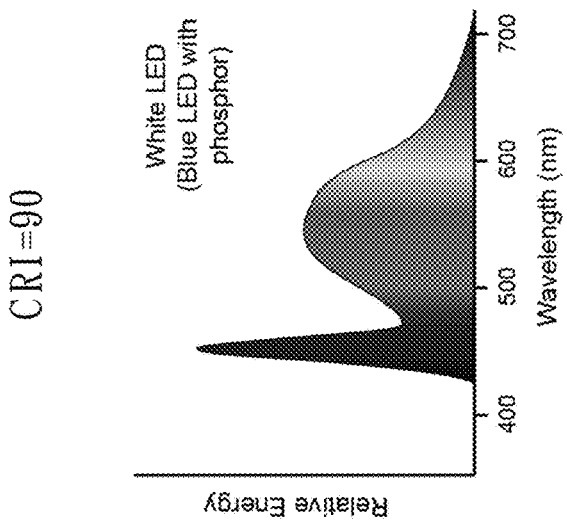
Figure 11B:
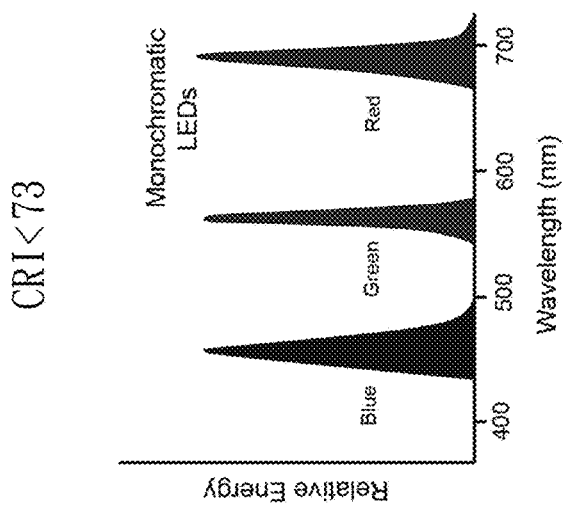
Figure 11A:
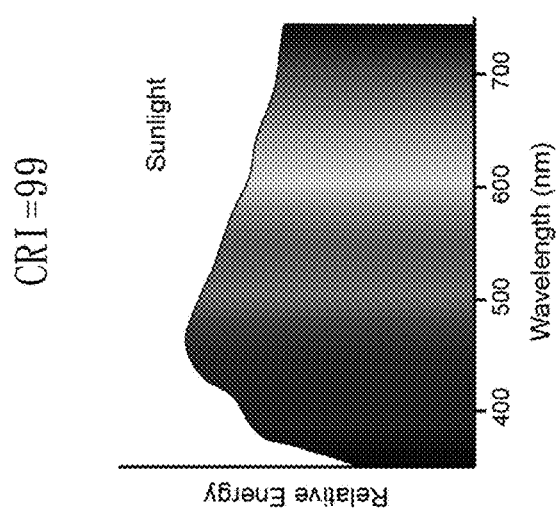

Please refer to FIG. 11A which is a spectral power distribution chart of the natural sun light with a color temperature of 5000 K from a spectrometer, which is approximately the color temperature performance of the sun light at 10 AM or 3 PM during daytime; as can be seen coverage of frequency is complete across the entirety of the visible light spectrum from 380 nm to 780 nm. Such spectral power distribution curve is characterized by a color rendering index at 99, which is a perfect light source.

FIG. 11B represents the spectral power distribution chart of a RGB based LED generated white LED light with a CCT of 5000K; because it is a simple blending process of collecting three different RGB LED lights together thru a diffuser without involving a phosphor coating for executing a electronic excitation process, therefore it has an incomplete spectrum with each of the three RGB emitters only covers a narrow bandwidth, lacking coverage across much of the spectrum, particularly in the red and violet regions. Because of such incomplete spectrum, the CRI as consequence is only 73 or lower which indicates when it is used to illuminate an object the color appearance of the illuminated object has a distortion of at least 27% in comparison with the performance of the natural sun light of FIG. 11A.

FIG. 11C represents a spectral power distribution chart of a phosphor based white LED light with a CRI=90. With the CRI being equal to 90, it indicates such phosphor generated white LED light can faithfully reveal the color appearance of an object with a similarity of 90% in comparison with the natural sun light of FIG. 11A. A color rendering index (CRI) is a quantitative measure of the ability of a light source to faithfully reveal the color appearances of various objects in a living environment in comparison with a natural sunlight. Light source with a higher CRI tends to more faithfully reveal the color appearances of various objects in a living environment in comparison with the natural sun light. Since human being's circadian rhythm system is already accustomed to the lighting performance of the natural sunlight during daytime, it is necessary for any artificial light to be designed to mimic the lighting performance of the natural sun light for illuminating evening living environment.

Further, it is to be noticed that when a light source is used to illuminate an object in a living environment, the color performance of the illuminated object revealed by the light source depends on the frequency spectrum reflected from the surface of the illuminated object, which is originated from the light source, when the object is illuminated by the light source, it reflects only the portion of frequency spectrum which corresponds to the surface frequency structure (i.e. colors) of the object and absorbs the rest of the light spectrum. With that being said, if the power spectrum of the light source contains no coverage or minimum coverage of the specific range of the light spectrum corresponding to the surface frequency structure of the illuminated object then no portion or very little of the light spectrum would be reflected and sensed by the human eyes.

In the lighting industry professionals often use the value of the CRI of a light source to measure how faithful the designed light source can reveal the colors of various objects in comparison with the natural sunlight. Generally a CRI equal to or greater than 99 is identical to the natural sunlight, a CRI at 80 is a minimum level required to qualify as an acceptable light source for illuminating a living environment in the evening, a CRI lower than 80 is not suitable for being used as a reliable light source for revealing the same color appearance of the object during the daytime because of a substantial color distortion. For a light source to achieve a CRI equal to or higher than the minimum level 80, its frequency spectrum needs to be a continuous one meaning it should contain similar coverage of visible lights like the natural sunlight. For the phosphor based white LED light since, it is generated by the electronic excitation process which can generate a complete frequency spectrum similar to the natural sunlight therefore it can easily achieve a CRI of 80 or higher. For the RGB based white LED light, since it is simply a blending process of adding all three narrow pulse frequency spectrums of the red visible light, the green visible light and the blue visible light together thru a diffuser without interaction, the resulting frequency spectrum of the RGB generated white LED light can only show an incomplete spectrum with three discrete narrow pulses characterized by a low level CRI at 73 or lower and as a consequence the color appearance of the object illuminated by the RGB based white LED light is always substantially distorted. With the above being explained, it is very clear that the phosphor based white LED light is the only qualified artificial light source to mimic the natural sunlight for serving evening illumination need and the RGB based white LED light with a CRI less than 73 is not suitable for serving as a replacement of the natural sunlight for satisfying evening illumination need though it is best suited as a built in illuminating component for operating video display industry. With the above being said, there is no common domain between the RGB generated white LED light and the phosphor generated white LED light since they are so far apart in terms of production process and ultimate applications.

The multi-level LED security light with a tunable color temperature is only an embodiment of the color temperature tuning technology of the present disclosure designed to mimic the natural day light performed by the sun after sunset. In fact, all LED lighting devices need to be configured with such color temperature tuning capacity such that the consumers may choose a desired color temperature to create an appropriate atmosphere suitable for a specific evening activity.

During the evening hours after completing daytime work and before the time going sleeping, people may have different evening activities which may require different illumination characteristics including different light intensities coupled with different light color temperatures; some people may continue to do additional home works which may require an illumination with a higher light intensity and a higher light color temperature to promote high alertness and attention, some people may enjoy evening entertainment activities for happy hours which may require a lower light intensity coupled with a warmer color temperature to create a relaxing atmosphere; some people may have social activities where a medium light intensity coupled with a medium light color temperature are warranted; some people may need to go shopping in various retail outlets where a high visibility provided by a high light intensity and a high color temperature are necessary to enable the people to clearly see various merchandises; some people may want to go to bars for drinks where a lower light intensity coupled with a lower color temperature are necessary in order to create a relaxing and enjoyable atmosphere; some people may choose to go to high end French restaurants where an enjoyable eating environment constructed with a lower light intensity between 200 lumens and 300 lumens coupled with a lower color temperature between 1800K and 2500K may be necessary to create a candle-light like atmosphere for an enjoyable dinner.

All of the above cited examples sufficiently serve to justify the necessity of a built-in color temperature tuning capacity in conjunction with a light intensity dimming capacity in all LED lighting devices.

The method of tuning a color temperature of an LED light represents the core technologies of the present disclosure. The method involves using a hardware circuitry working in conjunction with a software algorithm to operate a color temperature tuning and switching scheme.

The hardware circuitry represented by FIG. 12, FIG. 12-1A, FIG. 12-1B and FIG. 12-2 are cited from U.S. Pat. No. 11,063,585 and supported by ABSTRACTs of U.S. Pat. Nos. 10,770,916 and 10,763,691 thru incorporated by references including using at least a first LED load emitting light with a first color temperature and a second LED load emitting light with a second color temperature with the second color temperature being higher than the first color temperature, using a light diffuser to cover the first LED load and the second LED load to create a diffused light with a diffused light color temperature, using a power allocation circuitry controlled by the software algorithm to divide a total electric power T into different paired combinations of different electric powers respectively delivered to at least the first LED load and at least the second LED load to generate the diffused light with different diffused light color temperatures to form a diffused light color temperature switching scheme, and using an external control device to operate a pick and play process to activate the diffused light color temperature switching scheme to select a corresponding diffused light color temperature performance in the color temperature switching scheme, wherein the first color temperature is designed with a value in a range between 1800K and 3000K and the second color temperature is designed with a value in a range between 4000K and 6500K.

In the configuration of the hardware circuitry of the present disclosure, the term of "LED driver circuitry or LED driver" and the term of "switching circuitry or switching device" are often alternatively used in the present disclosure for calling a circuit structure designed for managing a power transformation function or for managing a power loading function, depending on their respective functional descriptions in an application; wherein when the switching circuitry or the LED driver circuitry is used for performing the power transformation function to convert an AC power into a DC power, the switching circuitry or the LED driver circuitry is always configured with a bridge rectifier with a filter circuit to convert the AC power into the DC power and when a constant current DC power is required, the switching circuitry or the LED driver circuitry may further include a constant current control circuit connected in series with the bridge rectifier working in conjunction with a microcontroller and a semiconductor switching device to dynamically adjust a voltage output to deliver a constant current DC power to an LED load; wherein when the switching circuitry or the LED driver circuitry is used for performing a power loading control function in a single circuit configured with only one semiconductor switching device and a single LED load, the switching circuitry or the LED driver circuitry effectively operates to control a power level loaded to the single LED load, in other words the switching circuitry or the LED driver circuitry effectively controls an on/off performance of the single LED load or dimming the power level delivered to the single LED load; wherein when the switching circuitry or the LED driver circuitry is configured with at least two semiconductor switching devices electrically and respectively connected with at least two LED loads emitting lights with different color temperatures, the switching circuitry or the LED driver circuitry effectively operates a power allocation process working in conjunction with a controller to divide a total electric power between the two LED loads for generating a color temperature tuning scheme formed by different paired combinations of electric powers respectively delivered to the two LED loads. The switching circuitry or the LED driver circuitry may be designed solely for a power transformation function, or designed solely for dimming a single LED load, or may be designed for operating a power allocation between two LED loads. The switching circuitry or the LED driver circuitry may also be designed with a complicated ASIC (application specific integrated circuit) integrating both the power transformation function as well as the power loading control function and other special function as needed. With the above being explained and elaborated, the switching circuitry or the LED driver circuitry is simply defined as a power-managing circuitry designed for performing at least a power transformation function or at least a power loading control function or both in a lighting circuit design. Since the performance function(s) of the switching circuitry or the LED driver circuitry can be various depending on each circuit design there is no need to restrict or limit the specific functional performance of the switching circuitry or the LED driver circuitry, it all depends on a respective description of functional performance in an application designed. There are practical cases wherein a design of a circuitry for a lighting product may require both a power transformation function design and a power loading control function design it would then be more adequate to use one switching circuitry for the power transformation function and one LED driver circuitry for the power loading control function respectively or vice versa to avoid any confusion in the present disclosure.

The software algorithm teaches a process of dividing and sharing the total electric power T between at least the first LED load emitting light with the first color temperature $CT_1$ and the second LED load emitting light with the second color temperature $CT_2$ to generate a plurality of paired combinations of a first electric power X allocated to the first LED load and a second electric power Y allocated to the second LED load to create a color temperature tuning and switching scheme comprising a plurality of different diffused light color temperature performances thru the light diffuser according to a color temperature tuning formula; $CT_{app}=CT_1 \cdot X/(X+Y)+CT_2 \cdot Y/(X+Y)=CT_1 \cdot R_1+CT_2 \cdot R_2$ and X+Y=constant, wherein $R_1=X/(X+Y)$ represents a ratio of the total electric power allocated to the first LED load, $R_2=Y/(X+Y)$ represents a ratio of the total electric power allocated to the second LED load, and $CT_{app}$ represents an weighted average color temperature by blending the first color temperature $CT_1$ and the second color temperature $CT_2$ according to the different powers ratios respectively allocated to the first LED load and the second LED load.

Figure 12:
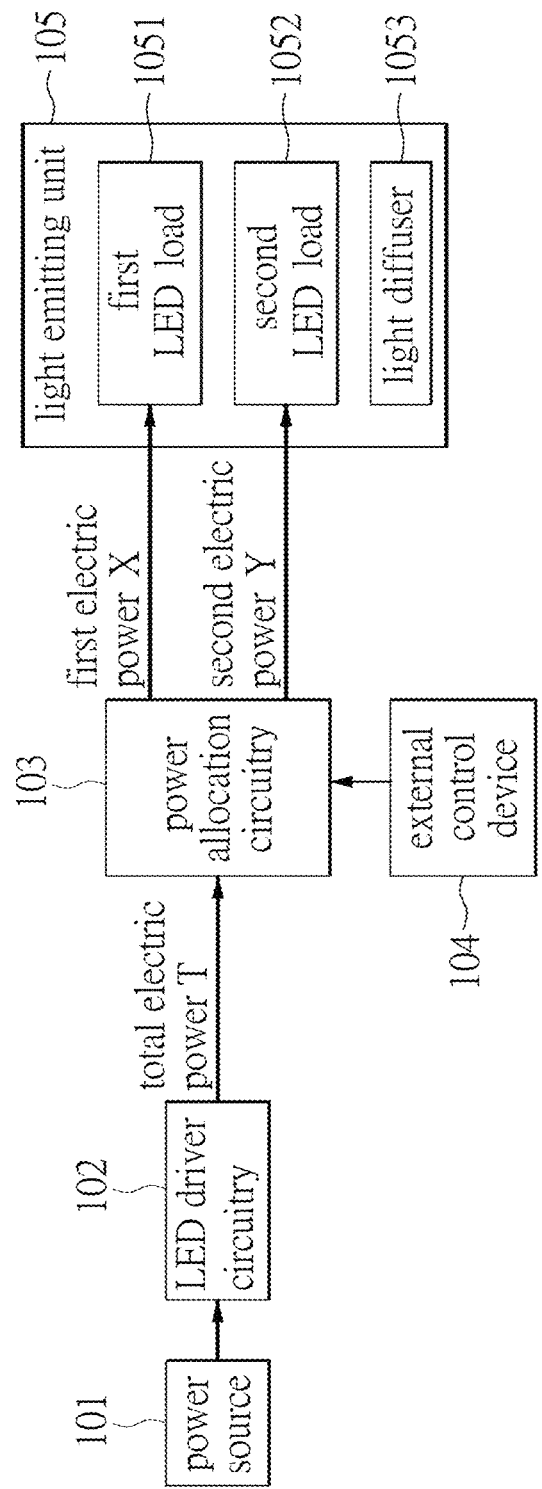
FIG. 12 is a schematic block diagram showing a technical hardware platform for configuring and operating a light color temperature tuning and switching scheme of an LED lighting device.
Figures 1A, 12:
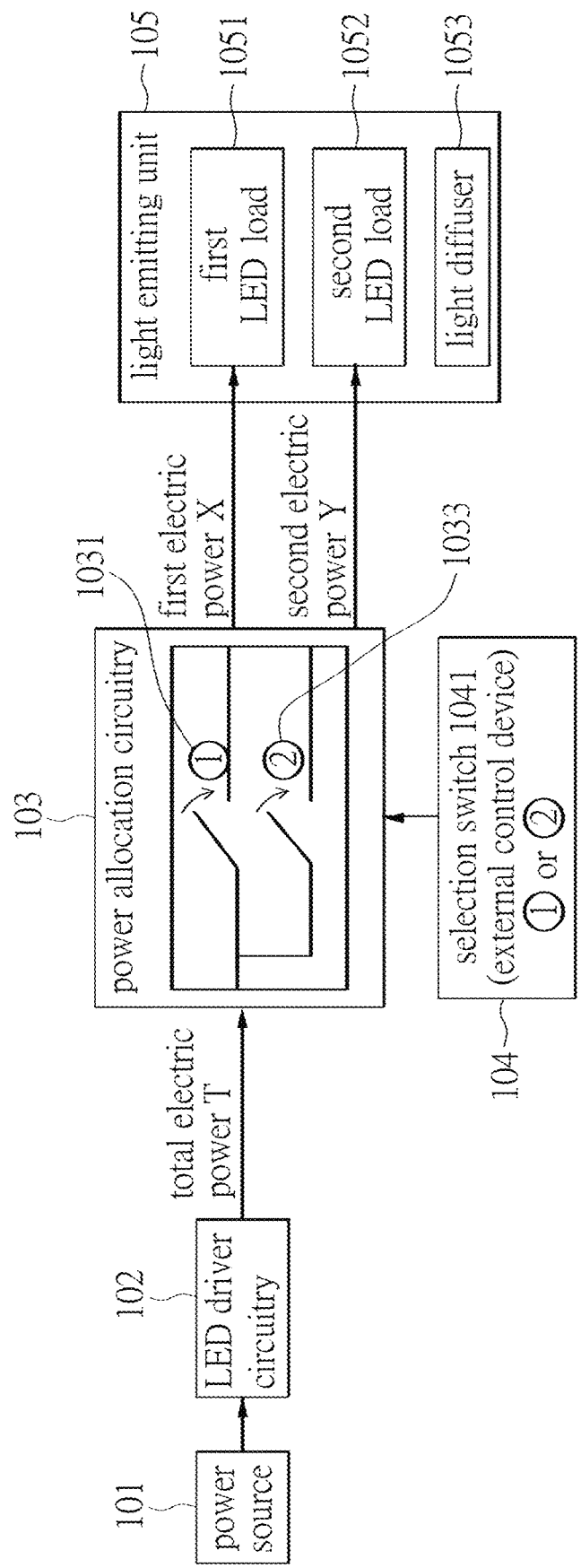
Figures 1B, 12:
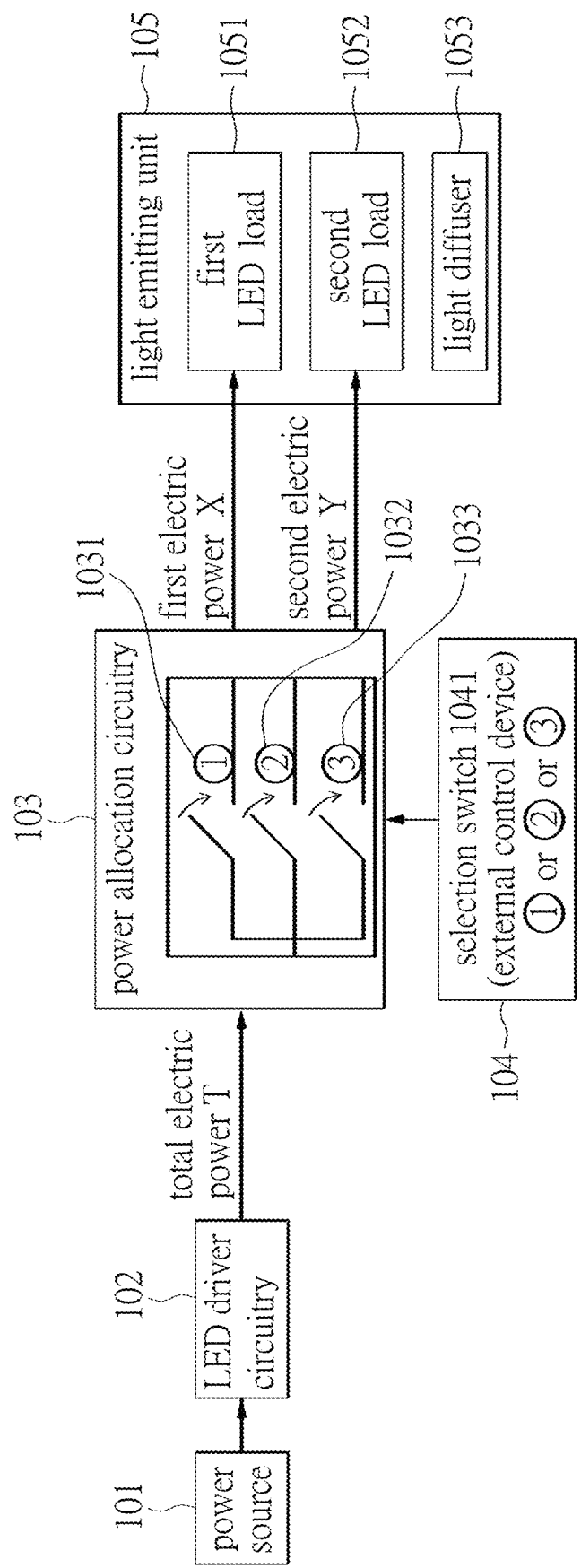

More specifically please refer to FIG. 12 which is a schematic block diagram of the color temperature tuning method disclosed in the present disclosure, which provides a common platform for designing and configuring any light color temperature tuning and switching scheme for an LED lighting device, wherein for managing an electric power transformation and transmission an LED driver circuitry 102 identical to a switching circuitry is configured with an AC/DC power converter and a semiconductor switching devices to output a DC power T to a power allocation circuitry 103, wherein the power allocation circuitry 103 working in conjunction with a diffused light color temperature tuning algorithm and an external control device 104 operates to activate the diffused light color temperature switching scheme for selecting a corresponding color temperature performance in which a first electric power X and a second electric power Y are respectively delivered to the first LED load 1051 and the second LED load 1052.

Additionally, please refer to FIG. 12-1A which is a schematic block diagram under the common platform FIG. 12, drawn to illustrate a color temperature tuning circuitry with the power allocation circuitry 103 being configured with a two-way electric switch to operate two loading options 1031 and 1033, the external control device 104 being a selection switch 1041 is further configured with two switching positions respectively connectable to the two loading options 1031 and 1033; wherein when the selection switch 1041 is connected to the first switching position for operating the first loading option 1031, the total electric power T is therefore delivered to the first LED load 1051 to generate the illumination with the first diffused light color temperature, wherein when the selection switch 1041 is connected to the second switching position for operating the second loading option 1033, the total electric power T is therefore delivered to the second LED load 1052 to generate the illumination with the second diffused light color temperature, wherein the first diffused light color temperature is designed with a value between 1800K and 3000K, and the second diffused light color temperature is designed with a value between 4000K and 6500K.

Please refer to FIG. 12-1B, which is an embodiment of FIG. 12, wherein the power allocation circuitry 103 comprises three loading options 1031, 1032, and 1033 to be optionally connected to the LED driver circuitry 102 for receiving a constant current power T for generating different diffused light color temperature performances according to the diffused light color temperature switching scheme activated by the external control device which is a selection switch 1041 configured with at least three switching positions operable by a user to optionally connect the constant current power T to one of the three loading options.

FIG. 12-1B illustrates a color temperature tuning circuitry under the common platform of FIG. 12, with the power allocation circuitry 103 being configured with a three-way electric switch to operate three loading options 1031, 1032 and 1033, the external control device 104 being a selection switch 1041 is further configured with three switching positions respectively connectable to the three loading options 1031, 1032 and 1033; wherein when the selection switch 1041 is connected to the first switching position for operating the first loading option 1031, the total electric power T is therefore delivered to the first LED load 1051 to generate the illumination with the first diffused light color temperature, wherein when the selection switch 1041 is connected to the second switching position for operating the second loading option 1032, the total electric power T is therefore delivered to both the first LED load 1051 and the second LED load 1052 to generate the illumination with the second diffused light color temperature; wherein when the selection switch 1041 is connected to the third switching position for operating the third loading option 1033, the total electric power T is therefore delivered to the second LED load 1052 to generate the illumination with the third diffused light color temperature, wherein the first diffused light color temperature is designed with a value in a range between 1800K and 3000K, the second diffused light color temperature is designed with a value in a range between 3000K and 4000K and the third diffused light color temperature is designed with a value in a range between 4000K and 6500K.

Figures 2, 12:
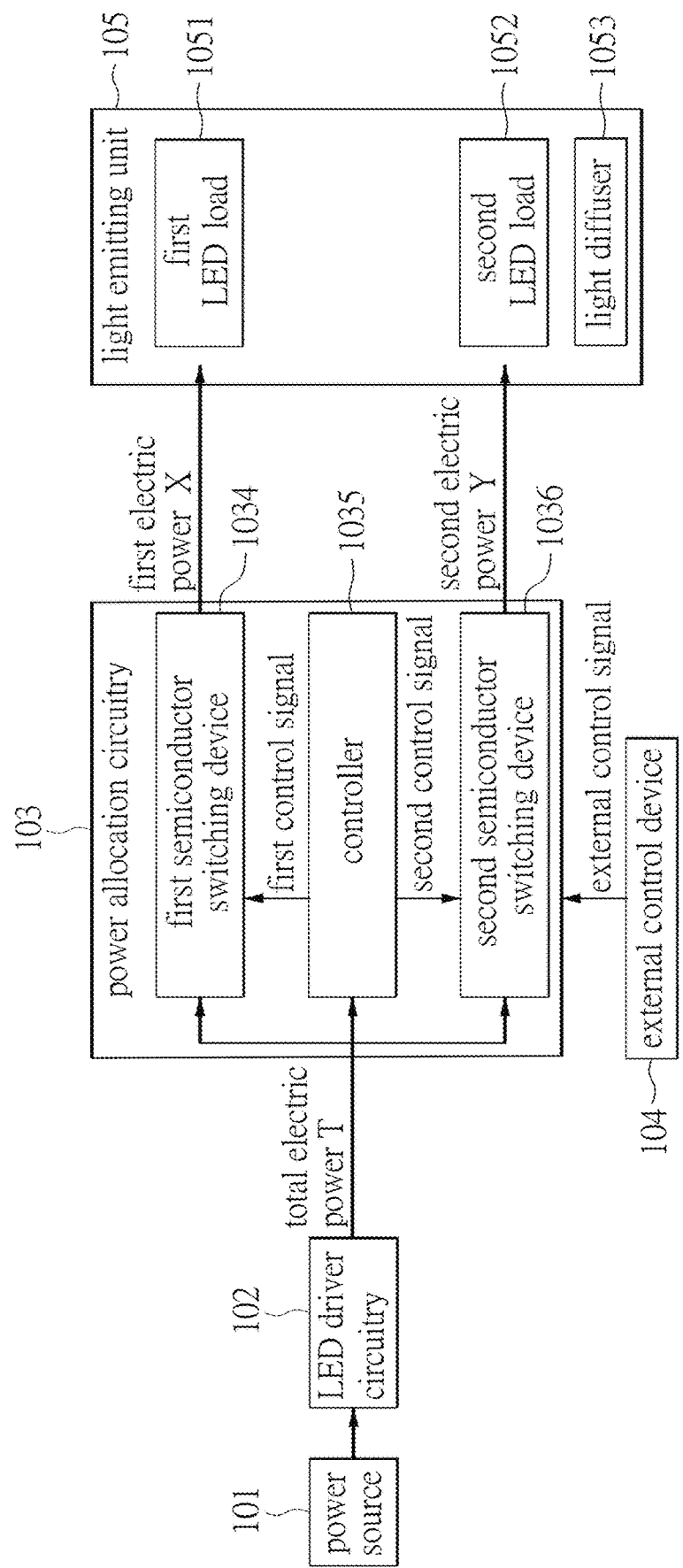

Additionally please refer to FIG. 12-2, which is another embodiment of FIG. 12, wherein the power allocation circuitry 103 comprises a controller 1035, a first semiconductor switching device 1034 and a second semiconductor switching device 1036, wherein the controller 1035 outputs control signals to control a first conduction rate of the first semiconductor switching device 1034 and a second conduction rate of the second semiconductor switching device 1036 to execute a reverse yet complementary power adjustment process between a first electric power X delivered to the first LED load 1051 emitting light with the first color temperature and a second electric power Y delivered to the second LED load 1052 emitting light with the second color temperature such that a total light intensity remains unchanged while a diffused light color temperature thru a light diffuser 1053 of the light-emitting unit 105 can be adjusted according to the diffused light color temperature tuning algorithm being activated and executed by external control device, wherein for tuning the diffuser light color temperature to a lower diffused light color temperature, the controller upon receiving the external control signal operates to increase the first conduction rate of the first semiconductor switching device to increase the first electric power delivered to the first LED load and simultaneously operates to decrease the second conduction rate of the second semiconductor switching device to decrease the second electric power delivered to the second LED load with the same pace such that a total diffused light intensity generated by the light-emitting unit remains unchanged while the diffused light color temperature is accordingly adjusted to the lower diffused light color temperature; wherein for tuning the diffused light color temperature to a higher diffused light color temperature, the controller upon receiving the external control signal operates to decrease the first conduction rate of the first semiconductor switching device to decrease the first electric power delivered to the first LED load and simultaneously operates to increase the second conduction rate of the second semiconductor switching device to increase the second electric power delivered to the second LED load with the same pace such that the total light intensity generated by the light-emitting unit remains unchanged while the diffused light color temperature is accordingly adjusted to the higher diffused light color temperature; wherein the controller 1035 is designed with a diffused light color temperature switching scheme comprising a plurality of different diffused light color temperature performances to be respectively activated by the external control signal generated by the external control device, wherein different paired combinations of the first conduction rate and the second conduction rate respectively for controlling the first electric power delivered to the first LED load and the second electric power delivered to the second LED load for creating different diffused light color temperatures are preprogrammed and executed by the controller for operating a pick and play process according to the external control signal generated by the external control device for selecting a corresponding diffused light color temperature performance in the diffused light color temperature switching scheme.

In summary, the present disclosure discloses a theory and a technical foundation for building a technical framework of a color temperature tuning capacity for an LED light to simulate and mimic the natural daylight after sunset. Having lived on the earth for thousands of years thru generations, the circadian rhythms of human beings' body systems are fully accustomed to natural variations of light intensities and light color temperatures performed by the sun for regulating their living habits.

The above-mentioned descriptions represent merely the exemplary embodiment of the present disclosure without any intention to limit the scope of the present disclosure thereto. Various equivalent changes, alternations or modifications based on the claims of present disclosure are all consequently viewed as being embraced by the scope of the present disclosure.

What is claimed is:

1. An LED security light comprising:
    a light-emitting unit comprising a plurality of LEDs divided into two LED loads including a first LED load with N number LEDs emitting light with a first color temperature and a second LED load with M number LEDs emitting light with a second color temperature, wherein the first color temperature is designed with a value in a range between 1800K and 3000K and the second color temperature is designed with a value in a range between 4000K and 6500K, wherein M and N are positive integers with a value of M being greater than or equal to a value of N;

a light diffuser covering the first LED load and the second LED load to create a diffused light with a diffused light color temperature;

a loading and power control unit;

a light sensing control unit;

a power supply unit; and an external control unit including at least one external control device outputting at least one external control signal for tuning and setting the diffused light color temperature;

wherein the loading and power control unit includes at least a controller and an LED driver circuitry, wherein the LED driver circuitry is electrically connected with a power source of the power supply unit and the light-emitting unit for outputting a DC power with a constant current delivered to the light-emitting unit;

wherein the LED driver circuitry is further configured with a first LED driver comprising a first semiconductor switching device electrically coupled to the first LED load and a second LED driver comprising a second semiconductor switching device electrically coupled to the second LED load;

wherein the controller is electrically coupled with the first LED driver, the second LED driver, the light sensing control unit, and the at least one external control device;

wherein when the light-emitting unit is in a turned-on state, the controller further outputs a first control signal to control a first conduction rate of the first semiconductor switching device of the first LED driver and a second control signal to control a second conduction rate of the second semiconductor switching device of the second LED driver to respectively deliver a first electric power to the first LED load and a second electric power to the second LED load to generate the diffused light with the diffused light color temperature thru the light diffuser according to the at least one external control signal;

wherein for tuning the diffused light color temperature, the controller operates a power allocation algorithm to reversely and complementarily adjust the first electric power and the second electric power respectively delivered to the first LED load and the second LED load such that a sum of the first electric power and the second electric power remains unchanged;

wherein for tuning the diffused light color temperature to a lower diffused light color temperature, the controller operates according to the power allocation algorithm to increase the first conduction rate of the first semiconductor switching device to increase the first electric power delivered to the first LED load and simultaneously operates to decrease the second conduction rate of the second semiconductor switching device to decrease the second electric power delivered to the second LED load with the same pace such that a total light intensity generated by the light-emitting unit remains unchanged while the diffused light color temperature is accordingly adjusted to the lower diffused light color temperature;

wherein for tuning the diffused light color temperature to a higher diffused light color temperature, the controller operates according to the power allocation algorithm to decrease the first conduction rate of the first semiconductor switching device to decrease the first electric power delivered to the first LED load and simultaneously operates to increase the second conduction rate of the second semiconductor switching device to increase the second electric power delivered to the second LED load with the same pace such that the total light intensity generated by the light-emitting unit remains unchanged while the diffused light color temperature is accordingly adjusted to the higher diffused light color temperature;

wherein when a light intensity level of an ambient light detected by the light sensing control unit is lower than a first predetermined value, the loading and power control unit operates to deliver an average electric power to the light-emitting unit to turn on the light-emitting unit to perform an illumination characterized by the diffused light with the diffused light color temperature;

wherein when the light intensity level of the ambient light detected by the light sensing control unit is higher than a second predetermined value, the loading and power control unit manages to turn off all the LEDs in the light-emitting unit; and wherein the N number LEDs of the first LED load and the M number LEDs of the second LED load are respectively designed with a configuration of in series and/or in parallel connections such that when incorporated with a power level setting of the DC power, a constant electric current passing through each LED of the first LED load and each LED of the second LED load remains at a level such that a voltage V across each LED complies with an operating constraint of $V_{th} < V < V_{max}$ featuring electrical characteristics of an LED, wherein $V_{th}$ is a reference value of a threshold voltage required to trigger each LED to start emitting light and $V_{max}$ is a reference value of a maximum operating voltage across each LED at which at least one LED construction in said plurality of LEDs is vulnerable to a thermal damage.

2. The LED security light according to claim 1, wherein when each of the first LED load and the second LED load is configured with a plurality of LEDs electrically connected in series, or sets of in parallel connected LEDs electrically connected in series, a working voltage imposed on each of the first LED load and the second LED load is confined in a domain between a minimum voltage equal to the sum of the threshold voltages of all LEDs electrically connected in series or sets of in parallel connected LEDs electrically connected in series and a maximum voltage equal to the sum of the maximum operating voltages of all LEDs electrically connected in series or sets of in parallel connected LEDs electrically connected in series.

3. The LED security light according to claim 2, wherein when said plurality of LEDs are white light LEDs produced by coating at least one phosphor compound on surfaces of LEDs, said reference value of said threshold voltage $V_{th}$ is estimated at 2.5 volts and said reference value of said maximum operating voltage $V_{max}$ is estimated at 3.5 volts subject to an operating condition that a temperature of each LED connecting pin is controlled at or below 80 degree centigrade, wherein said voltage V across each LED of said plurality of LEDs complies with an operating constraint of 2.5 volts<V<3.5 volts, wherein the working voltage $V_N$ imposed on the first LED load is required to operate in a domain $N_S \times 2.5$ volts<$V_N$<$N_S \times 3.5$ volts, and a working voltage $V_M$ imposed on the second LED load is required to operate in a domain $M_S \times 2.5$ volts<$V_M$<$M_S \times 3.5$ volts, wherein $N_S$ and $M_S$ respectively denoting the numbers of in series connected LEDs in the first LED load and the second LED load, wherein $N_S \leq N$ and $M_S \leq M$.

4. The LED security light according to claim 1, wherein the controller is designed with a diffused light color temperature switching scheme comprising a plurality of different diffused light color temperature performances to be activated by the at least one external control device, wherein different paired combinations of the first conduction rate and the second conduction rate respectively for controlling the first electric power delivered to the first LED load and the second electric power delivered to the second LED load for creating different diffused light color temperature performances are preprogrammed and executed by the controller for operating a pick and play process according to the at least one external control signal generated by the at least one external control device for selecting a corresponding diffused light color temperature performance in the diffused light color temperature switching scheme.

5. The LED security light according to claim 4, wherein the at least one external control device is a voltage divider operated by a user to output a plurality of voltage signals interpretable by the controller for executing the pick and play process for respectively selecting and performing the corresponding diffused light color temperature performance in the diffused light color temperature switching scheme; wherein the voltage divider is configured to output the plurality of voltage signals respectively represented by a voltage value or a voltage format, wherein the controller operates to activate the diffused light color temperature switching scheme to generate the corresponding diffused light color temperature performance in the diffused light color temperature switching scheme according to the voltage value or the voltage format outputted by the voltage divider.

6. The LED security light according to claim 5, wherein the voltage divider is operated with a configuration of a slide switch, a rotary switch, or a pull chain switch, designed with a plurality of switching positions operable by a user for selecting and performing the corresponding diffused light color temperature performance in the diffused light color temperature switching scheme.

7. The LED security light according to claim 4, wherein the at least one external control device is a push button or a touch sensor, wherein when the push button or the touch sensor is operated, the controller accordingly operates to activate the pick and play process to alternately perform the corresponding diffused light color temperature performance in the diffused light color temperature switching scheme according to a prearranged sequence.

8. The LED security light according to claim 4, wherein the at least one external control device is a selection switch electrically connectable to a plurality of switching positions with each switching position being electrically and respectively coupled with a control pin of the controller, wherein when the selection switch is connected to one of the plurality of switching positions, a constant voltage signal is delivered to a corresponding control pin of the controller to activate the diffused light color temperature switching scheme for selecting the corresponding diffused light color temperature.

9. The LED security light according to claim 4, wherein the at least one external control device is a wireless remote control device comprising at least one wireless external signal receiver electrically coupled with the controller to receive at least one wireless external control signal and convert the at least one wireless external control signal into the at least one external control signal interpretable by the controller for activating the pick and play process to select and perform the corresponding diffused light color temperature performance in the diffused light color temperature switching scheme.

10. The LED security light according to claim 4, wherein the at least one external control device is an active infrared ray sensor for detecting an infrared light signal reflected from an object and converting the infrared light signal reflected from the object into the at least one external control signal characterized by a signal format interpretable by the controller for executing the pick and play process for selecting and performing the corresponding diffused light color temperature performance in the diffused light color temperature switching scheme.

11. The LED security light according to claim 4, wherein the diffused light color temperature switching scheme comprises at least a high diffused light color temperature performance and a low diffused light color temperature performance, wherein for performing the high diffused light color temperature performance, the second semiconductor switching device is fully conducted and the first semiconductor switching device is completely cut off, wherein for performing the low diffused light color temperature performance, the first semiconductor switching device is fully conducted and the second semiconductor switching device is completely cut off.

12. The LED security light according to claim 4, wherein the diffused light color temperature switching scheme comprises at least a high diffused light color temperature performance, a low diffused light color temperature performance and a medium diffused light color temperature performance, wherein for performing the high diffused light color temperature performance, the second semiconductor switching device is fully conducted and the first semiconductor switching device is completely cut off, wherein for performing the low diffused light color temperature performance, the first semiconductor switching device is fully conducted while the second semiconductor switching device is completely cut off, wherein for performing the medium diffused light color temperature performance, the first semiconductor switching device and the second semiconductor switching device are both partially and complementarily conducted such that the total light intensity generated by the light-emitting unit remains unchanged.

13. The LED security light according to claim 12, wherein the controller is further designed with a free running process to operate a free running performance of the diffused light color temperature switching scheme, wherein a second external control device is designed to output a second external control signal to activate the free running process, wherein the controller manages to operate the free running process to gradually rotate a running pick and play of the diffused light color temperature switching scheme, wherein the free running process operates to perform the low diffused light color temperature performance first for a predetermined short time interval, and then is switched to perform the medium diffused light color temperature performance for the predetermined short time interval, and then is switched to perform the high diffused light color temperature performance for the predetermined short time interval to complete a free running cycle, the free running cycle continues till the second external control signal is ceased or till the second external control device outputs another second external control signal to end the free running process.

14. The LED security light according to claim 1, wherein the first semiconductor switching device and the second semiconductor switching device are unidirectional semiconductor switching devices.

15. The LED security light according to claim 4, wherein the at least one external control signal is at least one short power interruption signal generated by operating a main power switch within a predetermined time interval, a push button, a touch sensor or a wireless remote control device, wherein a power interruption detection circuit is electrically coupled with the controller, wherein when the at least one short power interruption signal is detected by the power interruption detection circuit, the controller operates to alternately perform the corresponding diffused light color temperature performance in the diffused light color temperature switching scheme according to a prearranged sequence.

16. The LED security light according to claim 15, wherein when the main power switch is used for generating the at least one short power interruption signal, the main power switch is turned off and turned back on within the predetermined time interval.

17. The LED security light according to claim 15, wherein when the push button or the touch sensor is used, a signal detection circuitry is connected to the push button or the touch sensor, wherein when the push button or the touch sensor is operated, a voltage signal is transmitted to the signal detection circuitry to actuate a momentary power interruption and consequently the at least one short power interruption signal is generated and detected by the power interruption detection circuit, the controller accordingly operates to alternately perform the corresponding diffused light color temperature performance in the diffused light color temperature switching scheme according to the prearranged sequence.

18. An LED security light comprising:
a light-emitting unit comprising a plurality of LEDs divided into two LED loads including a first LED load with N number LEDs emitting light with a first color temperature and a second LED load with M number LEDs emitting light with a second color temperature, wherein the first color temperature is designed with a value in a range between 1800K and 3000K and the second color temperature is designed with a value in a range between 4000K and 6500K, wherein M and N are positive integers with a value of M being greater than or equal to a value of N;
a light diffuser covering the first LED load and the second LED load to create a diffused light with a diffused light color temperature;
a loading and power control unit;
a light sensing control unit;
a motion sensing unit;
a power supply unit; and
an external control unit including at least one external control device outputting at least one external control signal for tuning and setting the diffused light color temperature;
wherein the loading and power control unit includes at least a controller and an LED driver circuitry, wherein the LED driver circuitry is electrically connected with a DC power source of the power supply unit and the light-emitting unit for managing a DC power delivered to the light-emitting unit; wherein the LED driver circuitry is further configured with a first LED driver comprising a first semiconductor switching device electrically coupled to the first LED load and a second LED driver comprising a second semiconductor switching device electrically coupled to the second LED load;
wherein the controller is electrically coupled with the first LED driver, the second LED driver, the light sensing control unit, the motion sensing unit, and the at least one external control device;
wherein when the light-emitting unit is in a turned-on state, the controller further outputs a first control signal to control a first conduction rate of the first semiconductor switching device of the first LED driver and a second control signal to control a second conduction rate of the second semiconductor switching device of the second LED driver to respectively deliver a first electric power to the first LED load and a second electric power to the second LED load to generate the diffused light with the diffused light color temperature thru the light diffuser according to the at least one external control signal;
wherein for tuning the diffused light color temperature, the controller operates a power allocation algorithm to reversely and complementarily adjust the first electric power and the second electric power respectively delivered to the first LED load and the second LED load such that a sum of the first electric power and the second electric power remains unchanged;
wherein for tuning the diffused light color temperature to a lower diffused light color temperature, the controller operates according to the power allocation algorithm to increase the first conduction rate of the first semiconductor switching device to increase the first electric power delivered to the first LED load and simultaneously operates to decrease the second conduction rate of the second semiconductor switching device to decrease the second electric power delivered to the second LED load with the same pace such that a total light intensity generated by the light-emitting unit remains unchanged while the diffused light color temperature is accordingly adjusted to the lower diffused light color temperature;
wherein for tuning the diffused light color temperature to a higher diffused light color temperature, the controller operates according to the power allocation algorithm to decrease the first conduction rate of the first semiconductor switching device to decrease the first electric power delivered to the first LED load and simultaneously operates to increase the second conduction rate of the second semiconductor switching device to increase the second electric power delivered to the second LED load with the same pace such that the total light intensity generated by the light-emitting unit remains unchanged while the diffused light color temperature is accordingly adjusted to the higher diffused light color temperature;
wherein when a light intensity level of an ambient light detected by the light sensing control unit is lower than a first predetermined value, the loading and power control unit operates to activate the motion sensing unit for controlling a lighting performance of the light-emitting unit;
wherein when a motion signal is detected by the motion sensing unit, the loading and power control unit operates to deliver an electric power to the light-emitting unit to generate an illumination characterized by the diffused light with a selected diffused light color temperature according to the at least one external control signal received from the motion sensing unit for a predetermined time duration before resuming to a turned-off state of the light-emitting unit;
wherein when the light intensity level of the ambient light detected by the light sensing control unit is higher than a second predetermined value, the loading and power control unit manages to deactivate the motion sensing unit to turn off all LEDs of the light-emitting unit; and wherein the N number LEDs of the first LED load and the M number LEDs of the second LED load are respectively designed with a configuration of in series and/or in parallel connections such that when incorporated with a power level setting of the DC power, a constant electric current passing through each LED of the first LED load and each LED of the second LED load remains at a level such that a voltage V across each LED complies with an operating constraint of $V_{th}<V<V_{max}$ featuring electrical characteristics of an LED, wherein $V_{th}$ is a reference value of a threshold voltage required to trigger each LED to start emitting light and $V_{max}$ is a reference value of a maximum operating voltage across each LED at which at least one LED construction in said plurality of LEDs is vulnerable to a thermal damage.

19. The LED security light according to claim 18, wherein when each of the first LED load and the second LED load is configured with a plurality of LEDs electrically connected in series, or sets of in parallel connected LEDs electrically connected in series, a working voltage imposed on each of the first LED load and the second LED load is confined in a domain between a minimum voltage equal to the sum of the threshold voltages of all LEDs electrically connected in series or sets of in parallel connected LEDs electrically connected in series and a maximum voltage equal to the sum of the maximum operating voltages of all LEDs electrically connected in series or sets of in parallel connected LEDs electrically connected in series.

20. The LED security light according to claim 18, wherein when said plurality of LEDs are white light LEDs produced by coating at least one phosphor compound on surfaces of LEDs, said reference value of said threshold voltage $V_{th}$ is estimated at 2.5 volts and said reference value of said maximum operating voltage $V_{max}$ is estimated at 3.5 volts subject to an operating condition that a temperature of each LED connecting pin is controlled at or below 80 degree centigrade, wherein said voltage V across each LED of said plurality of LEDs complies with an operating constraint of 2.5 volts<V<3.5 volts, wherein the working voltage $V_N$ imposed on the first LED load is required to operate in a domain $N_S \times 2.5$ volts<$V_N$<$N_S \times 3.5$ volts, and the working voltage $V_M$ imposed on the second LED load is required to operate in a domain $M_S \times 2.5$ volts<$V_M$<$M_S \times 3.5$ volts, wherein Ns and Ms respectively denoting the numbers of in series connected LEDs in the first LED load and the second LED load, wherein $N_S \leq N$ and $M_S \leq M$.

21. The LED security light according to claim 18, wherein the controller is designed with a diffused light color temperature switching scheme comprising a plurality of different diffused light color temperature performances to be activated by the at least one external control device, wherein different paired combinations of the first conduction rate and the second conduction rate respectively for controlling the first electric power delivered to the first LED load and the second electric power delivered to the second LED load for creating different diffused light color temperatures are preprogrammed and executed by the controller for operating a pick and play process according to the at least one external control signal generated by the at least one external control device for selecting a corresponding diffused light color temperature performance in the diffused light color temperature switching scheme.

22. The LED security light according to claim 18, wherein the at least one external control signal is at least one short power interruption signal generated by operating a main power switch within a predetermined time interval, a push button, a touch sensor or a wireless remote control device, wherein a power interruption detection circuit is electrically coupled with the controller, wherein when the at least one short power interruption signal is detected by the power interruption detection circuit, the controller operates to alternately perform a corresponding diffused light color temperature performance in a diffused light color temperature switching scheme according to a prearranged sequence.

23. The LED security light according to claim 22, wherein when the main power switch is used for generating the at least one short power interruption signal, the main power switch is turned off and turned back on within the predetermined time interval.

24. The LED security light according to claim 22, wherein when the push button or the touch sensor is used, a signal detection circuitry is connected to the push button or the touch sensor, wherein when the push button or the touch sensor is operated, a voltage signal is transmitted to the signal detection circuitry to actuate a momentary power interruption and consequently the at least one short power interruption signal is generated and detected by the power interruption detection circuit, the controller accordingly operates to alternately perform the corresponding diffused light color temperature performance in the diffused light color temperature switching scheme according to the prearranged sequence.

25. The LED security light according to claim 18, wherein the at least one external control device is a voltage divider operated by a user to output a plurality of voltage signals interpretable by the controller for executing the pick and play process for respectively selecting and performing a corresponding diffused light color temperature performance in a diffused light color temperature switching scheme; wherein the voltage divider is configured to output the plurality of voltage signals respectively represented by a voltage value or a voltage format, wherein the controller operates to activate the diffused light color temperature switching scheme to generate the corresponding diffused light color temperature performance in the diffused light color temperature switching scheme according to the voltage value or the voltage format outputted by the voltage divider.

26. The LED security light according to claim 25, wherein the voltage divider is operated with a configuration of a slide switch, a rotary switch, or a pull chain switch, designed with a plurality of switching positions operable by a user for selecting and performing the corresponding diffused light color temperature performance in the diffused light color temperature switching scheme.

27. The LED security light according to claim 18, wherein the at least one external control device is a push button or a touch sensor, wherein when the push button or the touch sensor is operated, the controller accordingly operates to activate the pick and play process to alternately perform a corresponding diffused light color temperature performance in a diffused light color temperature switching scheme according to a prearranged sequence.

28. The LED security light according to claim 18, wherein the at least one external control device is a selection switch electrically connectable to a plurality of switching positions with each switching position being electrically and respectively coupled with a control pin of the controller, wherein when the selection switch is connected to one of the plurality of switching positions, a constant voltage signal is delivered to a corresponding control pin of the controller to activate a diffused light color temperature switching scheme for selecting a corresponding diffused light color temperature.

29. The LED security light according to claim 18, wherein the at least one external control device is a wireless remote control device comprising at least one wireless external signal receiver electrically coupled with the controller to receive at least one wireless external control signal and convert the at least one wireless external control signal into the at least one external control signal interpretable by the controller for activating the pick and play process to select and perform a corresponding diffused light color temperature performance in a diffused light color temperature switching scheme.

30. The LED security light according to claim 18, wherein the at least one external control device is an active infrared ray sensor for detecting an infrared light reflected from an object and converting the infrared light reflected from the object into the at least one external control signal interpretable by the controller for executing the pick and play process for selecting and performing a corresponding diffused light color temperature performance in a diffused light color temperature switching scheme.

31. The LED security light according to claim 18, wherein a diffused light color temperature switching scheme comprises at least a high diffused light color temperature performance and a low diffused light color temperature performance, wherein for performing the high diffused light color temperature performance, the second semiconductor switching device is fully conducted and the first semiconductor switching device is completely cut off, wherein for performing the low diffused light color temperature performance, the first semiconductor switching device is fully conducted and the second semiconductor switching device is completely cut off.

32. The LED security light according to claim 18, wherein a diffused light color temperature switching scheme comprises at least a high diffused light color temperature performance, a low diffused light color temperature performance and a medium diffused light color temperature performance, wherein for performing the high diffused light color temperature performance, the second semiconductor switching device is fully conducted and the first semiconductor switching device is completely cut off, wherein for performing the low diffused light color temperature performance, the first semiconductor switching device is fully conducted while the second semiconductor switching device is completely cut off, wherein for performing the medium diffused light color temperature performance, the first semiconductor switching device and the second semiconductor switching device are both partially and complementarily conducted such that the total light intensity generated by the light-emitting unit remains unchanged.

33. The LED security light according to claim 32, wherein the controller is further designed with a free running process to operate a free running performance of the diffused light color temperature switching scheme, wherein a second external control device is designed to output a second external control signal to activate the free running process, wherein the controller manages to operate the free running process to gradually rotate a running pick and play of the diffused light color temperature switching scheme, wherein the free running process operates to perform the low diffused light color temperature performance first for a predetermined short time interval, and then is switched to perform the medium diffused light color temperature performance for the predetermined short time interval, and then is switched to perform the high diffused light color temperature performance for the predetermined short time interval to complete a free running cycle, the free running cycle continues till the second external control signal is ceased or till the second external control device outputs another second external control signal to end the free running process.

34. A method of configuring an LED lighting device with a tunable diffused light color temperature, comprising:
  using a light-emitting unit comprising a plurality of LEDs divided into at least two LED loads including at least a first LED load with N number LEDs emitting light with a first color temperature and at least a second LED load with M number LEDs emitting light with a second color temperature, wherein the first color temperature is designed with a value in a range between 1800K and 3000K and the second color temperature is designed with a value in a range between 4000K and 6500K, wherein M and N are positive integers with a value of M being greater than or equal to a value of N;
  using a light diffuser covering the first LED load and the second LED load to create a diffused light with a diffused light color temperature;
  using a power allocation circuitry electrically connected with a power source from a power supply unit and the light-emitting unit to manage a distribution of a DC power between a first electric power delivered to the first LED load and a second electric power delivered to the second LED load to perform an illumination characterized by the diffused light with the diffused light color temperature; and
  using at least one external control device to output at least one external control signal for tuning and selecting a corresponding diffused light color temperature performance;
  wherein the power allocation circuitry comprises at least a controller and an LED driver circuitry, wherein the LED driver circuitry is further configured with a first LED driver comprising a first semiconductor switching device electrically coupled to the first LED load and a second LED driver comprising a second semiconductor switching device electrically coupled to the second LED load for controlling the first electric power and the second electric power respectively delivered to the first LED load and the second LED load;
  wherein the controller is electrically coupled with the first LED driver, the second LED driver, and the at least one external control device;
  wherein for tuning the diffused light color temperature, the controller operates a power allocation algorithm to reversely and complementarily adjust the first electric power and the second electric power respectively delivered to the first LED load and the second LED load such that a sum of the first electric power and the second electric power remains unchanged;
  wherein the controller operates the power allocation algorithm to output a first control signal to control a first conduction rate of the first semiconductor switching device of the first LED driver and a second control signal to control a second conduction rate of the second semiconductor switching device of the second LED driver to respectively deliver the first electric power to the first LED load and the second electric power to the second LED load to generate the diffused light with the diffused light color temperature thru the light diffuser according to the at least one external control signal;
  wherein for tuning the diffused light color temperature, the controller operates the power allocation algorithm to reversely and complementarily adjust the first electric power and the second electric power respectively delivered to the first LED load and the second LED load such that the sum of the first electric power and the second electric power remains unchanged;

wherein for tuning the diffused light color temperature to a lower diffused light color temperature, the controller operates the power allocation algorithm to increase the first conduction rate of the first semiconductor switching device to increase the first electric power delivered to the first LED load and simultaneously operates to decrease the second conduction rate of the second semiconductor switching device to decrease the second electric power delivered to the second LED load with the same pace such that a total light intensity generated by the light-emitting unit remains unchanged while the diffused light color temperature is accordingly adjusted to the lower diffused light color temperature;

wherein for tuning the diffused light color temperature to a higher diffused light color temperature, the controller operates the power allocation algorithm to decrease the first conduction rate of the first semiconductor switching device to decrease the first electric power delivered to the first LED load and simultaneously operates to increase the second conduction rate of the second semiconductor switching device to increase the second electric power delivered to the second LED load with the same pace such that the total light intensity generated by the light-emitting unit remains unchanged while the diffused light color temperature is accordingly adjusted to the higher diffused light color temperature; and wherein the N number LEDs of the first LED load and the M number LEDs of the second LED load are respectively designed with a configuration of in series and/or in parallel connections such that when incorporated with a power level setting of the DC power, a constant electric current passing through each LED of the first LED load and each LED of the second LED load remains at a level such that a voltage V across each LED complies with an operating constraint of $V_{th}<V<V_{max}$ featuring electrical characteristics of an LED, wherein $V_{th}$ is a reference value of a threshold voltage required to trigger each LED to start emitting light and $V_{max}$ is a reference value of a maximum operating voltage across each LED at which at least one LED construction in said plurality of LEDs is vulnerable to a thermal damage.

35. The method of configuring an LED lighting device with a tunable diffused light color temperature according to claim 34, wherein when each of the first LED load and the second LED load is configured with a plurality of LEDs electrically connected in series, or sets of in parallel connected LEDs electrically connected in series, a working voltage imposed on each of the first LED load and the second LED load is confined in a domain between a minimum voltage equal to the sum of the threshold voltages of all LEDs electrically connected in series or sets of in parallel connected LEDs electrically connected in series and a maximum voltage equal to the sum of the maximum operating voltages of all LEDs electrically connected in series or sets of in parallel connected LEDs electrically connected in series.

36. The method of configuring an LED lighting device with a tunable diffused light color temperature according to claim 35, wherein when said plurality of LEDs are white light LEDs produced by coating at least one phosphor compound on surfaces of LEDs, said reference value of said threshold voltage $V_{th}$ is estimated at 2.5 volts and said reference value of said maximum operating voltage $V_{max}$ is estimated at 3.5 volts subject to an operating condition that a temperature of each LED connecting pin is controlled at or below 80 degree centigrade, wherein said voltage V across each LED of said plurality of LEDs complies with an operating constraint of 2.5 volts<V<3.5 volts, wherein the working voltage $V_N$ imposed on the first LED load is required to operate in a domain $N_S \times 2.5$ volts<$V_N$<$N_S \times 3.5$ volts, and the working voltage $V_M$ imposed on the second LED load is required to operate in a domain $M_S \times 2.5$ volts<$V_M$<$M_S \times 3.5$ volts, wherein $N_S$ and $M_S$ respectively denoting the numbers of in series connected LEDs in the first LED load and the second LED load, wherein $N_S \leq N$ and $M_S \leq M$.

37. The method of configuring an LED lighting device with a tunable diffused light color temperature according to claim 34, wherein the power supply unit comprises an AC/DC power converter and a constant current control circuit to output the DC power with a constant current.

38. The method of configuring an LED lighting device with a tunable diffused light color temperature according to claim 34, wherein the power supply unit is configured with a battery to output the DC power.

39. The method of configuring an LED lighting device with a tunable diffused light color temperature according to claim 34, wherein the controller is designed with a diffused light color temperature switching scheme comprising a plurality of different diffused light color temperature performances to be respectively activated by the at least one external control signal generated by the at least one external control device, wherein different paired combinations of the first conduction rate and the second conduction rate respectively for controlling the first electric power delivered to the first LED load and the second electric power delivered to the second LED load for creating different diffused light color temperatures are preprogrammed and executed by the controller for operating a pick and play process according to the at least one external control signal generated by the at least one external control device for selecting the corresponding diffused light color temperature performance in the diffused light color temperature switching scheme.

40. The method of configuring an LED lighting device with a tunable diffused light color temperature according to claim 39, wherein the at least one external control device is a push button or a touch sensor, wherein when the push button or the touch sensor is operated, the controller accordingly operates to activate the pick and play process to alternately perform the corresponding diffused light color temperature performance in the diffused light color temperature switching scheme according to a prearranged sequence.

41. The method of configuring an LED lighting device with a tunable diffused light color temperature according to claim 40, wherein the at least one external control signal is at least one short power interruption signal within a predetermined time interval generated by operating a main power switch, a push button, a touch sensor or a wireless remote control device, wherein a power interruption detection circuit is electrically coupled with the controller, wherein when the at least one short power interruption signal is detected by the power interruption detection circuit, the controller operates to alternately perform the corresponding diffused light color temperature performance in the diffused light color temperature switching scheme according to the prearranged sequence.

42. The method of configuring an LED lighting device with a tunable diffused light color temperature according to claim 41, wherein when the main power switch is used for generating the at least one short power interruption signal, the main power switch is turned off and turned back on within the predetermined time interval.

43. The method of configuring an LED lighting device with a tunable diffused light color temperature according to claim 41, wherein when the push button or the touch sensor is used, a signal detection circuitry is connected to the push button or the touch sensor, wherein when the push button or the touch sensor is operated, a voltage signal is transmitted to the signal detection circuitry to actuate a momentary power interruption and consequently the at least one short power interruption signal is generated and detected by the power interruption detection circuit, the controller accordingly operates to alternately perform the corresponding diffused light color temperature performance in the diffused light color temperature switching scheme according to the prearranged sequence.

44. The method of configuring an LED lighting device with a tunable diffused light color temperature according to claim 40, wherein the at least one external control device is a voltage divider operated by a user to output a plurality of voltage signals interpretable by the controller for respectively selecting and performing the corresponding diffused light color temperature performance in the diffused light color temperature switching scheme; wherein the voltage divider is configured to output the plurality of voltage signals respectively represented by a voltage value or a voltage format interpretable to the controller, wherein the controller operates to activate the diffused light color temperature switching scheme to generate the corresponding diffused light color temperature performance in the diffused light color temperature switching scheme according to the voltage value or the voltage format outputted by the voltage divider.

45. The method of configuring an LED lighting device with a tunable diffused light color temperature according to claim 44, wherein the voltage divider is operated with a configuration of a slide switch, a rotary switch, or a pull chain switch, designed with a plurality of switching positions operable by a user for selecting and performing the corresponding diffused light color temperature performance in the diffused light color temperature switching scheme.

46. The method of configuring an LED lighting device with a tunable diffused light color temperature according to claim 39, wherein the at least one external control device is a selection switch electrically connectable to a plurality of switching positions with each switching position being electrically and respectively coupled with a control pin of the controller, wherein when the selection switch is connected to one of the plurality of switching positions, a constant voltage signal is delivered to a corresponding control pin of the controller to activate the diffused light color temperature switching scheme for selecting the corresponding diffused light color temperature.

47. The method of configuring an LED lighting device with a tunable diffused light color temperature according to claim 39, wherein the at least one external control device is a wireless remote control device comprising at least one wireless external signal receiver electrically coupled with the controller to receive at least one wireless external control signal and convert the at least one wireless external control signal into the at least one external control signal interpretable by the controller for activating the pick and play process to select and perform the corresponding diffused light color temperature performance in the diffused light color temperature switching scheme.

48. The method of configuring an LED lighting device with a tunable diffused light color temperature according to claim 39, wherein the at least one external control device is an active infrared ray sensor for detecting an infrared light reflected from an object and converting the infrared light reflected from the object into the at least one external control signal interpretable by the controller for executing the pick and play process for selecting and performing the corresponding diffused light color temperature performance in the diffused light color temperature switching scheme.

49. The method of configuring an LED lighting device with a tunable diffused light color temperature according to claim 39, wherein the diffused light color temperature switching scheme comprises at least a high diffused light color temperature performance and a low diffused light color temperature performance, wherein for performing the high diffused light color temperature performance, the second semiconductor switching device is fully conducted and the first semiconductor switching device is completely cut off, wherein for performing the low diffused light color temperature performance, the first semiconductor switching device is fully conducted and the second semiconductor switching device is completely cut off.

50. The method of configuring an LED lighting device with a tunable diffused light color temperature according to claim 39, wherein the diffused light color temperature switching scheme comprises at least a high diffused light color temperature performance, a low diffused light color temperature performance and a medium diffused light color temperature performance, wherein for performing the high diffused light color temperature performance, the second semiconductor switching device is fully conducted and the first semiconductor switching device is completely cut off, wherein for performing the low diffused light color temperature performance, the first semiconductor switching device is fully conducted while the second semiconductor switching device is completely cut off, wherein for performing the medium diffused light color temperature performance, the first semiconductor switching device and the second semiconductor switching device are both partially and complementarily conducted such that the total light intensity generated by the light-emitting unit remains unchanged.

51. The method of configuring an LED lighting device with a tunable diffused light color temperature according to claim 50, wherein the controller is further designed with a free running process to operate a free running performance of the diffused light color temperature switching scheme, wherein a second external control device is designed to output a second external control signal to activate the free running process, wherein the controller manages to operate the free running process to gradually rotate a running pick and play of the diffused light color temperature switching scheme, wherein the free running process operates to perform the low diffused light color temperature performance first for a predetermined short time interval, and then is switched to perform the medium diffused light color temperature performance for the predetermined short time interval, and then is switched to perform the high diffused light color temperature performance for the predetermined short time interval to complete a free running cycle, the free running cycle continues till the second external control signal is ceased or till the second external control device outputs another second external control signal to end the free running process.

52. An LED lighting device configured with a tunable diffused light color temperature, comprising:

a light-emitting unit comprising a plurality of LEDs divided into at least two LED loads including at least a first LED load with N number LEDs emitting light with a first color temperature and at least a second LED load with M number LEDs emitting light with a second color temperature, wherein the first color temperature is designed with a value in a range between 1800K and 3000K and the second color temperature is designed with a value in a range between 4000K and 6500K, wherein M and N are positive integers with a value of M being greater than or equal to a value of N;

a light diffuser covering the first LED load and the second LED load to create a diffused light with a diffused light color temperature;

a power allocation circuitry electrically connected with a power source from a power supply unit and the light-emitting unit to manage a distribution of a DC power between a first electric power delivered to the first LED load and a second electric power delivered to the second LED load to perform an illumination characterized by the diffused light with the diffused light color temperature; and at least one external control device to output at least one external control signal for tuning and selecting diffused light color temperature performance;

wherein the power allocation circuitry comprises at least a controller and an LED driver circuitry, wherein the LED driver circuitry is further configured with a first LED driver comprising a first semiconductor switching device electrically coupled to the first LED load and a second LED driver comprising a second semiconductor switching device electrically coupled to the second LED load for controlling the first electric power and the second electric power respectively delivered to the first LED load and the second LED load;

wherein the controller is electrically coupled with the first LED driver, the second LED driver, and the at least one external control device;

wherein when the light-emitting unit is in a turned-on state, the controller further outputs a first control signal to control a first conduction rate of the first semiconductor switching device of the first LED driver and a second control signal to control a second conduction rate of the second semiconductor switching device of the second LED driver to respectively deliver the first electric power to the first LED load and the second electric power to the second LED load to generate the diffused light with the diffused light color temperature thru the light diffuser according to the at least one external control signal;

wherein for tuning the diffused light color temperature, the controller operates a power allocation algorithm to reversely and complementarily adjust the first electric power and the second electric power respectively delivered to the first LED load and the second LED load such that a sum of the first electric power and the second electric power remains unchanged;

wherein for tuning the diffused light color temperature to a lower diffused light color temperature, the controller operates to increase the first conduction rate of the first semiconductor switching device to increase the first electric power delivered to the first LED load and simultaneously operates to decrease the second conduction rate of the second semiconductor switching device to decrease the second electric power delivered to the second LED load with the same pace such that a total light intensity generated by the light-emitting unit remains unchanged while the diffused light color temperature is accordingly adjusted to the lower diffused light color temperature;

wherein for tuning the diffused light color temperature to a higher diffused light color temperature, the controller operates to decrease the first conduction rate of the first semiconductor switching device to decrease the first electric power delivered to the first LED load and simultaneously operates to increase the second conduction rate of the second semiconductor switching device to increase the second electric power delivered to the second LED load with the same pace such that the total light intensity generated by the light-emitting unit remains unchanged while the diffused light color temperature is accordingly adjusted to the higher diffused light color temperature;

wherein the controller is designed with at least one diffused light color temperature switching scheme comprising a plurality of different diffused light color temperature performances to be respectively activated by the at least one external control signal generated by the at least one external control device, wherein different paired combinations of the first conduction rate and the second conduction rate respectively for controlling the first electric power delivered to the first LED load and the second electric power delivered to the second LED load for creating different diffused light color temperatures are preprogrammed and executed by the controller for operating a pick and play process according to the at least one external control signal generated by the at least one external control device for selecting a corresponding diffused light color temperature performance in the at least one diffused light color temperature switching scheme; and wherein the N number LEDs of the first LED load and the M number LEDs of the second LED load are respectively designed with a configuration of in series and/or in parallel connections such that when incorporated with a power level setting of the DC power, an electric current passing through each LED of the first LED load and each LED of the second LED load remains at a level such that a voltage V across each LED complies with an operating constraint of $V_{th}<V<V_{max}$ featuring electrical characteristics of an LED, wherein $V_{th}$ is a reference value of a threshold voltage required to trigger each LED to start emitting light and $V_{max}$ is a reference value of a maximum operating voltage across each LED at which at least one LED construction in said plurality of LEDs is vulnerable to a thermal damage.

53. The LED lighting device configured with a tunable diffused light color temperature according to claim 52, wherein when each of the first LED load and the second LED load is configured with a plurality of LEDs electrically connected in series, or sets of in parallel connected LEDs electrically connected in series, a working voltage imposed on each of the first LED load and the second LED load is confined in a domain between a minimum voltage equal to the sum of the threshold voltages of all LEDs electrically connected in series or sets of in parallel connected LEDs electrically connected in series and a maximum voltage equal to the sum of the maximum operating voltages of all LEDs electrically connected in series or sets of in parallel connected LEDs electrically connected in series.

54. The LED lighting device configured with a tunable diffused light color temperature according to claim 52, wherein when said plurality of LEDs are white light LEDs produced by coating at least one phosphor compound on surfaces of LEDs, said reference value of said threshold voltage $V_{th}$ is estimated at 2.5 volts and said reference value of said maximum operating voltage $V_{max}$ is estimated at 3.5 volts subject to an operating condition that a temperature of each LED connecting pin is controlled at or below 80 degree centigrade, wherein said voltage V across each LED of said plurality of LEDs complies with an operating constraint of 2.5 volts<V<3.5 volts, wherein the working voltage $V_N$ imposed on the first LED load is required to operate in a domain $N_S \times 2.5$ volts<$V_N$<$N_S \times 3.5$ volts, and the working voltage $V_M$ imposed on the second LED load is required to operate in a domain $M_S \times 2.5$ volts<$V_M$<$M_S \times 3.5$ volts, wherein $N_S$ and $M_S$ respectively denoting the numbers of in series connected LEDs in the first LED load and the second LED load, wherein $N_S \leq N$ and $M_S \leq M$.

55. The LED lighting device configured with a tunable diffused light color temperature according to claim 52, wherein the power source is an AC power source electrically connected with an AC/DC power converter and a constant current control circuit to output the DC power with a constant current.

56. The LED lighting device configured with a tunable diffused light color temperature according to claim 52, wherein the light-emitting unit is turned on by a power switch to perform an illumination characterized by the diffused light with the diffused light color temperature.

57. The LED lighting device configured with a tunable diffused light color temperature according to claim 52, wherein the power source is a DC power source configured with a battery to output the DC power.

58. The LED lighting device configured with a tunable diffused light color temperature according to claim 52, wherein a photo sensor is installed and electrically connected to the controller, wherein the light-emitting unit is turned on by the controller at dusk when a light intensity level of an ambient light detected by the photo sensor is lower than a first predetermined value to perform an illumination characterized by the diffused light with a selected diffused light color temperature; wherein the light-emitting unit is turned off by the controller at dawn when the light intensity level of the ambient light detected by the photo sensor is higher than a second predetermined value.

59. The LED lighting device configured with a tunable diffused light color temperature according to claim 52, wherein a photo sensor and a motion sensor are respectively and electrically connected to the controller, wherein the light-emitting unit is activated at dusk when a light intensity level of an ambient light detected by the photo sensor is lower than a first predetermined value, wherein when a motion signal is detected by the motion sensor, the controller operates to control the LED driver circuitry to deliver the DC power to the light-emitting unit to perform an illumination characterized by the diffused light with a selected diffused light color temperature for a predetermined time duration; wherein at dawn when the light intensity level of the ambient light detected is higher than a second predetermined value, the light-emitting unit is turned off.

60. The LED lighting device configured with a tunable diffused light color temperature according to claim 52, wherein a photo sensor and a motion sensor are respectively and electrically connected to the controller; wherein at dusk when a light intensity level of an ambient light detected by the photo sensor is lower than a first predetermined value, the controller operates to control the LED driver circuitry to deliver an electric power to the light-emitting unit to perform a first illumination mode characterized by a first diffused light intensity with a first diffused light color temperature for a first predetermined time duration, wherein when the light intensity level of the ambient light detected by the photo sensor is higher than a second predetermined value, the controller operates to turn off the light-emitting unit, wherein when a motion signal is detected by the motion sensor, the controller operates to control the LED driver circuitry to increase the electric power delivered to the light-emitting unit to perform a second illumination mode characterized by a second diffused light intensity with a second diffused light color temperature for a second predetermined time duration.

61. The LED lighting device configured with a tunable diffused light color temperature according to claim 60, wherein the first diffused light intensity is designed with a level in a range greater than 0% but less than or equal to 50% of a maximum light intensity designed for the light-emitting unit, wherein the second diffused light intensity is designed with a level in a range greater than 50% but less than or equal to 100% of the maximum light intensity of the light-emitting unit.

62. The LED lighting device configured with a tunable diffused light color temperature according to claim 52, wherein the light-emitting unit is turned on by a wireless external control signal received from a wireless remote control device, a smart phone or a smart speaker.

63. The LED lighting device configured with a tunable diffused light color temperature according to claim 52, wherein the at least one external control signal is a short power interruption signal generated by operating a main power switch, a push button, a touch sensor or a wireless remote control device; wherein a power interruption detection circuit is electrically coupled with the controller, wherein when the short power interruption signal is detected by the power interruption detection circuit, the controller operates to alternately perform the corresponding diffused light color temperature performance in the at least one diffused light color temperature switching scheme according to a prearranged sequence.

64. The LED lighting device configured with a tunable diffused light color temperature according to claim 63, wherein when the main power switch is used for generating the short power interruption signal, the main power switch is turned off and turned back on within a predetermined time interval.

65. The LED lighting device configured with a tunable diffused light color temperature according to claim 63, wherein when the push button or the touch sensor is used, a signal detection circuitry is connected to the push button or the touch sensor, wherein when the push button or the touch sensor is operated, a voltage signal is transmitted to the signal detection circuitry to actuate a momentary power interruption and consequently the short power interruption signal is generated and detected by the power interruption detection circuit, the controller accordingly operates to alternately perform the corresponding diffused light color temperature performance in the at least one diffused light color temperature switching scheme according to the prearranged sequence.

66. The LED lighting device configured with a tunable diffused light color temperature according to claim 52, wherein the at least one external control device is a voltage divider operated by a user to output a plurality of voltage signals interpretable by the controller for executing the pick and play process for respectively selecting and performing the corresponding diffused light color temperature performance in the at least one diffused light color temperature switching scheme; wherein the voltage divider is configured to output the plurality of voltage signals respectively represented by a voltage value or a voltage format interpretable by the controller, wherein the controller operates to activate the at least one diffused light color temperature switching scheme to generate the corresponding diffused light color temperature performance in the at least one diffused light color temperature switching scheme according to the voltage value or the voltage format outputted by the voltage divider.

67. The LED lighting device configured with a tunable diffused light color temperature according to claim 66, wherein the voltage divider is operated with a configuration of a slide switch, a rotary switch, or a pull chain switch, designed with a plurality of switching positions operable by a user for selecting and performing the corresponding diffused light color temperature performance in the at least one diffused light color temperature switching scheme.

68. The LED lighting device configured with a tunable diffused light color temperature according to claim 52, wherein the at least one external control device is a wireless remote control device comprising at least one wireless external signal receiver electrically coupled with the controller to receive at least one wireless external control signal and convert the at least one wireless external control signal into the at least one external control signal interpretable by the controller for activating the pick and play process to select and perform the corresponding diffused light color temperature performance in the at least one diffused light color temperature switching scheme.

69. The LED lighting device configured with a tunable diffused light color temperature according to claim 52, wherein the at least one external control device is a push button or a touch sensor, wherein when the push button or the touch sensor is operated, the controller accordingly operates to activate the pick and play process to alternately perform the corresponding diffused light color temperature performance in the at least one diffused light color temperature switching scheme according to a prearranged sequence.

70. The LED lighting device configured with a tunable diffused light color temperature according to claim 52, wherein the at least one external control device is a selection switch electrically connectable to a plurality of switching positions with each switching position being electrically and respectively coupled with a control pin of the controller, wherein when the selection switch is connected to one of the plurality of switching positions, a constant voltage signal is delivered to a corresponding control pin of the controller to activate the at least one diffused light color temperature switching scheme for selecting the corresponding diffused light color temperature.

71. The LED lighting device configured with a tunable diffused light color temperature according to claim 52, wherein the at least one external control device is an active infrared ray sensor for detecting an infrared light reflected from an object and converting the infrared light reflected from the object into the at least one external control signal interpretable by the controller for executing the pick and play process for selecting and performing the corresponding diffused light color temperature performance in the at least one diffused light color temperature switching scheme.

72. The LED lighting device configured with a tunable diffused light color temperature according to claim 52, wherein the at least one diffused light color temperature switching scheme comprises at least a high diffused light color temperature performance and a low diffused light color temperature performance, wherein for performing the high diffused light color temperature performance, the second semiconductor switching device is fully conducted and the first semiconductor switching device is completely cut off, wherein for performing the low diffused light color temperature performance, the first semiconductor switching device is fully conducted and the second semiconductor switching device is completely cut off.

73. The LED lighting device configured with a tunable diffused light color temperature according to claim 52, wherein the at least one diffused light color temperature switching scheme comprises at least a high diffused light color temperature performance, a medium diffused light color temperature performance and a low diffused light color temperature performance; wherein for performing the high diffused light color temperature performance, the second semiconductor switching device is fully conducted and the first semiconductor switching device is completely cut off, wherein for performing the medium diffused light color temperature performance, the first semiconductor switching device and the second semiconductor switching device are partially and complementarily conducted such that the total light intensity generated by the light-emitting unit remains unchanged, wherein for performing the low diffused light color temperature performance, the first semiconductor switching device is fully conducted while the second semiconductor switching device is completely cut off.

74. The LED lighting device configured with a tunable diffused light color temperature according to claim 73, wherein the controller is further designed with a free running process to operate a free running performance of the at least one diffused light color temperature switching scheme, wherein a second external control device is designed to output a second external control signal to activate the free running process, wherein the controller manages to operate the free running process to gradually rotate a running pick and play of the at least one diffused light color temperature switching scheme, wherein the free running process operates to perform the low diffused light color temperature performance first for a predetermined short time interval, and then is switched to perform the medium diffused light color temperature performance for the predetermined short time interval, and then is switched to perform the high diffused light color temperature performance for the predetermined short time interval to complete a free running cycle, the free running cycle continues till the second external control signal is ceased or till the second external control device outputs another second external control signal to end the free running process.

75. The LED lighting device configured with a tunable diffused light color temperature according to claim 52, wherein the LED lighting device is an LED light bulb, an LED recessed light, an LED ceiling light, an LED pendant light, an LED wall light, an LED under cabinet light, a ceiling fan with LED light kit, a portable LED lamp or any other LED lamp for indoor or outdoor application.

76. An LED lighting device comprising:
a light-emitting unit comprising a plurality of LEDs divided into two LED loads including a first LED load with N number of LEDs emitting light with a first color temperature and a second LED load with M number of LEDs emitting light with a second color temperature, wherein the first color temperature is designed with a value in a range between 1800K and 3000K and the second color temperature is designed with a value in a range between 4000K and 6500K, wherein M and N are positive integers with a value of M being greater than or equal to a value of N;

a light diffuser covering the first LED load and the second LED load to create a diffused light with a diffused light color temperature;

a power allocation circuitry electrically connected with a power source from a power supply unit and the light-emitting unit to operate a plurality of different power loading options between delivering a first electric power to the first LED load and delivering a second electric power to the second LED load to perform an illumination characterized by the diffused light with the diffused light color temperature; and at least one external control device to output at least one external control signal for tuning and selecting a corresponding diffused light color temperature performance;

wherein the power allocation circuitry is designed to operate the plurality of different power loading options according to a power allocation algorithm for distributing and loading a DC power between the first electric power delivered to the first LED load and the second electric power delivered to the second LED load, wherein each of the plurality of different power loading options is configured with a paired combination of the first electric power and the second electric power for generating the diffused light with the diffused light color temperature to form a diffused light color temperature switching scheme comprising a plurality of different diffused light color temperature performances for selection, wherein for generating and executing each of the plurality of different power loading options, the first electric power and the second electric power in each paired combination are to be reversely and complementarily adjusted according to the power allocation algorithm such that a sum of the first electric power and the second electric power respectively delivered to the first LED load and the second LED load is maintained at a constant level to characterize a technical foundation of the color temperature switching scheme; and wherein the N number LEDs of the first LED load and the M number LEDs of the second LED load are respectively designed with a configuration of in series and/or in parallel connections such that when incorporated with a power level setting of the DC power, an electric current passing through each LED of the first LED load and each LED of the second LED load remains at a level such that a voltage V across each LED complies with an operating constraint of $V_{th} < V < V_{max}$ featuring electrical characteristics of an LED, wherein $V_{th}$ is a reference value of a threshold voltage required to trigger each LED to start emitting light and $V_{max}$ is a reference value of a maximum operating voltage across each LED at which at least one LED construction in said plurality of LEDs is vulnerable to a thermal damage.

77. The LED lighting device according to claim 76, wherein when said plurality of LEDs are white light LEDs produced by coating at least one phosphor compound on surfaces of LEDs, said reference value of said threshold voltage $V_{th}$ is estimated at 2.5 volts and said reference value of said maximum operating voltage $V_{max}$ is estimated at 3.5 volts subject to an operating condition that a temperature of each LED connecting pin is controlled at or below 80 degree centigrade, wherein said voltage V across each LED of said plurality of LEDs complies with an operating constraint of 2.5 volts<V<3.5 volts, wherein the working voltage $V_N$ imposed on the first LED load is required to operate in a domain $N_S \times 2.5$ volts$< V_N < N_S \times 3.5$ volts, and the working voltage $V_M$ imposed on the second LED load is required to operate in a domain $M_S \times 2.5$ volts$< V_M < M_S \times 3.5$ volts, wherein $N_S$ and $M_S$ respectively denoting the numbers of in series connected LEDs in the first LED load and the second LED load, wherein $N_S \leq N$ and $M_S \leq M$.

78. The LED lighting device according to claim 76, wherein the power allocation circuitry comprises at least a controller and an LED driver circuitry, wherein the LED driver circuitry is further configured with a first LED driver comprising a first semiconductor switching device electrically coupled to the first LED load and a second LED driver comprising a second semiconductor switching device electrically coupled to the second LED load, for controlling and delivering the first electric power and the second electric power respectively to the first LED load and the second LED load;

wherein the controller is electrically coupled with the first LED driver, the second LED driver, and the at least one external control device;

wherein when the light-emitting unit is in a turned-on state, the controller further outputs a first control signal to control a first conduction rate of the first semiconductor switching device of the first LED driver and a second control signal to control a second conduction rate of the second semiconductor switching device of the second LED driver to respectively deliver the first electric power to the first LED load and the second electric power to the second LED load to generate the diffused light with the diffused light color temperature thru the light diffuser according to the at least one external control signal;

wherein for tuning the diffused light color temperature, the controller operates the power allocation algorithm to reversely and complementarily adjust the first electric power and the second electric power respectively delivered to the first LED load and the second LED load such that the sum of the first electric power and the second electric power remains unchanged; and wherein the controller is designed to operate the plurality of different power loading options, wherein different paired combinations of the first conduction rate and the second conduction rate respectively for controlling the first electric power delivered to the first LED load and the second electric power delivered to the second LED load for creating different diffused light color temperatures are preprogrammed and addressable by the controller for operating a pick and play process according to the at least one external control signal generated by the at least one external control device for selecting the corresponding diffused light color temperature performance in the diffused light color temperature switching scheme; wherein a total light intensity generated by the light-emitting unit remains unchanged while the diffused light color temperature is alternately adjusted.

79. The LED lighting device according to claim 78, wherein the diffused light color temperature performances of the diffused light color temperature switching scheme include at least a low diffused light color temperature performance, a medium diffused light color temperature performance and a high diffused light color temperature performance; wherein the controller is further designed with a free running process to operate a free running performance of the diffused light color temperature switching scheme, wherein a second external control device is designed to output a second external control signal to activate the free running process, wherein the controller manages to operate the free running process to gradually rotate a running pick and play of the diffused light color temperature switching scheme, wherein the free running process operates to perform the low diffused light color temperature performance first for a predetermined short time interval, and then is switched to perform the medium diffused light color temperature performance for the predetermined short time interval, and then is switched to perform the high diffused light color temperature performance for the predetermined short time interval to complete a free running cycle, the free running cycle continues till the second external control signal is ceased or till the second external control device outputs another second external control signal to end the free running process.

80. The LED lighting device according to claim 78, wherein the diffused light color temperature performances of the diffused light color temperature switching scheme include at least a low diffused light color temperature performance, a low-medium diffused light color temperature performance, a medium diffused light color temperature performance, a high-medium diffused light color temperature performance and a high diffused light color temperature performance; wherein the controller is further designed with a free running process to operate a free running performance of the diffused light color temperature switching scheme, wherein a second external control device is designed to output a second external control signal to activate the free running process, wherein the controller manages to operate the free running process to gradually rotate a running pick and play of the diffused light color temperature switching scheme, wherein the free running process operates to perform the low diffused light color temperature performance first for a predetermined short time interval, and then is switched to perform the low-medium diffused light color temperature performance for the predetermined short time interval, and then is switched to perform the medium diffused light color temperature performance for the predetermined short time interval, and then is switched to perform the high-medium diffused light color temperature performance for the predetermined short time interval, and then is switched to perform the high diffused light color temperature performance to complete a free running cycle, the free running cycle continues till the second external control signal is ceased or till the second external control device outputs another second external control signal to end the free running process.

81. The LED lighting device according to claim 76, wherein the at least one external control device comprises a selection switch respectively connectable to two switching positions configured in the power loading circuitry including a first switching position electrically connected to the first LED load and a second switching position electrically connected to the second LED load, wherein the power loading circuitry is designed with two power loading options including a first power loading option and a second power loading option, wherein when the selection switch is electrically connected to the first switching position, the first power loading option is activated with the DC power being delivered only to the first LED load, namely the first electric power is equal to the DC power, to generate the diffused light with a low diffused light color temperature, and wherein when the selection switch is electrically connected to the second switching position, the second power loading option is activated with the DC power being delivered only to the second LED load, namely the second electric power is equal to the DC power, to generate the diffused light with a high diffused light color temperature.

82. The LED lighting device according to claim 76, wherein the at least one external control device comprises a selection switch connectable respectively to three switching positions configured in the power loading circuitry including a first switching position electrically connected to only the first LED load, a second switching position electrically connected to both the first LED load and the second LED load, and a third switching position electrically connected to only the second LED load; wherein the power loading circuitry comprises three power loading options including a first power loading option, a second power loading option and a third power loading option; wherein when the selection switch is electrically connected to the first switching position, the first power loading option is activated with the DC power being delivered only to the first LED load, namely the first electric power is equal to the DC power, to generate the diffused light with a low diffused light color temperature; wherein when the selection switch is electrically connected to the second switching position, the second power loading option is activated with the DC power being delivered to both the first LED load and the second LED load to generate the diffused light with a medium diffused light color temperature; wherein when the selection switch is electrically connected to the third switching position, the third power loading option is activated with the DC power being delivered only to the second LED load, namely the second electric power is equal to the DC power, to generate the diffused light with a high diffused light color temperature.

83. The LED lighting device according to claim 76, wherein the at least one external control device comprises a selection switch connectable respectively to five switching positions configured in the power loading circuitry including a first switching position electrically connected to only the first LED load, a second switching position electrically connected to both the first LED load and the second LED load with a second resistor being connected in series with the second LED load, a third switching position electrically connected to both the first LED load and the second LED load, a fourth switching position electrically connected with both the first LED load and the second LED load with a first resistor being connected in series with the first LED load, and a fifth switching position electrically connected to only the second LED load, wherein the power loading circuitry comprises five power loading options including a first power loading option, a second power loading option, a third power loading option, a fourth power loading option and a fifth power loading option; wherein when the selection switch is electrically connected to the first switching position, the first power loading option is activated with the DC power being delivered only to the first LED load with the first electric power being equal to the DC power to generate the diffused light with a low diffused light color temperature; wherein when the selection switch is electrically connected to the second switching position, the second power loading option is activated with the DC power being delivered to both the first LED load and the second LED load with the first electric power delivered to the first LED load being greater than the second electric power delivered to the second LED load to generate the diffused light with a low-medium diffused light color temperature; wherein when the selection switch is electrically connected to the third switching position, the third power loading option is activated with the DC power being distributed to both the first LED load and the second LED load with the first electric power being equal to the second electric power to generate the diffused light with a medium diffused light color temperature; wherein when the selection switch is electrically connected to the fourth switching position, the fourth power loading option is activated with the DC power being distributed between the first LED load and the second LED load with the second electric power delivered to the second LED load being greater than the first electric power delivered to the first LED load to generate the diffused light with a high-medium diffused light color temperature, and when the selection switch is electrically connected to the fifth switching position, the fifth power loading option is activated with the DC power being delivered to only the second LED load with the second electric power being equal to the DC power to generate the diffused light with a high diffused light color temperature.

84. The LED lighting device according to claim 76, wherein the at least one external control signal is at least one short power interruption signal generated by operating a main power switch within a predetermined time interval, a push button, a touch sensor or a wireless remote control device, wherein a power interruption detection circuit is electrically coupled with the controller, wherein when the at least one short power interruption signal is detected by the power interruption detection circuit, the controller operates to alternately perform the corresponding diffused light color temperature performance in the diffused light color temperature switching scheme according to a prearranged sequence.

85. The LED lighting device according to claim 84, wherein when the main power switch is used for generating the at least one short power interruption signal, the main power switch is turned off and turned back on within the predetermined time interval.

86. The LED lighting device according to claim 84, wherein when the push button or the touch sensor is used, a signal detection circuitry is connected to the push button or the touch sensor, wherein when the push button or the touch sensor is operated, a voltage signal is transmitted to the signal detection circuitry to actuate at least one momentary power interruption and consequently the at least one short power interruption signal is generated and detected by the power interruption detection circuit, the controller accordingly operates to alternately perform the corresponding diffused light color temperature performance in the diffused light color temperature switching scheme according to the prearranged sequence.

87. The LED lighting device according to claim 84, wherein the at least one short power interruption signal is generated by a wireless external control signal designed to control a conduction state of a bi-directional semiconductor switching device electrically connected between an AC power source and an AC/DC converter electrically connected to the LED driver circuitry, wherein the wireless external control signal is received by a wireless external signal receiver electrically coupled with a second controller electrically coupled with the bi-directional semiconductor switching device, wherein upon receiving the wireless external control signal, the second controller operates to instantly cutoff a conduction of the bi-directional semiconductor switching device and re-conduct the bi-directional semiconductor switching device within a predetermined time interval to generate the at least one short power interruption signal detectable by the controller thru the power interruption detection circuit, the controller accordingly operates to alternately perform the corresponding diffused light color temperature performance in the diffused light color temperature switching scheme according to the prearranged sequence.

88. The LED lighting device according to claim 84, wherein the at least one short power interruption signal is generated by a push button or a touch sensor electrically coupled with a second controller electrically coupled with a bi-directional semiconductor switching device to control a conduction state of the bi-directional semiconductor switching device electrically connected between an AC power source and an AC/DC power converter, wherein when the push button or the touch sensor is operated for a short time interval, a voltage signal with a time length equal to the short time interval is detected by the second controller, wherein upon receiving the voltage signal, the second controller operates to instantly cutoff a conduction of the bi-directional semiconductor switching device and re-conduct the bi-directional semiconductor switching device within the short time interval to generate the at least one short power interruption signal detected by the power interruption detection circuit, the controller accordingly operates to alternately perform the corresponding diffused light color temperature performance in the diffused light color temperature switching scheme according to the prearranged sequence.

89. The LED lighting device according to claim 76, wherein the at least one external control device is a voltage divider operated by a user to output a plurality of voltage signals interpretable by the controller for respectively executing the pick and play process for respectively selecting and performing the corresponding diffused light color temperature performance in the diffused light color temperature switching scheme; wherein the voltage divider is configured to output the plurality of voltage signals respectively represented by a voltage value or voltage format, wherein the controller operates to activate the diffused light color temperature switching scheme to generate the corresponding diffused light color temperature performance in the diffused light color temperature switching scheme according to the voltage value or voltage format outputted by the voltage divider.

90. The LED lighting device according to claim 89, wherein the voltage divider is optionally designed with a stepless/free setting switch; wherein the voltage divider is configured to operate with a variable resistor to output a voltage value corresponding to a final parking location of a switching motion at the variable resistor; wherein a full voltage value of the voltage divider corresponding to a full length of the variable resistor is divided into a plurality of different voltage domains for activating the pick and play process, wherein the stepless/free setting switch is allowed to park at any location on the variable resistor to generate a corresponding voltage value to the controller, wherein the controller is designed to operate the pick and play process according to a belonging of a voltage domain with respect to the corresponding voltage value received from the voltage divider for selecting the diffused light color temperature performance corresponding to the voltage domain.

91. The LED lighting device according to claim 89, wherein the voltage divider is operated with a configuration of a slide switch, a rotary switch, or a pull chain switch, designed with a plurality of switching positions operable by a user for selecting and performing the corresponding diffused light color temperature performance in the diffused light color temperature switching scheme.

92. The LED lighting device according to claim 76, wherein the at least one external control device is a wireless remote control device comprising at least one wireless external signal receiver electrically coupled with the controller to receive at least one wireless external control signal and convert the at least one wireless external control signal into the at least one external control signal interpretable by the controller for activating the pick and play process to select and perform the corresponding diffused light color temperature performance in the diffused light color temperature switching scheme.

93. The LED lighting device according to claim 76, wherein the at least one external control device is an active infrared ray sensor for detecting an infrared light reflected from an object and converting the infrared light reflected from the object into the at least one external control signal interpretable by the controller for executing the pick and play process for selecting and performing the corresponding diffused light color temperature performance in the diffused light color temperature switching scheme.

94. The LED lighting device according to claim 76, wherein the at least one external control device is a push button or a touch sensor, wherein when the push button or the touch sensor is operated, the controller accordingly operates to activate the pick and play process to alternately perform the corresponding diffused light color temperature performance in the diffused light color temperature switching scheme according to a prearranged sequence.

95. The LED lighting device according to claim 76, wherein the at least one external control device is a selection switch electrically connected to a plurality of switching positions with each switching position being electrically and respectively coupled with a control pin of the controller, wherein when the selection switch is connected to one of the plurality of switching positions, a constant voltage signal is delivered to a corresponding control pin of the controller to activate the diffused light color temperature switching scheme for selecting the corresponding diffused light color temperature performance.

96. The LED lighting device according to claim 76, wherein the LED lighting device is an LED light bulb, an LED recessed light, an LED ceiling light, an LED pendant light, an LED wall light, an LED under cabinet light, a ceiling fan with LED light kit, a portable LED lamp or any other LED lamp for indoor or outdoor application.

97. A multi-level LED security light comprising:
- a light-emitting unit configured with at least a first LED load for emitting light with a first color temperature in a range between 1800K and 3000K and at least a second LED load for emitting light with a second color temperature in a range between 4000K and 6500K;
- a light diffuser covering the first LED load and the second LED load to create a diffused light with a diffused light color temperature;
- a loading and power control unit;
- a light sensing control unit;
- a motion sensing unit;
- a power supply unit; and
- an external control unit including at least one external control device outputting at least one external control signal;
- wherein the loading and power control unit includes at least a controller and an LED driver circuitry, wherein the LED driver circuitry is electrically connected with a power source of the power supply unit and the light-emitting unit for managing a DC power delivered to the light-emitting unit; wherein the LED driver circuitry is further configured with a first LED driver and a second LED driver, wherein the first LED driver comprises a first semiconductor switching device electrically connected to the first LED load and the second LED driver comprises a second semiconductor switching device electrically connected to the second LED load for managing a distribution of the DC power between delivering a first electric power to the first LED load and delivering a second electric power to the second LED load;
- wherein the controller is electrically coupled with the first LED driver, the second LED driver, the light sensing control unit, the motion sensing unit, and the at least one external control device;
- wherein when the light emitting-unit is in a turned-on state, the controller outputs a first control signal and a second control signal to respectively control a first conduction rate of the first semiconductor switching device and a second conduction rate of the second semiconductor switching device to respectively deliver the first electric power to the first LED load and the second electric power to the second LED load to perform different illumination modes of the multi-level LED security light characterized by different diffused light intensities and different diffused light color temperatures according to signals respectively received from the light sensing control unit, the motion sensing unit and the at least one external control device;
- wherein the controller is designed with a diffused light color temperature switching scheme comprising a plurality of different diffused light color temperature performances to be activated by the at least one external control device, wherein different paired combinations of the first conduction rate and the second conduction rate respectively for controlling the first electric power delivered to the first LED load and the second electric power delivered to the second LED load for creating different diffused light color temperatures are preprogrammed and executed by the controller for operating a pick and play process according to the at least one external control signal generated by the at least one external control device for selecting a corresponding diffused light color temperature performance in the diffused light color temperature switching scheme;
- wherein when a light intensity level of an ambient light detected by the light sensing control unit is lower than a first predetermined value, the loading and power control unit manages to deliver an average electric power to the light-emitting unit to operate a first illumination mode to perform a first level illumination characterized by a first diffused light intensity and a first diffused light color temperature for a first predetermined time duration; wherein when the light intensity level of the ambient light detected by the light sensing control unit is higher than a second predetermined value, the loading and power control unit manages to switch off the light-emitting unit; wherein when a motion signal is detected by the motion sensing unit, the loading and power control unit manages to increase the average electric power to the light-emitting unit to operate a second illumination mode to perform a second level illumination characterized by a second diffused light intensity and a second diffused light color temperature for a second predetermined time duration before switching back to the first illumination mode to perform the first level illumination, wherein the second diffused light intensity is always higher than the first diffused light intensity and the second diffused light color temperature is higher than or equal to the first diffused light color temperature;
- wherein the at least one external control device is used for adjusting and setting at least one operating parameter of the multi-level LED security light including but not limited to at least one of the first diffused light color temperature of the first illumination mode, the second diffused light color temperature of the second illumination mode, the first predetermined time duration of the first illumination mode or the second predetermined time duration of the second illumination mode;

wherein the LEDs of the first LED load and the LEDs of the second LED load are respectively designed with a configuration of in series and/or in parallel connections such that when incorporated with a level setting of a DC power source, an electric current passing through each LED of the first LED load and each LED of the second LED load remains at a level such that a voltage V across each LED complies with an operating constraint of $V_{th}<V<V_{max}$ featuring electrical characteristics of an LED, wherein $V_{th}$ is a reference value of a threshold voltage required to trigger the LED to start emitting light and $V_{max}$ is a reference value of a maximum operating voltage across the LED to avoid a thermal damage or burning out of LED construction;

wherein when each of the first LED load and the second LED load is configured with a plurality of LEDs electrically connected in series or sets of in parallel connected LEDs electrically connected in series, a working voltage across the first LED load or the second LED load is confined in a domain between a minimum voltage equal to a sum of the threshold voltages of all LEDs electrically connected in series or sets of in parallel connected LEDs electrically connected in series across each of the first LED load and the second LED load and a maximum voltage equal to a sum of the maximum operating voltages of all LEDs electrically connected in series or sets of in parallel connected LEDs electrically connected in series across each of the first LED load and the second LED load; and wherein when the plurality of LEDs are phosphor based white light LEDs produced by coating at least one phosphor compound on surfaces of LEDs, the reference value of the threshold voltage is estimated at 2.5 volts and the reference value of the maximum operating voltage is estimated at 3.5 volts, wherein the LED has the voltage V across each LED complying with an operating constraint of 2.5 volts<V<3.5 volts and the working voltages imposed on the first LED load and the second LED load respectively represented by $V_N$ and $V_M$ are confined in domains expressed by $N_S \times 2.5$ volts$<V_N<N_S \times 3.5$ volts and $M_S \times 2.5$ volts$<V_M<M_S \times 3.5$ volts, wherein $N_S$ and $M_S$ are positive integrals denoting respective numbers of in series connected LEDs in the first LED load and the second LED load.

98. The multi-level LED security light according to claim 97, wherein the at least one external control device is at least one voltage divider configured with a plurality of switching positions to output a constant voltage signal with different values.

99. The multi-level LED security light according to claim 97, wherein the first diffused light intensity is designed with a level in a range greater than 0% but less than 100% of a maximum light intensity designed for the multi-level LED security light and the second diffused light intensity is designed with a level in a range greater than 0% but less than or equal to 100% of the maximum light intensity designed for the multi-level LED security light.

100. The multi-level LED security light according to claim 97, wherein the first semiconductor switching device is a first unidirectional semiconductor switching device working in conjunction with the controller to control the first conduction rate of the first semiconductor switching device; wherein the second semiconductor switching device is a second unidirectional semiconductor switching device working in conjunction with the controller to control the second conduction rate of the second semiconductor switching device.

101. The multi-level LED security light according to claim 97, wherein when the light-emitting unit is operated in the first illumination mode, a light intensity of the first LED load and a light intensity of the second LED load are respectively adjustable to tune the first diffused light color temperature of the diffused light created thru the light diffuser; wherein upon receiving the at least one external control signal from the at least one external control device, the controller operates in response to reversely and complementarily adjust the light intensity of the first LED load and the light intensity of the second LED load with the same pace; wherein for tuning to a lower diffused light color temperature, the controller operates to control the first conduction rate of the first semiconductor switching device to increase the first electric power delivered to the first LED load and at the same time operates to control the second conduction rate of the second semiconductor switching device to decrease the second electric power delivered to the second LED load with the same pace such that the sum of the first electric power and the second electric power remains unchanged; wherein for tuning to a higher diffused light color temperature, the controller operates to control the first conduction rate of the first semiconductor switching device to decrease the first electric power delivered to the first LED load and at the same time operates to control the second conduction rate of the second semiconductor switching device to increase the second electric power delivered to the second LED load with the same pace such that the sum of the first electric power and the second electric power remains unchanged.

102. The multi-level LED security light according to claim 97, wherein when the light-emitting unit is operated in the second illumination mode, a light intensity of the first LED load and a light intensity of the second LED load are respectively adjustable to tune the second diffused light color temperature of the diffused light created thru the light diffuser; wherein upon receiving the at least one external control signal from the at least one external control device, the controller operates in response to reversely and complementarily adjust the light intensity of the first LED load and the light intensity of the second LED load with the same pace; wherein for tuning to a lower diffused light color temperature, the controller operates to control the first conduction rate of the first semiconductor switching device to increase the first electric power delivered to the first LED load and at the same time operates to control the second conduction rate of the second semiconductor switching device to decrease the second electric power delivered to the second LED load with the same pace such that the sum of the first electric power and the second electric power remains unchanged; wherein for tuning to a higher diffused light color temperature, the controller operates to control the first conduction rate of the first semiconductor switching device to decrease the first electric power delivered to the first LED load and at the same time operates to control the second conduction rate of the second semiconductor switching device to increase the second electric power delivered to the second LED load with the same pace such that the sum of the first electric power and the second electric power remains unchanged.

103. The multi-level LED security light according to claim 97, wherein when the light-emitting unit is in the turned-on state, a light intensity of the first LED load and a light intensity of the second LED load are respectively adjustable, wherein the controller in response to the at least one external control signal received respectively outputs a first PWM signal to control the first conduction rate of the first semiconductor switching device and a second PWM signal to control the second conduction rate of the second semiconductor switching device with an arrangement that the first conduction rate of the first semiconductor switching device and the second conduction rate of the second semiconductor switching device are reversely and complementarily adjusted such that the sum of the first electric power delivered to the first LED load and the second electric power delivered to the second LED load is maintained at a constant level while the diffused light color temperature generated by the light emitting unit thru the light diffuser is proportionately adjusted according to the at least one external control signal to perform a color temperature tuning of the first diffused light color temperature of the first level illumination or the second diffused light color temperature of the second level illumination.

104. A multi-level LED security light comprising:
a light-emitting unit configured with at least a first LED load for emitting light with a first color temperature designed with a low color temperature in a range between 1800K and 3000K, and at least a second LED load for emitting light with a second color temperature designed with a high color temperature in a range between 4000K and 6500K;
a loading and power control unit;
a light sensing control unit;
a motion sensing unit;
a power supply unit; and
an external control unit including at least one external control device outputting at least one external control signal;
wherein the at least one external control device is used for adjusting and setting at least one operating parameter of the multi-level LED security light including but not limited to at least one of a light intensity, a color temperature or a time duration;
wherein the loading and power control unit includes a controller and an LED driver circuitry, wherein the LED driver circuitry is electrically connected with a power source of the power supply unit and the light-emitting unit for managing a DC power delivered to the light-emitting unit; wherein the LED driver circuitry is configured with a first LED driver and a second LED driver, wherein the first LED driver comprises a first semiconductor switching device electrically connected to the first LED load and the second LED driver comprises a second semiconductor switching device electrically connected to the second LED load, wherein the controller is electrically coupled with the first semiconductor switching device, the second semiconductor switching device, the light sensing control unit, the motion sensing unit and the at least one external control device;
wherein the controller outputs a first control signal and a second control signal to respectively control a first conduction rate of the first semiconductor switching device and a second conduction rate of the second semiconductor switching device to respectively deliver different electric powers to the first LED load and the second LED load to perform different illumination modes of the multi-level LED security light characterized by different light intensities and different light color temperatures according to signals respectively received from the light sensing control unit, the motion sensing unit and the at least one external control device;
wherein the first LED load is configured with N pieces of LED and the second LED load is configured with M pieces of LED, wherein M and N are positive integers with a value of M being greater than or equal to a value of N;
wherein when a nighttime signal is received by the controller defined as a light intensity level of an ambient light detected by the light sensing control unit being lower than a first predetermined value, the loading and power control unit operates to turn on the light-emitting unit, wherein the controller outputs at least the first control signal to control at least the first conduction rate of the first semiconductor switching device to deliver an electric power to the light-emitting unit to operate a first illumination mode to generate a first level illumination with the first color temperature for a first predetermined time duration;
wherein when a daytime signal is received by the controller defined as the light intensity level of the ambient light detected by the light sensing control unit being higher than a second predetermined value, the loading and power control unit operates to switch off the light-emitting unit;
wherein when a motion signal is detected by the motion sensing unit, the controller operates to output at least the second control signal to control at least the second conduction rate of the second semiconductor switching device to operate a second illumination mode to generate a second level illumination with the second color temperature for a second predetermined time duration;
wherein the light intensity of the first level illumination is designed with a level in a range greater than 0% of a maximum light intensity but less than or equal to 50% of the maximum light intensity designed for the light-emitting unit to characterize the first level illumination, wherein the light intensity of the second level illumination is designed with a level in a range greater than 50% of the maximum light intensity but less than or equal to 100% of the maximum light intensity to characterize the second level illumination being higher than the first level illumination;
wherein the N number LEDs of the first LED load and the M number LEDs of the second LED load are respectively designed with a configuration of in series and/or in parallel connections such that when incorporated with a power level setting of the DC power, an electric current passing through each LED of the first LED load and each LED of the second LED load remains at a level such that a voltage V across each LED complies with an operating constraint of $V_{th}<V<V_{max}$ featuring electrical characteristics of an LED, wherein $V_{th}$ is a reference value of a threshold voltage required to trigger each LED to start emitting light and $V_{max}$ is a reference value of a maximum operating voltage across each LED at which at least one LED construction in said plurality of LEDs is vulnerable to a thermal damage; wherein when each of the first LED load and the second LED load is configured with a plurality of LEDs electrically connected in series, or sets of in parallel connected LEDs electrically connected in series, a working voltage imposed on each of the first LED load and the second LED load is confined in a domain between a minimum voltage equal to the sum of the threshold voltages of all LEDs electrically connected in series or sets of in parallel connected LEDs electrically connected in series and a maximum voltage equal to the sum of the maximum operating voltages of all LEDs electrically connected in series or sets of in parallel connected LEDs electrically connected in series; and wherein when the first LED load and the second LED load are configured with a plurality of white light LEDs produced by coating at least one phosphor compound on surfaces of LEDs, said reference value of said threshold voltage $V_{th}$ is estimated at 2.5 volts and said reference value of said maximum operating voltage $V_{max}$ is estimated at 3.5 volts subject to an operating condition that a temperature of each LED connecting pin is controlled at or below 80 degree centigrade, wherein said voltage V across each LED of said plurality of LEDs complies with an operating constraint of 2.5 volts<V<3.5 volts, wherein the working voltage $V_N$ imposed on the first LED load is required to operate in a domain $N_S \times 2.5$ volts<$V_N$<$N_S \times 3.5$ volts, and the working voltage $V_M$ imposed on the second LED load is required to operate in a domain $M_S \times 2.5$ volts<$V_M$<$M_S \times 3.5$ volts, wherein $N_S$ and $M_S$ respectively denoting the numbers of in series connected LEDs in the first LED load and the second LED load, wherein $N_S \le N$ and $M_S \le M$.

105. The multi-level LED security light according to claim 104, wherein the at least one external control device is at least one voltage divider configured with a plurality of switching positions to output a constant voltage signal with different values.

106. The multi-level LED security light according to claim 104, wherein when the second illumination mode is activated by the motion signal, the controller operates to turn off the first level illumination.

107. The multi-level LED security light according to claim 104, wherein when the second illumination mode is activated by the motion signal, the controller operates to continue to turn on the first level illumination.

108. A multi-level LED security light comprising:
a light-emitting unit comprising at least a first LED load configured with N pieces of LEDs and at least a second LED load configured with M pieces of LEDs, wherein M and N are positive integers with a value of M being greater than or equal to a value of N, wherein the first LED load is covered by a first light diffuser and the second LED load is covered by a second light diffuser;
a loading and power control unit;
a light sensing control unit;
a motion sensing unit;
a power supply unit; and
an external control unit including at least one external control device outputting at least one external control signal;
wherein the at least one external control device is used for adjusting and setting at least one operating parameter of the multi-level LED security light including but not limited to at least one of a light intensity or a time duration;
wherein the loading and power control unit includes a controller and an LED driver circuitry, wherein the LED driver circuitry is electrically connected with a power source of the power supply unit and the light-emitting unit for managing a DC power delivered to the light-emitting unit;
wherein the LED driver circuitry is configured with a first LED driver electrically connected to the first LED load and a second LED driver electrically connected to the second LED load, wherein the first LED driver comprises a first semiconductor switching device electrically connected to the first LED load and the second LED driver comprises a second semiconductor switching device electrically connected to the second LED load;

wherein the controller is electrically coupled with the first semiconductor switching device, the second semiconductor switching device, the light sensing control unit, the motion sensing unit and the at least one external control device;

wherein the controller outputs a first control signal and a second control signal to respectively control a first conduction rate of the first semiconductor switching device and a second conduction rate of the second semiconductor switching device to perform different illumination modes of the multi-level LED security light characterized by different light intensities according to signals respectively received from the light sensing control unit, the motion sensing unit and the at least one external control device;

wherein when a nighttime signal is received by the controller defined as a light intensity level of an ambient light detected by the light sensing control unit being lower than a first predetermined value, the controller outputs at least the first control signal to control at least the first conduction rate of the first semiconductor switching device to operate a first illumination mode to generate a first level illumination for a first predetermined time duration;

wherein when a daytime signal is received by the controller defined as the light intensity level of the ambient light detected by the light sensing control unit being higher than a second predetermined value, the controller operates to switch off the light-emitting unit;

wherein when a motion signal is detected by the motion sensing unit, the controller operates to output at least the second control signal to control at least the second conduction rate of the second semiconductor switching device to operate a second illumination mode to generate a second level illumination for a second predetermined time duration;

wherein the light intensity of the first level illumination is designed with a level in a range greater than 0% of a maximum light intensity but less than or equal to 50% of the maximum light intensity designed for the light-emitting unit to characterize the first level illumination, wherein the light intensity of the second level illumination is designed with a level in a range greater than 50% of the maximum light intensity but less than or equal to 100% of the maximum light intensity to characterize the second level illumination being higher than the first level illumination;

wherein the N number LEDs of the first LED load and the M number LEDs of the second LED load are respectively designed with a configuration of in series and/or in parallel connections such that when incorporated with a power level setting of the DC power, an electric current passing through each LED of the first LED load and each LED of the second LED load remains at a level such that a voltage V across each LED complies with an operating constraint of $V_{th}$<V<$V_{max}$ featuring electrical characteristics of an LED, wherein $V_{th}$ is a reference value of a threshold voltage required to trigger each LED to start emitting light and $V_{max}$ is a reference value of a maximum operating voltage across each LED at which at least one LED construction in said plurality of LEDs is vulnerable to a thermal damage; wherein when each of the first LED load and the second LED load is configured with a plurality of LEDs electrically connected in series, or sets of in parallel connected LEDs electrically connected in series, a working voltage imposed on each of the first LED load and the second LED load is confined in a domain between a minimum voltage equal to the sum of the threshold voltages of all LEDs electrically connected in series or sets of in parallel connected LEDs electrically connected in series and a maximum voltage equal to the sum of the maximum operating voltages of all LEDs electrically connected in series or sets of in parallel connected LEDs electrically connected in series; and wherein when the first LED load and the second LED load are configured with a plurality of white light LEDs produced by coating at least one phosphor compound on surfaces of LEDs, said reference value of said threshold voltage $V_{th}$ is estimated at 2.5 volts and said reference value of said maximum operating voltage $V_{max}$ is estimated at 3.5 volts subject to an operating condition that a temperature of each LED connecting pin is controlled at or below 80 degree centigrade, wherein said voltage V across each LED of said plurality of LEDs complies with an operating constraint of 2.5 volts<V<3.5 volts, wherein the working voltage $V_N$ imposed on the first LED load is required to operate in a domain $N_S \times 2.5$ volts<$V_N$<$N_S \times 3.5$ volts, and the working voltage $V_M$ imposed on the second LED load is required to operate in a domain $M_S \times 2.5$ volts<$V_M$<$M_S \times 3.5$ volts, wherein $N_S$ and $M_S$ respectively denoting the numbers of in series connected LEDs in the first LED load and the second LED load, wherein $N_S \leq N$ and $M_S \leq M$.

109. The multi-level LED security light according to claim 108, wherein the at least one external control device is at least one voltage divider configured with a plurality of switching positions to output a constant voltage signal with different values.

110. The multi-level LED security light according to claim 108, wherein when the second illumination mode is activated by the motion signal, the controller operates to turn off the first level illumination.

111. The multi-level LED security light according to claim 108, wherein when the second illumination mode is activated by the motion signal, the controller operates to continue to turn on the first level illumination.

* * * * *